US012132814B2

(12) United States Patent
Jeon et al.

(10) Patent No.: US 12,132,814 B2
(45) Date of Patent: Oct. 29, 2024

(54) DEVICE AND COMPUTING SYSTEM INCLUDING THE DEVICE

(71) Applicant: SK hynix Inc., Icheon-si (KR)

(72) Inventors: Yong Tae Jeon, Icheon-si (KR); Dae Sik Park, Icheon-si (KR); Jae Young Jang, Icheon-si (KR); Byung Cheol Kang, Icheon-si (KR); Seung Duk Cho, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/840,340

(22) Filed: Jun. 14, 2022

(65) Prior Publication Data

US 2022/0311590 A1    Sep. 29, 2022

Related U.S. Application Data

(62) Division of application No. 17/349,775, filed on Jun. 16, 2021, now Pat. No. 11,546,128.

(30) Foreign Application Priority Data

Jun. 16, 2020   (KR) .................. 10-2020-0073157
Apr. 1, 2021    (KR) .................. 10-2021-0042642
Apr. 5, 2021    (KR) .................. 10-2021-0044151

(51) Int. Cl.
*H04L 7/00*      (2006.01)
*H04L 7/033*     (2006.01)
(Continued)

(52) U.S. Cl.
CPC ............ *H04L 7/005* (2013.01); *H04L 7/0079* (2013.01); *H04L 7/0091* (2013.01); *H04L 7/033* (2013.01)

(58) Field of Classification Search
CPC ....... H04L 7/005; H04L 7/033; H04L 7/0091; H04L 7/0079; H04L 47/10; G06F 13/4291; G06F 13/4273; G05B 19/0423
(Continued)

(56) References Cited

U.S. PATENT DOCUMENTS 4,692,894 A    9/1987 Bemis
5,025,457 A    6/1991 Ahmed
(Continued)

FOREIGN PATENT DOCUMENTS

CN    1098838 A    2/1995
CN    1337801 A    2/2002
(Continued)

OTHER PUBLICATIONS

Froelich, D., "PCIe Electrical Update." PCI SIG Developers Conference, 2018, 49 pages.
(Continued)

*Primary Examiner* — Phuong Phu
(74) *Attorney, Agent, or Firm* — Perkins Coie LLP

(57) ABSTRACT

Interface devices and systems that include interface devices are disclosed. In some implementations, a device includes a transceiver configured to transmit and receive data, a lane margining controller in communication with the transceiver and configured to control the transceiver to transmit, through a margin command, to an external device, a request for requesting a state of an elastic buffer of the external device, and control the transceiver to receive the state of the elastic buffer of from the external device, and a port setting controller adjust a clock frequency range of a spread spectrum clocking scheme based on the state of the elastic buffer.

23 Claims, 39 Drawing Sheets

(51) Int. Cl.
*H04L 25/00* (2006.01)
*H04L 25/40* (2006.01)

(58) Field of Classification Search
USPC .......................................... 375/372, 371, 373
See application file for complete search history.

(56) References Cited

U.S. PATENT DOCUMENTS

| | | | |
|---|---|---|---|
| 5,844,891 | A | 12/1998 | Cox |
| 5,958,027 | A * | 9/1999 | Gulick ................ G06F 13/4291 710/63 |
| 6,029,194 | A | 2/2000 | Tilt |
| 6,061,802 | A | 5/2000 | Gulick |
| 6,279,058 | B1 | 8/2001 | Gulick |
| 7,103,125 | B1 | 9/2006 | Crutchfield et al. |
| 7,295,578 | B1 | 11/2007 | Lyle et al. |
| 8,285,884 | B1 | 10/2012 | Norrie |
| 8,879,680 | B2 | 11/2014 | Tresidder et al. |
| 9,337,934 | B1 | 5/2016 | Agazzi et al. |
| 10,862,478 | B2 | 12/2020 | Hwang |
| 11,546,128 | B2 * | 1/2023 | Jeon .................... G06F 13/4291 |
| 11,599,495 | B2 | 3/2023 | Jeon et al. |
| 11,726,947 | B2 | 8/2023 | Park |
| 11,782,792 | B2 | 10/2023 | Jeon et al. |
| 2002/0024970 | A1 | 2/2002 | Amaral et al. |
| 2002/0187798 | A1 | 12/2002 | Young et al. |
| 2003/0122574 | A1 | 7/2003 | Kushida |
| 2004/0263427 | A1 | 12/2004 | Horigan |
| 2006/0209684 | A1 * | 9/2006 | Bei .......................... H04L 47/10 370/468 |
| 2007/0001882 | A1 | 1/2007 | Zhang et al. |
| 2007/0011389 | A1 | 1/2007 | Nishikawa |
| 2007/0041391 | A1 | 2/2007 | Lin et al. |
| 2007/0177701 | A1 | 8/2007 | Thanigasalam |
| 2007/0204137 | A1 | 8/2007 | Tran |
| 2008/0100350 | A1 | 5/2008 | Pernia |
| 2008/0141063 | A1 | 6/2008 | Ridgeway et al. |
| 2009/0059962 | A1 | 3/2009 | Schmidt et al. |
| 2009/0317013 | A1 | 12/2009 | Yang et al. |
| 2010/0054385 | A1 | 3/2010 | Chien et al. |
| 2010/0061424 | A1 | 3/2010 | Germann et al. |
| 2010/0114584 | A1 | 5/2010 | Weng |
| 2012/0140781 | A1 | 6/2012 | Green |
| 2012/0257699 | A1 | 10/2012 | Choi et al. |
| 2013/0235887 | A1 | 9/2013 | Mamidwar et al. |
| 2013/0343528 | A1 | 12/2013 | Polland et al. |
| 2014/0006675 | A1 | 1/2014 | Meir |
| 2014/0101356 | A1 | 4/2014 | Sonoda et al. |
| 2014/0126612 | A1 * | 5/2014 | Tresidder ............ G06F 13/4273 375/259 |
| 2015/0350656 | A1 | 12/2015 | Chung et al. |
| 2016/0092335 | A1 | 3/2016 | Boelter |
| 2016/0139622 | A1 | 5/2016 | Barner |
| 2016/0277302 | A1 | 9/2016 | Olsen |
| 2017/0262290 | A1 | 9/2017 | Yasin et al. |
| 2018/0004686 | A1 | 1/2018 | Chen |
| 2018/0089125 | A1 | 3/2018 | Berke |
| 2018/0181457 | A1 | 6/2018 | Ebisawa et al. |
| 2018/0267850 | A1 | 9/2018 | Froelich et al. |
| 2018/0285227 | A1 | 10/2018 | Sharma et al. |
| 2018/0331864 | A1 | 11/2018 | Das Sharma |
| 2019/0041820 | A1 * | 2/2019 | Jones ................ G05B 19/0423 |
| 2019/0258600 | A1 | 8/2019 | Das Sharma |
| 2020/0132760 | A1 | 4/2020 | Froelich et al. |
| 2020/0249275 | A1 | 8/2020 | Froelich et al. |
| 2020/0364108 | A1 | 11/2020 | Froelich et al. |
| 2020/0364129 | A1 | 11/2020 | Das Sharma |
| 2021/0050941 | A1 | 2/2021 | Das Sharma |
| 2021/0376716 | A1 | 12/2021 | Liu |
| 2021/0390074 | A1 | 12/2021 | Park |
| 2021/0391973 | A1 | 12/2021 | Jeon et al. |
| 2022/0022770 | A1 | 1/2022 | Ouwerkerk |
| 2022/0318094 | A1 | 10/2022 | Jeon et al. |
| 2022/0318180 | A1 | 10/2022 | Jeon et al. |

FOREIGN PATENT DOCUMENTS

| | | |
|---|---|---|
| CN | 1376959 A | 10/2002 |
| CN | 1395426 A | 2/2003 |
| CN | 1492684 A | 4/2004 |
| CN | 1910934 A | 2/2007 |
| CN | 104519354 A | 4/2015 |
| CN | 113806262 B | 5/2024 |
| EP | 1049280 A2 | 11/2000 |
| KR | 101419292 B1 | 7/2014 |
| KR | 20170124403 A | 11/2017 |
| KR | 102415309 B1 | 6/2022 |
| KR | 102507714 B1 | 3/2023 |

OTHER PUBLICATIONS

PCI Express Base Specification, Revision 4.0, Version 1.0, Sep. 27, 2017. PCI Express, 1293 pages.

Stumpf, M.F., "Analyzing the Real Jitter Performance of an SSC Clock." PCI SIG Developers Conference, 2018, 32 pages.

Mobin, M. et al., "PCIe Gen4 Standards Margin Assisted Outer Layer Equalization for Cross Lane Optimization in a 16GT/s PCIe Link", DesignCon 2017, 26 pages.

* cited by examiner

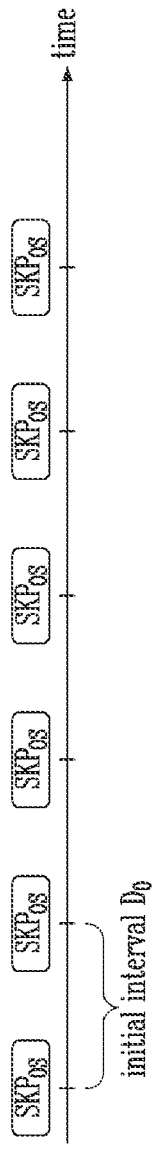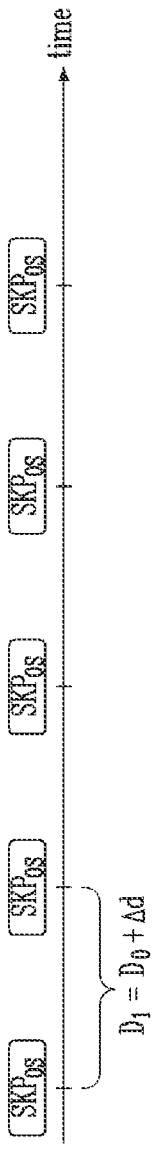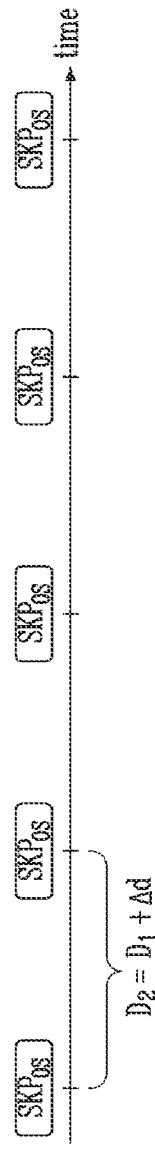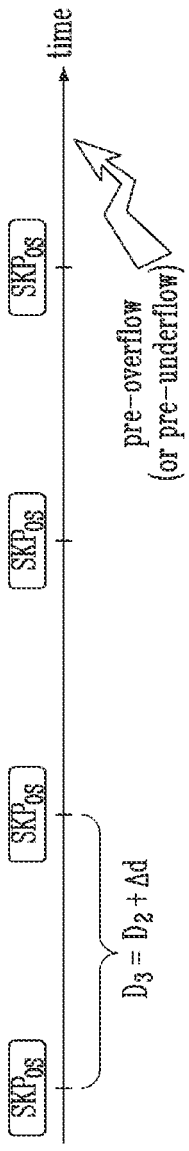

DEVICE AND COMPUTING SYSTEM INCLUDING THE DEVICE

CROSS-REFERENCE TO RELATED APPLICATION

This patent document is a divisional of, and claims the priority and benefits of, U.S. patent application Ser. No. 17/349,775 filed on Jun. 16, 2021 (U.S. Patent Application Publication No. US20210391973A1 published on Dec. 16, 2021), which claims the priority and benefits of Korean patent application number 10-2020-0073157 filed on Jun. 16, 2020, Korean patent application number 10-2021-0042642 filed on Apr. 1, 2021, and Korean patent application number 10-2021-0044151 filed on Apr. 5, 2021. The entire contents of each of the above-referenced application are incorporated by reference in this document in their entirety.

TECHNICAL FIELD

The embodiments of the disclosed technology relate to an electronic device, and more particularly, to an interface device and a method of operating the same.

BACKGROUND

Input/output interface provides a method for transferring information between two or more separate electronic components. Examples of the input/output interface include industry standard architecture (ISA), peripheral component interconnect (PCI), advanced graphics port (AGP), parallel advanced technology attachment (PATA), or serial advanced technology attachment (SATA). Recently, PCI express (PCIe) has been developed to replace the older bus standards. The PCIe has numerous improvements over the older standards, including higher bus bandwidth, less I/O pin number, smaller physical area and higher performance scalability.

SUMMARY

The embodiments of the disclosed technology provide an interface device capable of adaptively determining a transmission parameter based on a link characteristic.

In an embodiment of the disclosed technology, a method of operating an interface device including a first buffer and in communication with another interface device including a second buffer is provided. The method of operating the interface device includes initializing one or more parameters associated with clock signals for a data transmission or reception of the interface device, checking whether the interface device is in a predetermined mode for adjusting the one or more parameters, adjusting, upon determination that the interface device is in the predetermined mode, the one or more parameters associated with the clock signals of the interface device based on how much of the first buffer or the second buffer is filled with data, and performing the data transmission or reception based on the adjusted one or more parameters associated with the clock signals.

In an embodiment, adjusting the one or more parameters may include adjusting a clock frequency range of spread spectrum clocking scheme.

In an embodiment, adjusting the clock frequency range of the spread spectrum clocking scheme may include initializing the clock frequency range based on a fundamental frequency, adjusting the clock frequency range by a predetermined step value, performing the data transmission or reception based on the adjusted clock frequency range, and determining whether a pre-underflow or a pre-overflow is generated in at least one of the first buffer and the second buffer during the data transmission or reception.

In an embodiment, the method may further include selecting, upon determination that the pre-underflow or the pre-overflow is generated in the first buffer or the second buffer during the data transmission or reception, a currently applied clock frequency range as the clock frequency range of the spread spectrum clocking scheme.

In an embodiment, the method may further include re-adjusting, upon determination that neither the pre-underflow nor the pre-overflow is generated in at least one of the first buffer or the second buffer during the data transmission or reception, the clock frequency range by the step value, performing at least one of data transmission or reception based on the adjusted clock frequency range, and determining whether the pre-underflow or the pre-overflow is generated in at least one of the first buffer and the elastic buffer based on the data transmission or reception.

In an embodiment, adjusting the clock frequency range by the step value may include increasing the clock frequency range by the step value.

In an embodiment, adjusting the one or more parameters may include determining an interval for inserting a skip ordered-set into the transmission data.

In an embodiment, determining the interval for inserting the skip ordered-set into the transmission data may include initializing the interval for inserting the skip ordered-set, adjusting the interval by a predetermined step value, performing the data transmission or reception including the skip ordered-set based on the adjusted interval, and determining whether a pre-underflow or a pre-overflow is generated in at least one of the first buffer and the second buffer based on the data transmission or reception.

In an embodiment, the method may further include selecting, upon determination that the pre-underflow or the pre-overflow is generated in at least one of the first elastic buffer or the second elastic buffer, a current interval as the interval for inserting the skip ordered-set.

In an embodiment, adjusting the interval by the predetermined step value may include increasing the interval by the predetermined step value.

In an embodiment of the disclosed technology a method of operating an interface device including a first buffer and in communication with another interface device including a second buffer is provided. The method of operating the interface device includes initializing one or more parameters associated with clock signals for a data transmission or reception of the interface device, adjusting the one or more parameters by a step value, performing at least one of transmission or reception of data to and from the other interface device communicating with the interface device based on the adjusted one or more parameters, and determining whether a pre-underflow or a pre-overflow is generated in at least one of the first buffer and a second buffer included in the other interface device based on the transmission and reception of the data.

In an embodiment, the method may further include selecting, upon determination that the pre-underflow or the pre-overflow is generated in at least one of the first buffer and the second buffer, the current one or more parameters as an optimal transmission parameter.

In an embodiment, the method may further include re-adjusting, upon determination that neither the pre-underflow nor the pre-overflow is generated in at least one of the first buffer or the second buffer during the data transmission or reception, the transmission parameter by the step value, performing at least one of transmission or reception of the data to and from the other interface device based on the adjusted one or more parameters, and determining whether the pre-underflow or the pre-overflow is generated in at least one of the first buffer or the second buffer based on the transmission or reception of the data.

In an embodiment, the one or more parameters may include a clock frequency range of spread spectrum clocking scheme.

In an embodiment, the one or more parameters may include an interval for inserting a skip ordered-set into the transmission data.

In an embodiment of the disclosed technology, an interface device includes a receiver configured to receive data, a buffer in communication with the receiver and configured to store the received data, a buffer status monitor in communication with the buffer and configured to monitor a status of the buffer, a skip ordered-set generator configured to generate a skip ordered set to be inserted into transmission data, a transmitter in communication with the skip ordered-set generator and configured to output the transmission data and the skip ordered-set, a transmission clock generator configured to generate a transmission clock, and a spread spectrum clocking controller configured to control the transmission clock generator and control a clock frequency of a spread spectrum clocking scheme. The interface device determines at least one of a clock frequency range of the spread spectrum clocking scheme or an interval at which the skip ordered-set is generated, based on the status of the buffer and a status of another buffer included in another interface device communicating with the interface device.

In an embodiment, the buffer status monitor may transfer first status information indicating the status of the buffer to the spread spectrum clocking controller, the buffer may transfer second status information indicating the status of the other buffer included in the other interface device to the spread spectrum clocking controller, and the spread spectrum clocking controller may determine the clock frequency range of the spread spectrum clocking scheme based on the first status information and the second status information.

In an embodiment, the spread spectrum clocking controller may initialize the clock frequency range based on a fundamental frequency and adjust the clock frequency range by a step value, the transmitter may transmit data based on the adjusted clock frequency range, the receiver may receive data from the other interface device, and the spread spectrum clocking controller may determine whether a pre-underflow or a pre-overflow is generated in the first buffer or the second buffer based on the first status information and the second status information generated based on the transmission and reception of the data.

In an embodiment, the spread spectrum clocking controller may determine that a current clock frequency range as an optimal clock frequency range, when the pre-underflow or the pre-overflow is generated in the first buffer or the second buffer.

In an embodiment, when the pre-underflow or the pre-overflow is not generated in the first buffer or the second buffer, the spread spectrum clocking controller may re-adjust the clock frequency range by the step value, the transmitter may re-transmit data based on the re-adjusted clock frequency range, the receiver may re-receive data from the other interface device, and the spread spectrum clocking controller may determine whether the pre-underflow or the pre-overflow is generated in the first buffer or the second buffer based on the first status information and the second status information generated based on the transmission and reception of the data.

In an embodiment, the buffer status monitor may transfer first status information indicating the status of the buffer to the skip ordered-set generator, the buffer may transfer second status information indicating the status of the other buffer included in the other interface device to the skip ordered-set generator, and the skip ordered-set generator may determine an interval at which the skip OS is generated, based on the first status information and the second status information.

In an embodiment, the skip ordered-set generator may initialize the interval and adjust the interval by a step value, the transmitter may transmit data including the skip ordered-set generated based on the adjusted interval, the receiver may receive data from the other interface device, and the skip ordered-set generator may determine whether the pre-underflow or the pre-overflow is generated in the first buffer or the second buffer based on the first status information and the second status information generated based on the transmission and reception of the data.

In an embodiment, the skip ordered-set generator may select, upon determination that the pre-underflow or the pre-overflow is generated in the first buffer or the second buffer, a current interval as an optimal interval.

In an embodiment, upon determination that neither the pre-underflow nor the pre-overflow is generated in the first buffer or the second buffer, the skip ordered-set generator may re-adjust the interval by the step value, the transmitter may re-transmits data including the skip ordered-set generated based on the re-adjusted interval, the receiver may re-receive data from the other interface device, and the skip ordered-set generator may re-determine whether the pre-underflow or the pre-overflow is generated in the first buffer or the second buffer, based on the first status information and the second status information generated based on the transmission and reception of the data.

The embodiments of the disclosed technology relate to a peripheral component interconnect express (PCIe) device that can control a lane margining operation in an upstream port, and a computing system including the PCIe device.

In an embodiment of the disclosed technology, there is provided a device for performing communication between components in a computing system, the device including: an upstream port configured to receive data from or transmit data to one or more external devices located on an upstream path through a link including a plurality of lanes, the plurality of lanes including differential signaling pairs for receiving and transmitting data; a lane margining controller coupled to the upstream port and configured to transmit, via the upstream port, to the one or more external devices, a margin command for requesting a lane margining operation to acquire margin status information to indicate a margin of each of the plurality of lanes, and control the upstream port to receive the margin status information from the external devices; and a port setting controller coupled to be in communication with the upstream port to receive the margin status information and configured to determine a setting of the upstream port based on the margin status information.

In an embodiment of the disclosed technology, there is provided a computing system including: a first device including a downstream port and configured to receive and transmit data via the downstream port according to peripheral component interconnect express (PCIe) standard; and a second device including an upstream port connected to the downstream port of the first device through a link including a plurality of lanes, wherein the second device is configured to: receive and transmit data with the first device via the upstream port according to the peripheral component interconnect express (PCIe) standard, transmit a margin command to the first device through the upstream port, receive margin status information that indicates a margin of each of the plurality of lanes as a response to the margin command from the first device, and determine a setting of the upstream port based on the margin status information.

In an embodiment of the disclosed technology, there is provided a computing system including: a downstream port configured to interconnect components of the computing system in a downstream path; and an upstream port configured to interconnect components of the computing system in an upstream path and connected to the downstream port through a link including a plurality of lanes, wherein each of the downstream port and the upstream port is configured to: generate a margin command for requesting a lane margining operation to acquire margin status information to indicate a margin of each of the plurality of lanes, and transmit the margin command to the upstream port or the downstream port or receives the margin command from the downstream port.

Embodiments provide an improved peripheral component interconnect express (PCIe) interface and an interface system including the same.

In an embodiment of the disclosed technology, there is provided a device includes: a transceiver configured to transmit and receive data; and a skip ordered set (SKP OS) control logic in communication with the transceiver and configured to generate an SKP OS and control the transceiver to transmit the SKP OS and a data block to a link connecting to an external device and including a plurality of lanes, wherein the SKP OS control logic is configured to increase or decrease transmission interval of the SKP OS based on a transmission history of the SKP OS, in response to an entry of the link to a recovery state that is used to recover the link from an error.

In an embodiment of the disclosed technology, there is provided an interface system comprising: a first peripheral component interconnect express (PCIe) device and a second PCIe device coupled to communicate with the first PCIe device through a link including a plurality of lanes, wherein the first PCIe device is configured to generate a skip ordered set (SKP OS), and increase or decrease a transmission interval of the SKP OS based on a state of an elastic buffer of the second PCIe device in response to an entry of the link into a recovery state.

In an embodiment of the disclosed technology, there is provided a device, comprising: a transceiver configured to transmit and receive data, a lane margining controller in communication with the transceiver and configured to control the transceiver to transmit, through a margin command, to an external device, a request for requesting a state of an elastic buffer of the external device, and control the transceiver to receive the state of the elastic buffer of from the external device, and a port setting controller adjust a clock frequency range of a spread spectrum clocking scheme based on the state of the elastic buffer.

In an embodiment of the disclosed technology, there is provided a device, comprising: a transceiver configured to transmit and receive data, a lane margining controller in communication with the transceiver and configured to control the transceiver to transmit, through a margin command, to an external device, a request for requesting a state of an elastic buffer of the external device, and control the transceiver to receive the state of the elastic buffer of from the external device, and a port setting controller adjust a transmission interval of a skip ordered set based on the state of the elastic buffer.

In an embodiment of the disclosed technology, a computing system comprising: a first device configured to receive and transmit data according to peripheral component interconnect express (PCIe) standard, and a second device connected to the first device through a link including a plurality of lanes, wherein the second device is configured to: receive and transmit data with the first device according to the PCIe standard, transmit a margin command including a request for requesting a state of an elastic buffer of the first device to the first device, receive the state of the elastic buffer as a response to the margin command from the first device, and adjust one or more parameters associated with clock signals for a data transmission or reception based on the state of the elastic buffer.

In some embodiments of the disclosed technology, a method of operating an interface device including a first elastic buffer is provided. The method of operating the interface device includes performing a link equalization operation, checking a transmission mode of the interface device, and determining a transmission parameter of the interface device based on a status of the first elastic buffer or a status of a second elastic buffer included in another interface device communicating with the interface device when the transmission mode is a transmission parameter adjustment mode.

In some embodiments of the disclosed technology, a method of operating an interface device including a first elastic buffer is provided. The method of operating the interface device includes initializing a transmission parameter, changing the transmission parameter by a step value, transmitting and receiving data to and from another interface device communicating with the interface device based on the changed transmission parameter, and determining whether a pre-underflow or a pre-overflow is generated in at least one of the first elastic buffer and a second elastic buffer included in the other interface device according to the transmission and reception of the data.

In some embodiments of the disclosed technology, an interface device includes a receiver configured to receive data, an elastic buffer configured to store the received data, a buffer status monitor configured to monitor a status of the elastic buffer, a skip ordered-set (skip OS) generator configured to generate a skip OS inserted into transmitted data, a transmitter configured to output the transmission data and the skip OS, a transmission clock generator configured to generate a transmission clock, and a spread spectrum clocking (SSC) controller configured to control the transmission clock generator and control a clock frequency of SSC. The interface device determines at least one of a clock frequency range of the SSC and an interval at which the skip OS is generated, based on the status of the elastic buffer and a status of another elastic buffer included in another interface device communicating with the interface device.

In some embodiments of the disclosed technology, there is provided a PCIe interface connected to an external device through a link including a plurality of lanes, the PCIe interface including: a transceiver; and a skip ordered set (SKP OS) control logic configured to generate an SKP OS, and control the transceiver to transmit the SKP OS and a data block to the link, wherein the SKP OS control logic increases/decreases a transmission interval of the SKP OS, based on a transmission history of the SKP OS, in response to recovery state entrance.

In some embodiments of the disclosed technology, there is provided an interface system comprising: a first PCIe interface; and a second PCIe interface connected to the first PCIe interface through a link including a plurality of lanes, wherein the first PCIe interface generates an SKP OS, and increases/decreases a transmission interval of the SKP OS, based on a state of an elastic buffer of the second PCIe interface, when a connection state of the link enters into a recovery state.

In some embodiments of the disclosed technology, there is provided a PCIe device including: an upstream port connected to one or more external devices located on an upstream path through a link including a plurality of lanes; a lane margining controller configured to transmit, to the external devices, a margin command for requesting a lane margining operation of acquiring margin status information of each of the plurality of lanes, and control the upstream port to receive the margin status information from the external devices; and a port setting controller configured to determine a setting of the upstream port, based on the margin status information.

In some embodiments of the disclosed technology, there is provided a computing system including: a first PCIe device including a downstream port; and a second PCIe device configured to include an upstream port connected to the downstream port through a link including a plurality of lanes, transmit a margin command to the first PCIe device through the upstream port, receive margin status information of each of the plurality of lanes as a response to the margin command from the first PCIe device, and determine a setting of the upstream port, based on the margin status information.

In some embodiments of the disclosed technology, there is provided a computing system including: a downstream port; and an upstream port connected to the downstream port through a link including a plurality of lanes, wherein each of the downstream port and the upstream port generates a margin command for requesting a lane margining operation of acquiring margin status information of each of the plurality of lanes, and transmits the margin command to the upstream port or the downstream port or receives the margin command from the downstream port.

These and other features, aspects, and embodiments are described below.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIGS. 19A to 19D are graphs showing the steps shown in FIG. 16.

DETAILED DESCRIPTION

Specific structural or functional descriptions of embodiments disclosed in the present specification or application are illustrated only to describe example embodiments of the disclosed technology. The embodiments of the disclosed technology may be implemented in various forms and the descriptions are not limited to the embodiments described in the present specification or application.

In this patent document, the term "PCIe Device" may be used interchangeably with "PCIe System." In addition, the term "skip ordered set" may be used interchangeably with "SKP OS" or "control skip ordered set".

This patent document describes three main embodiments, and each main embodiment includes a plurality of embodiments. The main embodiments are described in detail through FIGS. 1 to 19D, FIGS. 20 to 32, and FIGS. 33 to 44, respectively.

1. Parameters Associated with Clock Signals Optimization

Figure 1:
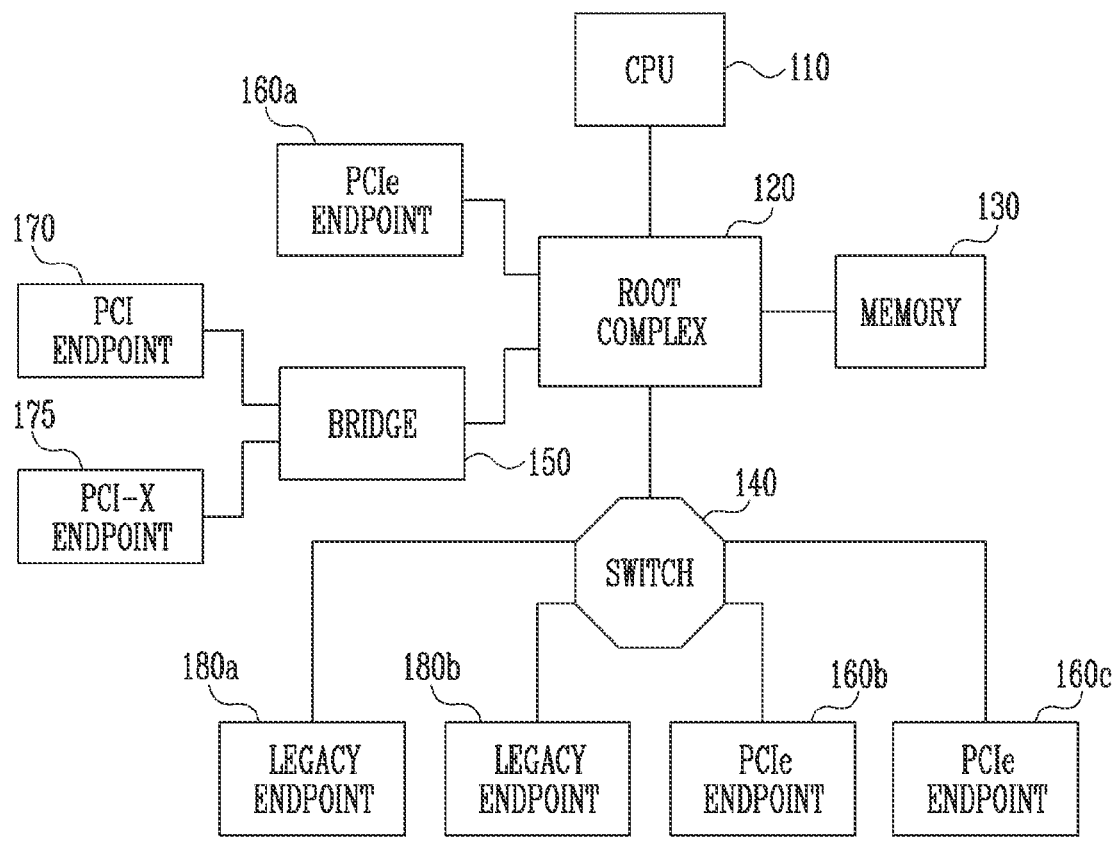
FIG. 1 is a diagram illustrating a fabric topology of interface devices.

FIG. 1 is a diagram illustrating a fabric topology of interface devices that shows a computing system including a plurality of input/output (I/O) hierarchies that connect interface devices.

Referring to FIG. 1, a CPU 110 and a memory 130 may be electrically or communicatively connected to a root complex 120. The CPU 110 may be a main processing unit of the computing system. The memory 130 may be a main memory of the computing system. In an embodiment, the memory 130 may include a random access memory (RAM).

In this patent document, the abbreviation "RC" is used to indicate the root complex 120. The root complex 120 serves to connect a sub system including the CPU 110 and the memory 130 to input/output interfaces. The root complex 120 may support one or more ports of one or more interface devices. The port may refer to a software and/or hardware part for connecting an interface device to a link. The port may include a transmitter and a receiver. The port may be divided into any one of an upstream port or a downstream port. The upstream port may be a port toward the root complex, and the downstream port may be a port toward an endpoint from the root complex. Therefore, the root complex 120 may include the downstream port and the endpoint may include the upstream port.

A hierarchy may refer to a network or fabric of all devices and links electrically or communicatively connected to the root complex 120. The hierarchy may be directly connected to the endpoints through the port or indirectly connected to the endpoints through a switch or a bridge. In FIG. 1, the endpoints 160a, 160b, 160c, 170, 175, 180a, and 180b, the switch 140, and the bridges 150 connected to the root complex 120 form one hierarchy. In some implementations, a hierarchy domain may include devices and links connected to one port of the root complex 120. For example, based on FIG. 1, the root complex 120 is connected to three hierarchy domains. A first hierarchy domain may include a PCIe endpoint 160a.

An endpoint includes a device that is used to carry out transactions, other than the root complex 120, the switch 140, and the bridge 150. In an embodiment, the endpoint may include peripheral devices such as Ethernet, a USB or a graphics device. The endpoint may initiate a transaction as a requester or respond to the transaction as a completer. The endpoint may be a device or a component positioned at the lowest position of an input/output hierarchy connected to the CPU 110 and the memory 130.

An input/output hierarchy domain connecting the interface devices to the root complex 120 may include at least one endpoint. As an example, the PCIe endpoint 160a of FIG. 1 may form an input/output hierarchy domain directly connected to the root complex 120. The PCI endpoint 170 and the PCI-X endpoint 175 may form an input/output hierarchy domain connected to the root complex 120 through the bridge 150. The legacy endpoints 180a and 180b and the PCIe endpoints 160b and 160c may form an input/output hierarchy domain connected to the root complex 120 through the switch 140.

The switch 140 is a device capable of connecting a plurality of endpoints to a single root port of the root complex 120. The switch 140 may include one upstream port and a plurality of downstream ports. In FIG. 1, the switch 140 has two legacy endpoints 180a and 180b and two PCIe endpoints 160b and 160c connected to the root complex 120 through the switch 140. In this case, the legacy endpoints 180a and 180b and the PCIe endpoints 160b and 160c may be connected to the downstream port of the switch 140. In some implementations, the root complex 120 may be connected to the upstream port of the switch 140.

The bridge 150 may connect a PCI or a PCI-X structure and a PCIe fabric.

The switch 140 or the bridge 150 may transfer a packet or a message through an upstream port, that is, from the endpoints 160a, 160b, 160c, 170, 175, 180a, and 180b to the root complex 120. In some implementations, the switch 140 or the bridge 150 may transfer the packet or the message through a downstream port, that is, from the root complex 120 to the endpoints 160a, 160b, 160c, 170, 175, 180a, and 180b.

The interface device based on embodiments of the disclosed technology may be any one of the root complex 120, the PCIe endpoints 160a, 160b, and 160c, the switch 140, and the bridge 150 shown in FIG. 1. The interface device based on an embodiment of the disclosed technology may adaptively determine a transmission parameter based on a status of an elastic buffer. Accordingly, data transmission efficiency of a link connecting the interface devices may be improved.

Figure 2:
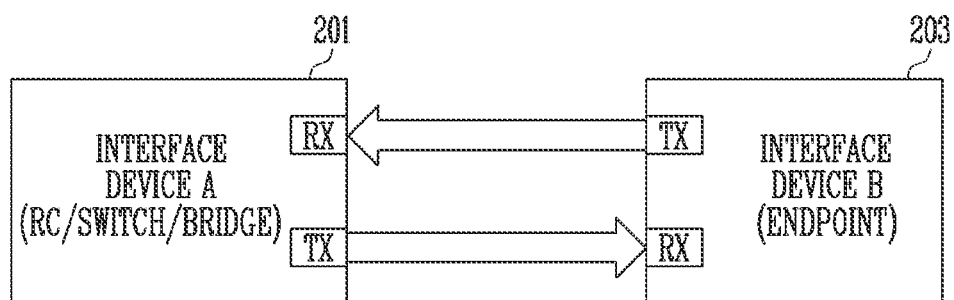
FIG. 2 is a diagram illustrating a link between the interface devices.

FIG. 2 is a diagram illustrating the link between the interface devices, showing a link between an interface device A 201 and an interface device B 203. One of the interface device A 201 and the interface device B 203 may be the root complex 120 of FIG. 1, and the other may be one of the end points 160a, 160b, 160c, 170, 175, 180a, and 180b of FIG. 1. In some implementations, as shown in FIG. 2, the interface device A 201 may be any one of a root complex RC, a switch, and a bridge. In addition, the interface device B 203 may be an endpoint. Each of the interface device A 201 and the interface device B 203 includes a transmitter TX and a receiver RX. Data may be transferred from the transmitter TX of the interface device A 201 to the receiver RX of the interface device B 203, and data may be transferred from the transmitter TX of the interface device B 203 to the receiver RX of the interface device A 201. When the interface devices A and B 201 and 203 are configured as a PCIe device, the link between the interface devices A and B 201 and 203 may be configured of ×1, ×2, ×4, ×8, ×12, ×16 or ×32 point-to-point link. For example, the ×1 point-to-point link may include one lane, and the ×32 point-to-point link may include 32 lanes. The one lane may include two differential pairs with one transmission channel and one reception channel. Referring to FIG. 2, an embodiment in which the interface devices A and B 201 and 203 are connected by the ×1 point-to-point link is shown. During a hardware initialization period, a link initialization operation may be performed. The interface devices A and B 201 and 203 may exchange a data packet through the link. A data bandwidth between the interface devices 201 and 203 may be extended by adding a lane.

Figure 3:
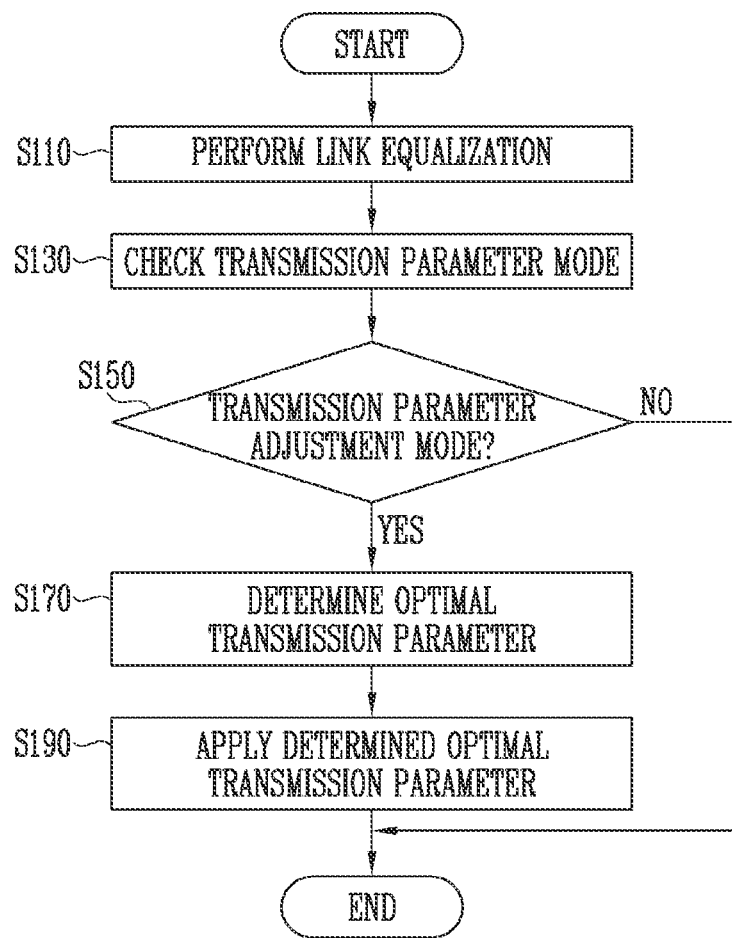
FIG. 3 is a flowchart illustrating a method of operating an interface device based on an embodiment of the disclosed technology.

FIG. 3 is a flowchart illustrating a method of operating an interface device based on an embodiment of the disclosed technology. More specifically, FIG. 3 shows a flowchart for performing a link initialization operation between interface devices based on an embodiment of the disclosed technology.

Referring to FIG. 3, a method of operating an interface device may include performing link equalization (S110), checking a transmission parameter mode (S130), when the transmission parameter mode is a transmission parameter adjustment mode (S150: Yes), determining an optimal transmission parameter (S170), and applying the determined optimal transmission parameter (S190). In the context of this patent document, the word "optimal" that is used in conjunction with certain parameters or ranges of values can be used to indicate values or conditions that provide a better performance for the devices discussed in this patent document. In this sense, the word "optimal" may or may not convey the best possible performance achievable by the devices.

At S110, the link equalization is performed. The link equalization is an operation of initializing various parameters related to a layer, a port, and a link of the interface device so that the link may perform a normal packet exchange from a time point when the device is powered on or from a time point when the interface device or a system including the interface device resets its parameters. The link equalization operation may be initiated by hardware, and may be managed by a link training & status state machine (LTSSM). In some implementations, the LTSSM may include 11 statuses (L0, L0s L1, L2, configuration, polling, detect, disabled, hot reset, loopback, and recovery). The link equalization may include phase 0 to phase 3. In the phase 0, data transmission starts at an initial speed, and a preset value for transmission speed conversion may be exchanged. In the phase 1, two interface devices connected to the link may share each other's equalization capability. In the phase 2, an upstream port may adjust a transmitter setting of a downstream port together with an own receiver setting. In the phase 3, the downstream port may adjust a transmitter setting of the upstream port together with an own receiver setting.

At S130, the interface device may check the transmission parameter mode. In an embodiment of the disclosed technology, the interface device may adaptively determine the transmission parameter or use a predetermined transmission parameter based on the transmission parameter mode.

At S150, it is determined whether the transmission parameter mode is the transmission parameter adjustment mode. When the transmission parameter mode is not the transmission parameter adjustment mode (S150: No), the interface device may use the predetermined transmission parameter, terminating the link initialization operation between the interface devices.

When the transmission parameter mode is the transmission parameter adjustment mode (S150: Yes), the interface device may adaptively determine the transmission parameter. Accordingly, the method proceeds to step S170 to determine an optimal transmission parameter.

At S170, the optimal transmission parameter is determined. As an example, in step S170, a clock frequency range used for spread spectrum clocking (SSC) may be determined. In the context of this patent document, the term "SSC range" can be used to indicate the clock frequency range used for spread spectrum clocking (SSC). In clock signals, the energy concentrates in a certain frequency and thus a potential electromagnetic interference (EMI) issue arises. The spread spectrum clocking (SSC) may reduce the radiated emissions of clock signals by varying the frequency of the clock signals such that the peak amplitude of the clock signals can be reduced by shifting the frequency. When transmitting and receiving data using the SSC, a characteristic against electromagnetic interference (EMI) may be improved. An EMI characteristic is improved as the SSC range becomes wide. In a typical case, an SSC range fixed in advance is set to perform an SSC operation based the SSC range, and when the SSC range is set to be excessively wide, transmission and reception performance may be deteriorated. In an interface device and a method of operating the interface device based on an embodiment of the disclosed technology, an optimal SSC range may be determined based on the link characteristic between the interface devices, rather than using a fixed SSC range. Accordingly, transmission and reception performance may be improved while maintaining an EMI characteristic at a certain desired level.

In another embodiment of the disclosed technology, at S170, an interval at which a skip ordered-set (skip OS) is inserted between transmission data may be determined. The transmitter TX of the interface device is configured to transmit data by periodically inserting the skip OS to prevent an overflow or an underflow from occurring in an elastic buffer of the receiver RX. An elastic buffer is a first-in-first-out (FIFO) buffer that can have different rates between the input and the output so as to elastically compensate for a difference in the input and output rates. When the elastic buffer of the receiver approaches an overflow status, the overflow may be reduced or minimized by preventing at least a portion of the received skip OS from being input to the elastic buffer. When the elastic buffer of the receiver approaches an underflow status, the underflow may be reduced or minimized by inputting the received skip OS to the elastic buffer. When the insertion interval of the skip OS is relatively short, the overflow or the underflow of the elastic buffer may not be generated, but data transmission efficiency is reduced. On the other hand, when the insertion interval of the skip OS is relatively long, the data transmission efficiency may be improved, but a possibility of the overflow or the underflow of the elastic buffer may be increased. In some implementations, a skip OS interval that is fixed in advance is set to perform data transmission based the skip OS interval, and when the skip OS interval is set to be excessively short, transmission and reception performance may be reduced. In an interface device and a method of operating the interface device based on an embodiment of the disclosed technology, an optimal skip OS interval may be determined based on the link characteristic between the interface devices, rather than using a fixed skip OS interval. Accordingly, transmission and reception performance may be improved while maintaining an EMI characteristic at a certain desired level.

At S190, the determined optimal transmission parameter may be applied. Therefore, the link initialization operation may be completed.

Figure 4:
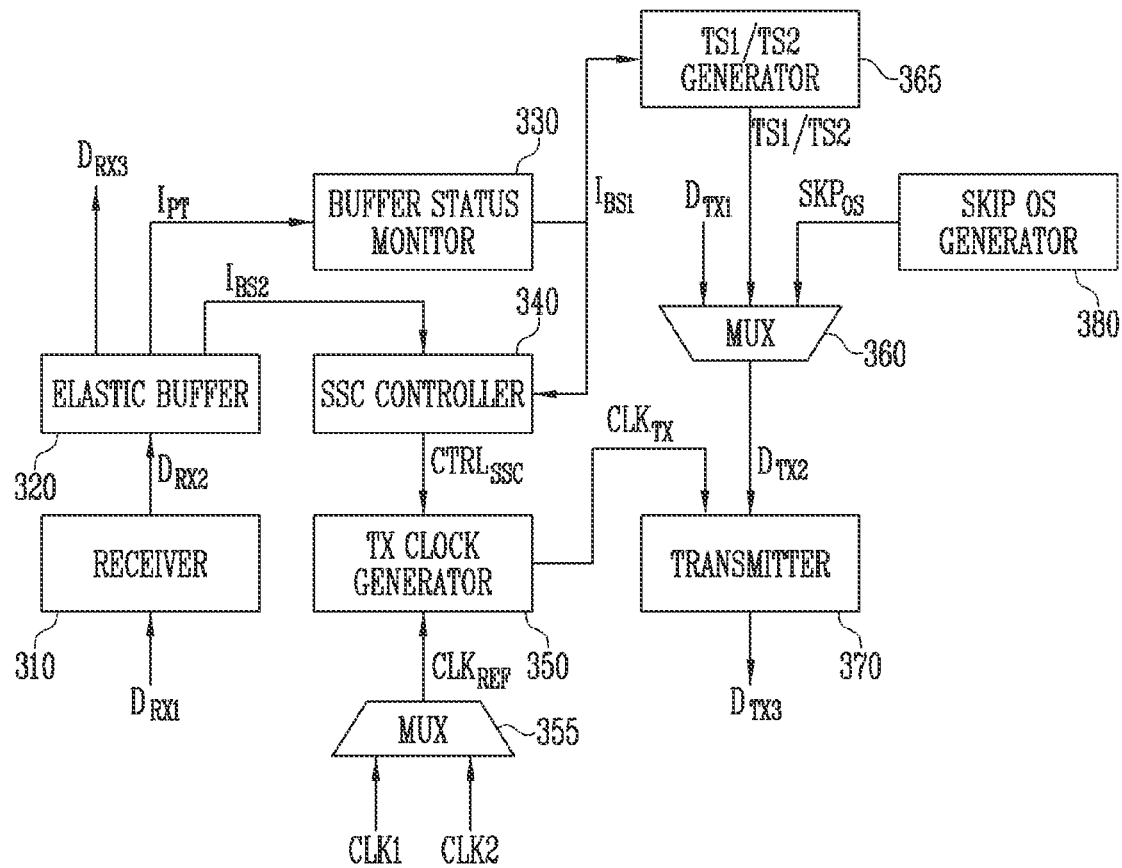
FIG. 4 is a block diagram illustrating an interface device 300a based on an embodiment of the disclosed technology.

FIG. 4 is a block diagram illustrating an interface device 300a based on an embodiment of the disclosed technology. Referring to FIG. 4, the interface device 300a may include a receiver 310, an elastic buffer 320, a buffer status monitor 330, an SSC controller 340, a transmission clock generator 350, MUXes 355 and 360, TS1/TS2 generator 365, a transmitter 370, and a skip OS generator 380.

The receiver 310 receives data $D_{RX1}$ through a link. The receiver 310 may include a deserializer, a descrambler, a clock data recovery (CDR), and the like. The receiver 310 may generate and output data $D_{RX2}$ based on the data $D_{RX1}$. As an example, the data $D_{RX1}$ may be serial data, and the data $D_{RX2}$ may be parallel data.

The data $D_{RX2}$ may be transferred to the elastic buffer 320. The elastic buffer 320 may temporarily store the data $D_{RX2}$ and transfer data DRX3 to an inner core (not shown) of the interface device 300a.

In some implementations, pointer information $I_{PT}$ of the elastic buffer 320 may be transferred to the buffer status monitor 330. The pointer information $I_{PT}$ of the elastic buffer 320 may be used to indicate a position of the last data in the elastic buffer 320 implemented in a FIFO form. A status of the elastic buffer 320 may be determined based on the pointer information $I_{PT}$, and thus first buffer status information $I_{BS1}$ may be generated. The first buffer status information $I_{BS1}$ is used to indicate the status of the elastic buffer 320 included in the interface device 300a. Determining the status of the elastic buffer 320 based on the pointer information $I_{PT}$ will be described later with reference to FIGS. 5A to 8C.

In some implementations, second buffer status information $I_{BS2}$ may be transferred from the elastic buffer 320 to the SSC controller 340. The second buffer status information $I_{BS2}$ may include information on an elastic buffer status of another interface device communicating with the interface device 300a. In this case, the second buffer status information $I_{BS2}$ may be received by the receiver 310 as the data $D_{RX1}$. For example, when the interface device 300a shown in FIG. 4 is the interface device A (201) of FIG. 2, the second buffer status information $I_{BS2}$ may include information on status of the elastic buffer included in the interface device B 203. In this case, the second buffer status information $I_{BS2}$ may be transferred from the transmitter TX of the interface device B 203 to the receiver RX of the interface device A.

The SSC controller 340 receives the first buffer status information $I_{BS1}$ and the second buffer status information $I_{BS2}$ to generate an SSC control signal $CTRL_{SSC}$. That is, the SSC controller 340 controls an SSC operation based on the first buffer status information $I_{BS1}$ indicating the status of the elastic buffer 320 inside the interface device 300a and second buffer status information $I_{BS2}$ indicating the status of the elastic buffer included in another external interface device. To this end, the SSC controller 340 generates the SSC control signal $CTRL_{SSC}$ for controlling the transmission clock generator 350.

In some implementations, the TS1/TS2 generator 365 may generate a TS1 ordered-set TS1 OS and a TS2 ordered-set TS2 OS based on the first buffer status information $I_{BS1}$. The generated TS1 OS and the TS2 OS may be transferred to the MUX 360. The TS1 OS or the TS2 OS may be transferred to the other interface device, and an SSC range of a corresponding interface device may be adjusted.

The transmission clock generator 350 receives the SSC control signal $CTRL_{SSC}$ from the SSC controller 340. In addition, the transmission clock generator 350 receives a reference clock $CLK_{REF}$. The reference clock $CLK_{REF}$ may be received from the MUX 355. The MUX 355 may select any one of a first clock CLK1 and a second clock CLk2 and transfer the selected clock to the transmission clock generator 350 as the reference clock $CLK_{REF}$. As an example, the first clock CLK1 may be a reference clock received from the outside of the interface device 300a. In this case, the first clock CLK1 may be a 100 MHz reference clock received from the host. As an example, the second clock CLK2 may be a reference clock generated from an internal clock generator (not shown) of the interface device 300a. In this case, the second clock CLK2 may be an internal reference clock used for a separate reference clock with independent SSC (SRIS) mode or a separate reference clock with no SSC (SRNS) mode. The transmission clock generator 350 may generate a transmission clock $CLK_{TX}$ in which a spectrum is spread based on the reference clock $CLK_{REF}$, based on the SSC control signal $CTRL_{SSC}$. At this time, an SSC range of the transmission clock $CLK_{TX}$ may be determined by the SSC controller 340. The transmission clock $CLK_{TX}$ may be transferred to the transmitter 370.

In some implementations, the buffer status monitor 330 may transfer the first buffer status information $I_{BS1}$ to the MUX 360. The MUX 360 may receive the data $D_{TX1}$ from the inner core (not shown) of the interface device 300a in addition to the first buffer status information $I_{BS1}$. In addition, the MUX 360 may receive the skip OS $SKP_{OS}$ from the skip OS generator 380. In addition, the MUX 360 may receive the TS1 OS or the TS2 OS from the TS1/TS2 generator 365. The MUX 360 may multiplex the first buffer status information $I_{BS1}$, the data $D_{TX1}$, the TS1 OS, the TS2 OS, and the skip OS $SKP_{OS}$ and transmit the data $D_{TX2}$ to the transmitter 370. That is, as well as the data $D_{TX1}$ transferred from the inner core, the first buffer status information $I_{BS1}$ received from the buffer status monitor 330, the TS1 OS or the TS2 OS received from the TS1/TS2 generator 365, the skip OS $SKP_{OS}$ received from the skip OS generator 380 may also be transferred to the transmitter 370 as the data $D_{TX2}$.

The transmitter 370 may receive the data $D_{TX2}$ and the transmission clock $CLK_{TX}$ and generate the data $D_{TX3}$ based on the data $D_{TX2}$ and the transmission clock $CLK_{TX}$. The transmitter 370 may include a serializer, a scrambler, and the like. As an example, the data $D_{TX2}$ may be parallel data, and the data $D_{TX3}$ may be serial data output based on the transmission clock $CLK_{TX}$. The generated data $D_{TX3}$ may be transferred to the other interface device connected through the link.

As described above, the interface device 330a based on an embodiment of the disclosed technology may determine the SSC range based on the first buffer status information $I_{BS1}$ indicating the status of own elastic buffer or the second buffer status information $I_{BS2}$ indicating the status of elastic buffer included in the other interface device 330a connected through the link. Accordingly, the SSC range used for data transmission and reception may be adaptively determined based on a link characteristic.

FIGS. 5A to 5J are diagrams illustrating an operation and the status of the elastic buffer. FIGS. 5A to 5J schematically show storage areas of the elastic buffer 320 implemented as a FIFO buffer.

In FIGS. 5A to 5J, an empty area and an area in which a data symbol is stored are distinguished and displayed among a plurality of areas in the elastic buffer 320. That is, the area in which the data symbol is stored in the elastic buffer 320 is shown as a hatched area.

Figure 5A:
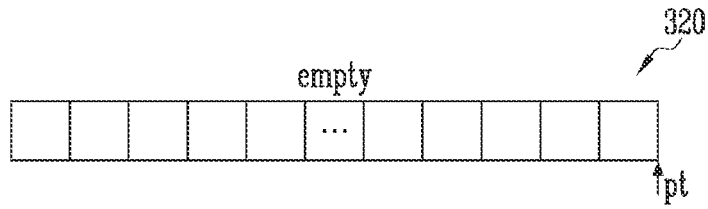
FIGS. 5A to 5J are diagrams illustrating an operation and a status of an elastic buffer.

Referring to FIG. 5A, the elastic buffer 320 of an empty status is schematically shown. In this case, a pointer pt of the elastic buffer may indicate the rightmost position of the elastic buffer.

In FIGS. 5B to 5F, a situation in which the data symbol is successively input to the elastic buffer 320 is shown. Input and output are performed in real time in the elastic buffer 320. However, for convenience of discussion, in FIGS. 5B to 5F, the elastic buffer of a case where only the input is performed without the output of the data symbol is shown.

Figure 5B:
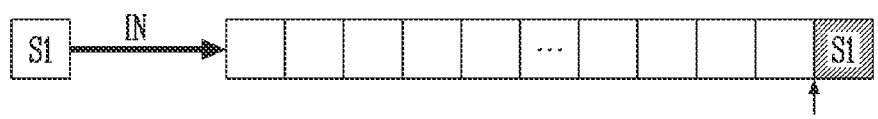

Referring to FIG. 5B, a first symbol S1 configuring data is input to the elastic buffer 320. The input first symbol S1 may be stored to the rightmost side of the plurality of areas of the elastic buffer 320. As the first symbol S1 is stored, the pointer pt of the elastic buffer may indicate a position moved from the rightmost position of the elastic buffer to the left by one section.

Figure 5C:
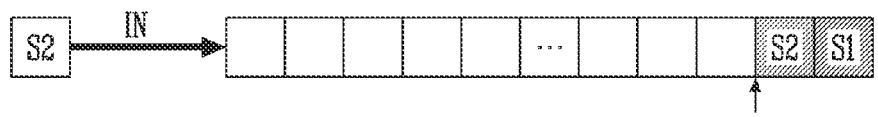

Referring to FIG. 5C, a second symbol S2 configuring the data is input to the elastic buffer 320. The input second symbol S2 may be stored in a left area of the first symbol S1 which is first input among the plurality of areas of the elastic buffer 320. As the second symbol S2 is stored, the pointer pt of the elastic buffer may indicate a position moved from the previously indicated position to the left by one section.

Figure 5D:
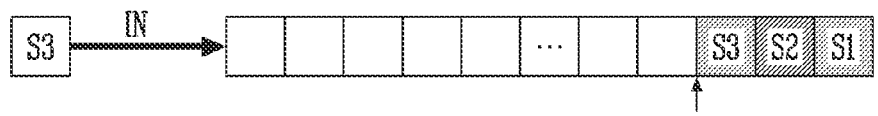

Referring to FIG. 5D, a third symbol S3 configuring the data is input to the elastic buffer 320. The input third symbol S3 may be stored in a left area of the second symbol S2 which is first input among the plurality of areas of the elastic buffer 320. As the third symbol S3 is stored, the pointer pt of the elastic buffer may indicate a position moved from the previously indicated position to the left by one section.

Figure 5E:

In such a method, when the data symbols are successively input, symbols may be sequentially stored in the areas of the elastic buffer 320. Referring to FIG. 5E, an 1-th symbol S1 configuring the data is input to the elastic buffer 320. The input 1-th symbol S1 may be stored in a left area of a k-th symbol Sk which is first input among the plurality of areas of the elastic buffer 320. As the 1-th symbol S1 is stored, the pointer pt of the elastic buffer may indicate a position moved from the previously indicated position to the left by one section.

Figure 5F:
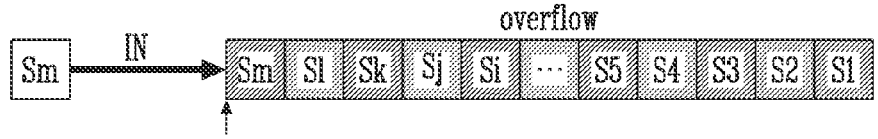

Referring to FIG. 5F, an m-th symbol Sm configuring the data is input to the elastic buffer 320. The input m-th symbol S1 may be stored in a left area of the 1-th symbol S1 which is first input among the plurality of areas of the elastic buffer 320. As the m-th symbol Sm is stored, the pointer pt of the elastic buffer may indicate a position moved from the previously indicated position to the left by one section.

In FIG. 5F, the data symbols are stored in all areas of the elastic buffer 320. Accordingly, the elastic buffer 320 is in an overflow status, and the pointer pt of the elastic buffer may indicate the leftmost position of the elastic buffer.

In FIGS. 5B to 5F, an overflow of the elastic buffer that occurs when only the input is performed without the output of the data symbol is shown. However, even though the output and the input of the data symbol are performed together, the overflow of the elastic buffer may occur even in a case where an input frequency of the data symbol is greater than an output frequency.

Figure 5G:
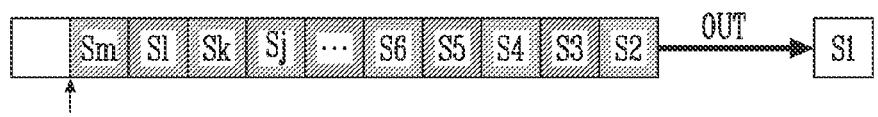

In FIGS. 5G to 5J, a situation in which the data symbols are successively output from the elastic buffer 320 is shown. Referring to FIG. 5G, the symbol S1 which is first input among the data symbols stored in the elastic buffer 320 is output. As the first symbol S1 is output, storage positions of the second to m-th symbols may be moved to the right by one section, respectively. As the first symbol S1 is output, the pointer pt of the elastic buffer may indicate a position moved from the leftmost position of the elastic buffer to the right by one section.

Figure 5H:
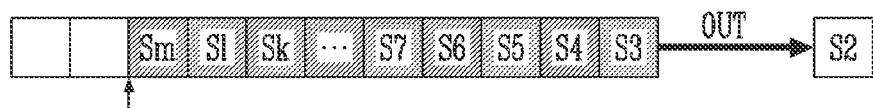

Referring to FIG. 5H, the symbol S2 which is first input among the data symbols stored in the elastic buffer 320 is output. As the second symbol S2 is output, storage positions of the third to m-th symbols may be moved to the right by one section, respectively. As the second symbol S2 is output, the pointer pt of the elastic buffer may indicate a position moved from the previously indicated position to the right by one section. In such a method, when the data symbols are successively output, the storage positions of the data symbols stored in the elastic buffer 320 may be moved to the right by one section.

Figure 5I:
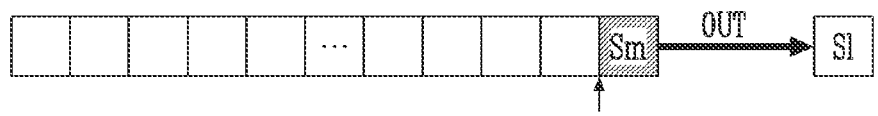

Referring to FIG. 5I, the 1-th symbol S1 among the data symbols stored in the elastic buffer 320 is output. As the 1-th symbol S1 is output, the storage position of the m-th symbol may be moved to the right by one section. As the 1-th symbol S1 is output, the pointer pt of the elastic buffer may indicate a position moved from the previously indicated position to the right by one section.

Figure 5J:
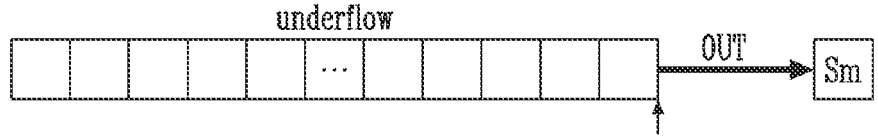

Finally, referring to FIG. 5J, the m-th symbol Sm, which is the last symbol among the data symbols stored in the elastic buffer 320, is output. As the m-th symbol Sm is output and all areas of the elastic buffer 320 are empty, the elastic buffer 320 is in an underflow status. In some implementations, the pointer pt may indicate the rightmost position of the elastic buffer 320.

FIGS. 5G to 5J show the underflow of the elastic buffer, which occurs when only the output is performed without the input of the data symbol. However, even though the output and the input of the data symbol are performed together, the underflow of the elastic buffer may occur even in a case where the output frequency of the data symbol is greater than the input frequency.

Figure 6A:
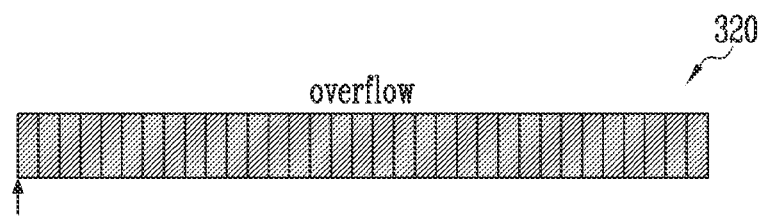
FIG. 6A illustrates an example of an overflow of the elastic buffer and FIG. 6B illustrates an example of an underflow of the elastic buffer.
Figure 6B:
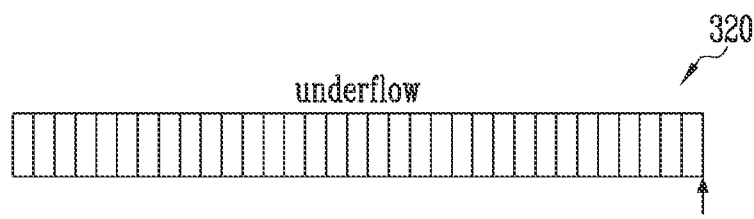

FIG. 6A illustrates an example of the overflow of the elastic buffer and FIG. 6B illustrates an example of the underflow of the elastic buffer. As described above, when data symbols are stored in all of the plurality of areas of the elastic buffer 320, the elastic buffer 320 is in the overflow status. Referring to FIG. 6A, when the elastic buffer 320 is in the overflow status, the pointer indicates the leftmost position of the elastic buffer 320.

In some implementations, when no data symbol is stored in the plurality of areas of the elastic buffer 320, the elastic buffer 320 is in the underflow status. Referring to FIG. 6B, when the elastic buffer 320 is in the underflow status, the pointer indicates the rightmost position of the elastic buffer 320.

As shown in FIGS. 6A and 6B, it may be determined whether the elastic buffer 320 is currently in the overflow status, the underflow status, or a normal status, based on a position indicated by the pointer of the elastic buffer 320.

Figure 7:
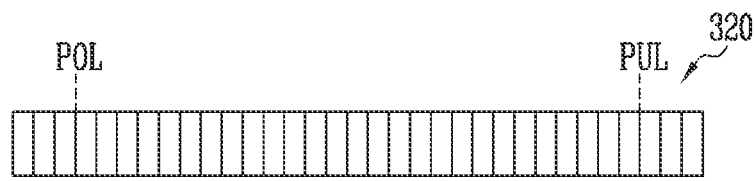
FIG. 7 is a diagram illustrating a pre-overflow limit and a pre-underflow limit of the elastic buffer.

FIG. 7 is a diagram illustrating a pre-overflow limit (POL) and a pre-underflow limit (PUL) of the elastic buffer. Based on an embodiment of the disclosed technology, in addition to the overflow and underflow statuses of the elastic buffer 320, pre-overflow and pre-underflow statuses may be defined. The pre-overflow status may mean that the elastic buffer 320 is currently close to the overflow status. The pre-underflow status may mean that the elastic buffer 320 is currently close to the underflow status. Based on an embodiment of the disclosed technology, the pre-overflow limit POL may be determined in advance to define the pre-overflow status of the elastic buffer 320. In some implementations, based on an embodiment of the disclosed technology, the pre-underflow limit PUL may be determined in advance to define the pre-underflow status of the elastic buffer 320.

Figure 8A:
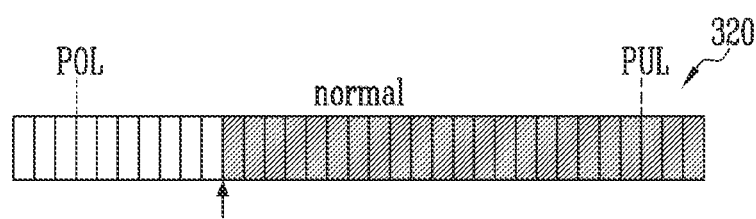
FIG. 8A illustrates an example of a normal status of the elastic buffer.
Figure 8B:
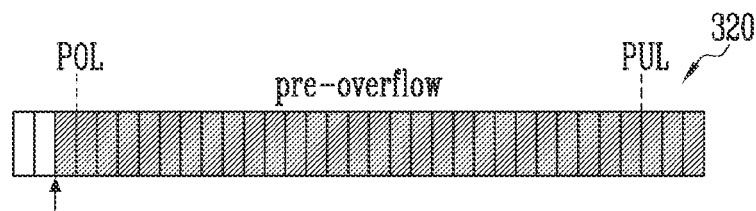
FIG. 8B illustrates an example of a pre-overflow status of the elastic buffer.
Figure 8C:
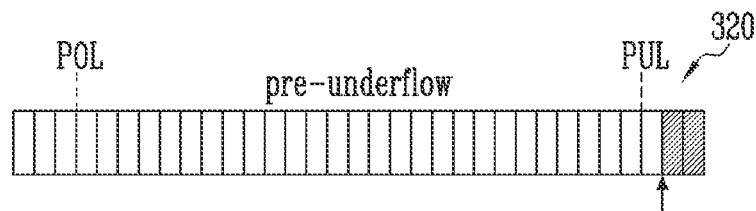
FIG. 8C illustrates an example of a pre-underflow status of the elastic buffer.

FIG. 8A illustrates an example of the normal status of the elastic buffer, FIG. 8B illustrates an example of the pre-overflow status of the elastic buffer, and FIG. 8C illustrates an example of the pre-underflow status of the elastic buffer.

Referring to FIG. 8a, the elastic buffer 320 of the normal status is shown. When the position of the pointer indicating the area in which the last data symbol is stored in the elastic buffer 320 is between the pre-overflow limit POL and the pre-underflow limit PUL, the current status of the elastic buffer 320 becomes the normal status.

Referring to FIG. 8B, the elastic buffer 320 of the pre-overflow status is shown. When the position of the pointer indicating the area in which the last data symbol is stored in the elastic buffer 320 is present at the pre-overflow limit POL or to the left of the pre-overflow limit POL, the current status of the elastic buffer 320 becomes the pre-overflow status. When the data symbol is continuously stored and the position of the pointer reaches the leftmost side of the elastic buffer 320 in the pre-overflow status, the status of the elastic buffer 320 may be switched from the pre-overflow status to the overflow status.

Referring to FIG. 8C, the elastic buffer 320 of the pre-underflow status is shown. When the position of the pointer indicating the area in which the last data symbol is stored in the elastic buffer 320 is present at the pre-underflow limit PUL or to the right of the pre-underflow limit PUL, the current status of the elastic buffer 320 becomes the pre-underflow status. When the data symbol is continuously output and the position of the pointer reaches the rightmost side of the elastic buffer 320 in the pre-underflow status, the status of the elastic buffer 320 may be switched from the pre-underflow status to the underflow status.

As described with reference to FIGS. 6A to 8C, the current status of the elastic buffer 320 may be determined by referring to the position of the pointer indicating the area in which the last data symbol is stored in the elastic buffer 320. That is, based on the position indicated by the pointer in the elastic buffer 320, the elastic buffer 320 is determined as any one of the overflow status, the pre-overflow status, the normal status, the pre-underflow status, and the underflow status.

Figure 9:
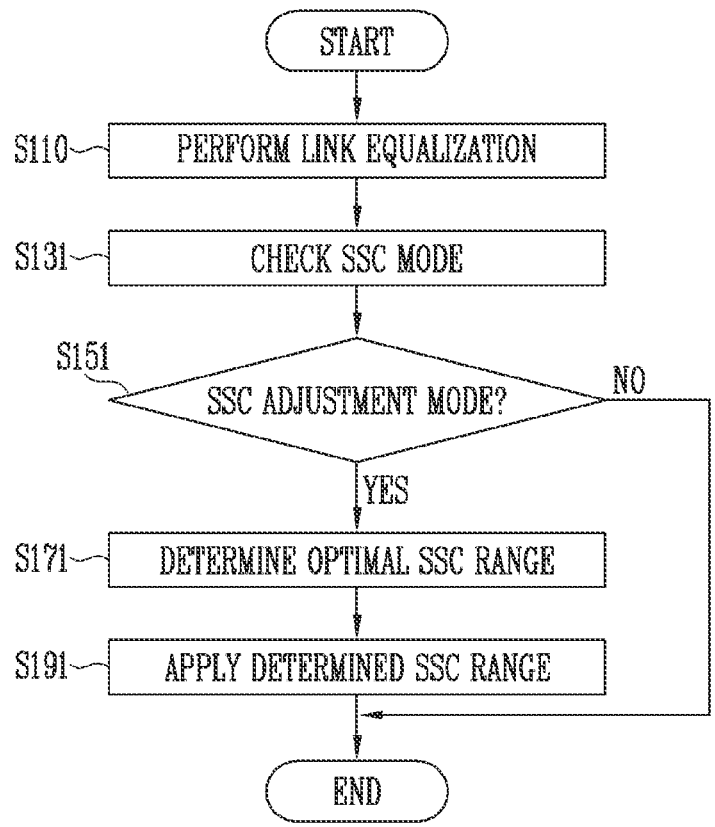
FIG. 9 is a flowchart illustrating a method of operating an interface device based on an embodiment of the disclosed technology.

FIG. 9 is a flowchart illustrating a method of operating an interface device based on an embodiment of the disclosed technology. More specifically, FIG. 9 shows a flowchart for performing a link initialization operation between interface devices based on an embodiment of the disclosed technology.

Referring to FIG. 9, a method of operating an interface device may include performing link equalization (S110), checking an SSC mode (S131), when the SSC mode is an SSC adjustment mode (S151: Yes), determining an optimal SSC range (S171), and applying the determined SSC range (S191).

In step S110, the link equalization is performed. Step S110 of FIG. 9 may be substantially the same as step S110 of FIG. 3. Therefore, repetitive description is omitted.

At S131, the interface device may check the SSC mode. Based on an embodiment of the disclosed technology, the interface device may adaptively determine the SSC range or use a predetermined SSC range based on the SSC mode.

At S151, it is determined whether the SSC mode is the "SSC adjustment mode". When the SSC mode is not the "SSC adjustment mode" (S151: No), the interface device may use the predetermined SSC range. Accordingly, the link initialization operation between the interface devices is ended.

When the SSC mode is the "SSC adjustment mode" (S151: Yes), the interface device may adaptively determine the SSC range. Accordingly, the method proceeds to step S171 to determine the optimal SSC range.

At S171, the optimal SSC range is determined. More specifically, in step S171, a clock frequency range used for spread spectrum clocking (SSC), that is, an "SSC range" may be determined. In an interface device and a method of operating the same based on an embodiment of the disclosed technology, the optimal SSC range may be determined based on the characteristics of the link between the interface devices, rather than using a fixed SSC range. Accordingly, transmission and reception performance may be improved while maintaining an EMI characteristic at a certain desired level. A detailed method of determining the optimal SSC range will be described later with reference to FIGS. 10 to 13.

At S191, the determined SSC range may be applied. Therefore, the link initialization operation may be completed. In a subsequent data transmission and reception operation, the interface device may apply the determined SSC range to the spread spectrum clocking.

Figure 10:
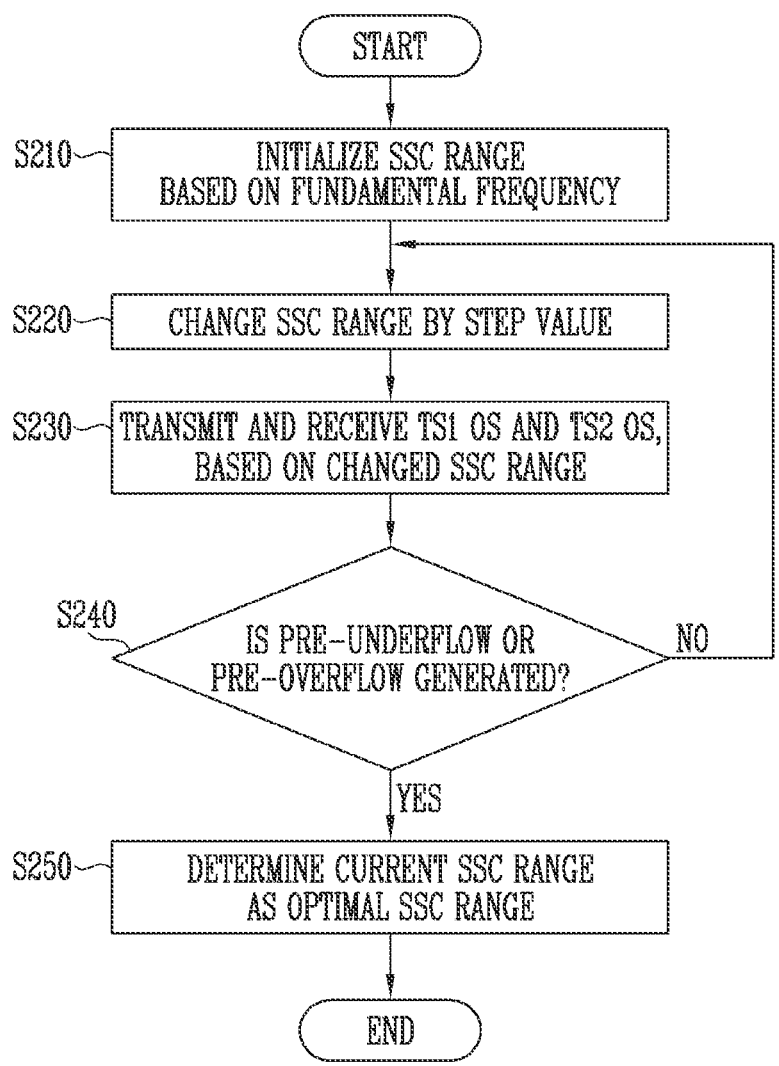
FIG. 10 is a flowchart illustrating an example of step S171 of FIG. 9.

FIG. 10 is a flowchart illustrating an example of step S171 of FIG. 9. Referring to FIG. 10, in order to determine the optimal SSC range, the interface device first initializes the SSC range based on a fundamental frequency (S210). In step S210, the initialized SSC range may correspond to a relatively narrow frequency range. The fundamental frequency may be used as a reference to determine whether to apply the SSC range and/or which SSC range is applied. When the SSC is implemented in a down-spreading method, the fundamental frequency may be an upper limit of the SSC range. When the SSC is implemented in a center-spreading method, the fundamental frequency may be an median value of the SSC range. When SSC is implemented in an up-spreading method, the fundamental frequency may be a lower limit of the SSC range.

At S220, the SSC range is adjusted by a step value. In an embodiment, in step S220, the SSC range may be widened by the step value. Thereafter, in step S230, the interface device 300a may transmit and receive the TS1 ordered-set TS1 OS and the TS2 ordered-set TS2 OS based on the adjusted SSC range. That is, the interface device 300a may transmit and receive the TS1 ordered-set TS1 OS and the TS2 ordered-set TS2 OS to and from the other interface device based on the adjusted SSC range.

In a process of transmitting and receiving the TS1 ordered-set TS1 OS and the TS2 ordered-set TS2 OS, the interface device 300a determines whether the pre-underflow or the pre-overflow is generated in the elastic buffer 320 of the interface device 300a or the elastic buffer of the other interface device.

Whether the pre-underflow or the pre-overflow is generated in the elastic buffer 320 of the interface device 300a may be determined by the buffer status monitor 330 shown in FIG. 4. The buffer status monitor 330 receives the pointer information $I_{PT}$ of the elastic buffer 320 and determines the current status of the elastic buffer 320 based on the pointer information $I_{PT}$. As described with reference to FIGS. 6A to 8C, the buffer status monitor 330 may determine whether the elastic buffer 320 is currently in the normal status, the pre-overflow status, the pre-underflow status, the overflow status, or the underflow status based on the position indicated by the pointer of the elastic buffer 320. When the pre-overflow or the pre-underflow is generated in the elastic buffer 320, the buffer status monitor may generate the first buffer status information $I_{BS1}$ indicating that the pre-overflow or the pre-underflow is generated and transfer the first buffer status information IBS to the SSC controller 340.

Whether the pre-underflow or the pre-overflow is generated in the elastic buffer of the other interface device communicating with the interface device 300a through the link may be determined through the second buffer status information $I_{BS2}$. When the pre-underflow or the pre-overflow is generated in the elastic buffer of the other interface device, the corresponding interface device may transfer information indicating that the pre-overflow or the pre-underflow is generated to the interface device 300a as the data $D_{RX1}$. The data $D_{RX1}$ is converted to the data $D_{RX2}$ by the receiver 310 and transferred to the elastic buffer 320. Among the data $D_{RX2}$, the second buffer status information $I_{BS2}$ indicating that the pre-underflow or the pre-overflow is generated in the elastic buffer of the other interface device may be extracted and transferred to the SSC controller 340.

Therefore, the SSC controller 340 may determine whether the pre-overflow or the pre-underflow is generated in the elastic buffer 320 based on the first buffer status information $I_{BS1}$. In some implementations, the SSC controller 340 may determine whether the pre-overflow or the pre-underflow is generated in the elastic buffer of the other interface device connected to the interface device 300a based on the second buffer status information $I_{BS2}$.

When the pre-underflow or the pre-overflow is not generated in the elastic buffer 320 of the interface device 300a or the elastic buffer of the other interface device (S240: No), the method returns to step S220 to re-adjust the SSC range by the step value. Thereafter, the interface device 300a may transmit and receive the TS1 ordered-set TS1 OS and the TS2 ordered-set TS2 OS based on the adjusted SSC range (S230). Steps S220, S230, and S240 are repeated until the pre-underflow or the pre-overflow is generated in the elastic buffer 320 of the interface device 300a or the elastic buffer of the other interface device.

When the pre-underflow or the pre-overflow is generated in the elastic buffer 320 of the interface device 300a or the elastic buffer of the other interface device (S240: Yes), the current SSC range is determined as the optimal SSC range in step S250. Accordingly, in accordance with the interface device and the method of operating the same based on an embodiment of the disclosed technology, the optimal SSC range may be determined by adaptively changing the SSC range until the pre-overflow or the pre-underflow is generated.

Figure 11:
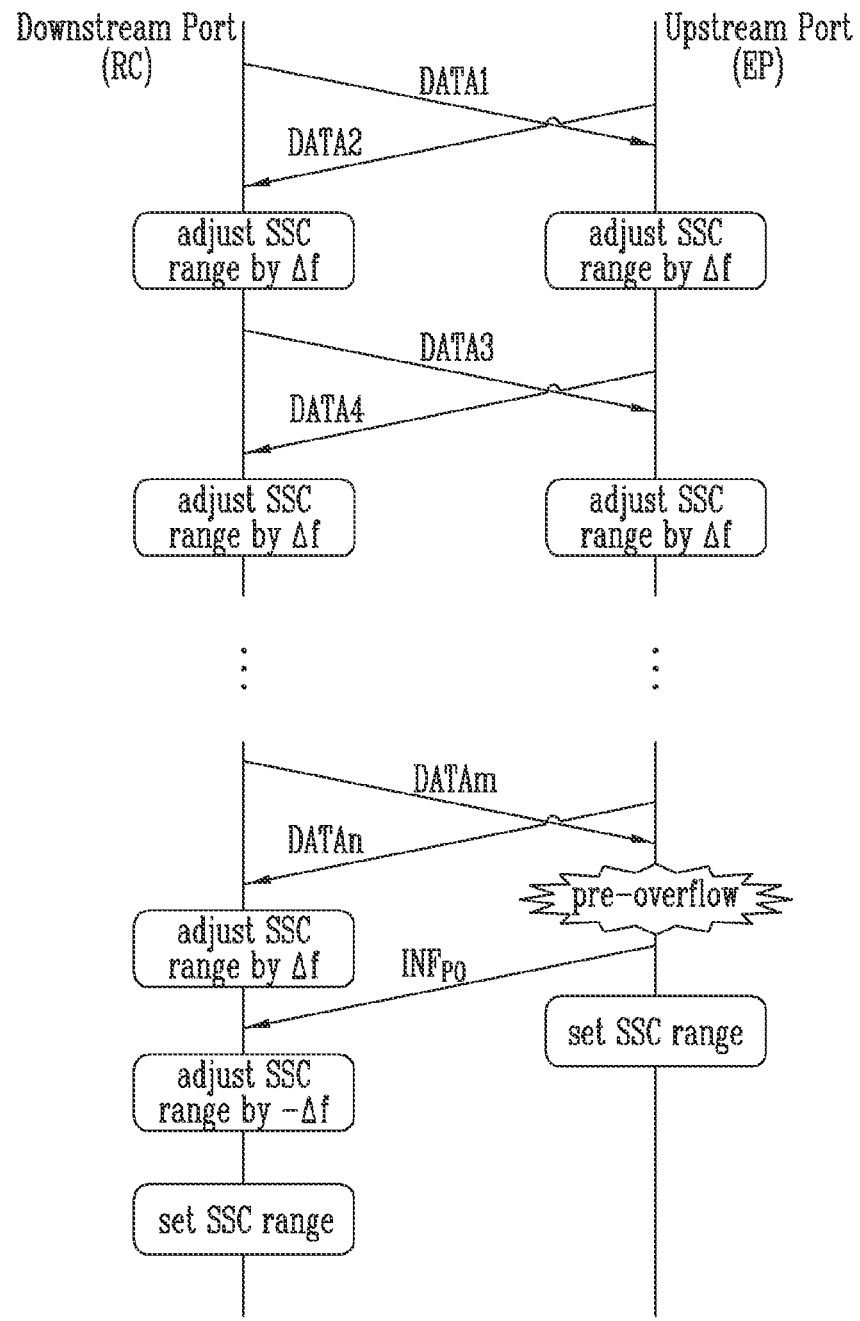
FIG. 11 is a ladder diagram showing an example of steps shown in FIG. 10.

FIG. 11 is a ladder diagram showing an example of the steps shown in FIG. 10. Referring to FIG. 11, data transmission and reception between a downstream port and an upstream port is shown. As an example, the downstream port may be the root complex RC. In some implementations, the upstream port may be the endpoint EP. Hereinafter, description will be given with reference to FIGS. 10 and 11 together.

First data DATA1 is transmitted from the downstream port to the upstream port, and second data DATA2 is transmitted from the upstream port to the downstream port (S230). Each of the first data DATA1 and the second data DATA2 may include at least one of the TS1 ordered-set TS1 OS and the TS2 ordered-set TS2 OS.

Each of the root complex RC and the end point EP determines whether the pre-underflow or the pre-overflow is generated (S240). Since the pre-underflow or the pre-overflow is not generated, the SSC range is adjusted by a step value $\Delta f$ (S220). Based on the adjusted SSC range, third data DATA3 is transmitted from the downstream port to the upstream port, and fourth data DATA4 is transmitted from the upstream port to the downstream port (S230). Thereafter, each of the root complex RC and the end point EP determines whether the pre-underflow or the pre-overflow is generated (S240). Since the pre-underflow or the pre-overflow is not generated, the SSC range is adjusted by the step value $\Delta f$ (S220). Such processes are repeated until the pre-underflow or the pre-overflow is generated.

In some implementations, m-th data DATAm is transmitted from the downstream port to the upstream port, and n-th data DATAn is transmitted from the upstream port to the downstream port (S230).

In a case of the root complex RC, the pre-overflow or the pre-underflow is not generated in its elastic buffer while receiving the n-th data DATAn. Therefore, the SSC range may be adjusted by the step value $\Delta f$ (S220). On the other hand, in a case of the end point EP, the pre-overflow is generated in the elastic buffer as the m-th data DATAm is received. Therefore, the endpoint EP determines the current SSC range as the optimal SSC range. The determined optimal SSC range may be set as the SSC range to be used for data communication later.

As the pre-overflow is generated in the elastic buffer of the endpoint EP, the endpoint EP transfers pre-overflow information $INF_{PO}$ indicating that the pre-overflow is generated in its elastic buffer to the root complex RC. As the root complex RC receives the pre-overflow information $INF_{PO}$, the root complex RC may adjust the SSC range by a minus step value $-\Delta f$. This is to correct that the root complex RC adjusts the SSC range by the step value $\Delta f$ immediately before to match with the SSC range of the endpoint. Thereafter, the root complex RC determines the current SSC range as the optimal SSC range.

Figure 12:
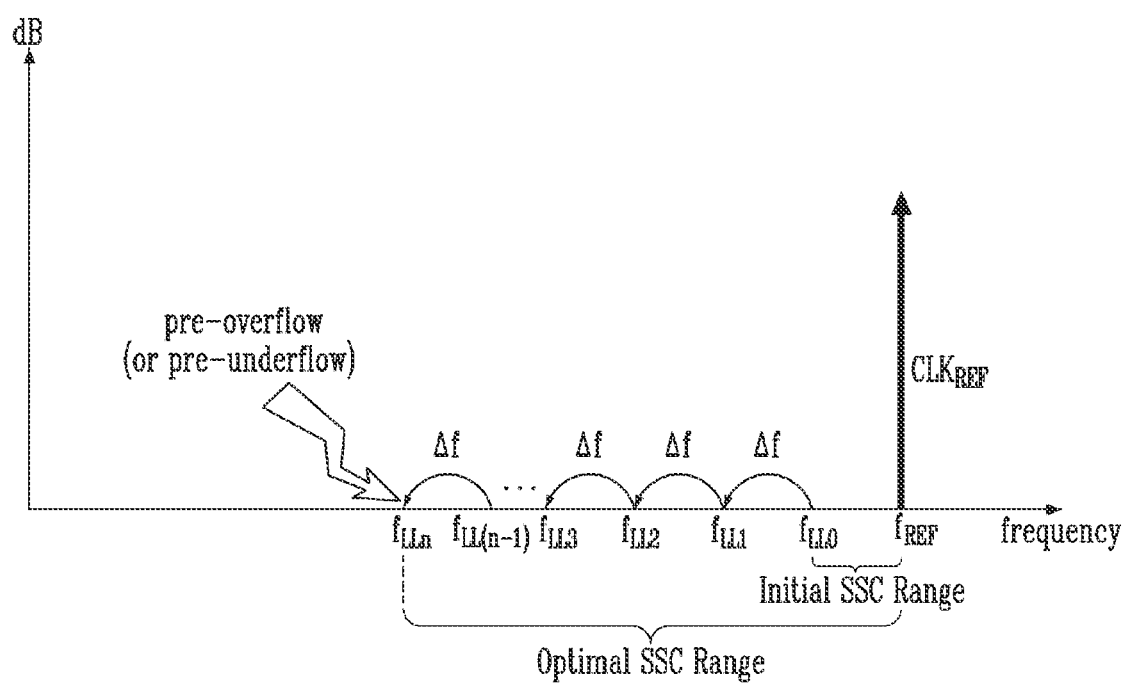
FIG. 12 is a graph showing the steps shown in FIG. 10.

FIG. 12 is a graph showing the steps shown in FIG. 10. In FIG. 12, the SSC range of the down-spreading method is shown. Referring to FIG. 12, a basic clock $CLK_{REF}$ having a fundamental frequency $f_{REF}$ is shown. In some implementations, an initial lower limit frequency $f_{LL0}$ indicating a lower limit of an initial SSC range is shown. In step S210 of FIG. 10, the SSC range is initialized based on the fundamental frequency $f_{REF}$ and the initial lower limit frequency flu). The initial SSC range may be defined as a section [$f_{LL0}$, $f_{REF}$].

By step S220, the SSC range is adjusted by the step value Δf. Referring to FIG. 12, a first lower limit frequency $f_{LL1}$ of a position spaced by the step value Δf in a negative direction from the initial lower limit frequency $f_{LL0}$ becomes a lower limit of an adjusted SSC range. Accordingly, the adjusted SSC range may correspond to a section [$f_{LL1}$, $f_{REF}$]. When the pre-overflow or the pre-underflow is not generated (S240: No) as a result of transmitting and receiving data based on the adjusted SSC range [$f_{LL1}$, $f_{REF}$], the SSC range is adjusted again by the step value Δf. Accordingly, the SSC range is changed to a section [$f_{LL2}$, $f_{REF}$]. Such processes are repeated until the pre-overflow or the pre-underflow is generated in the elastic buffer of the root complex RC or the endpoint EP.

As a result of repeatedly adjusting the SSC range n times by the step value Δf, data transmission and reception may be performed based on the adjusted SSC range [$f_{LLn}$, $f_{REF}$] (S230). FIG. 12 shows a situation in which the pre-overflow or the pre-underflow is generated as a result of performing the data transmission and reception (S230) based on the section [$f_{LLn}$, $f_{REF}$] which is the adjusted SSC range. Accordingly, the section [$f_{LLn}$, $f_{REF}$] that is the current SSC range may be determined as the optimal SSC range.

Figure 13:
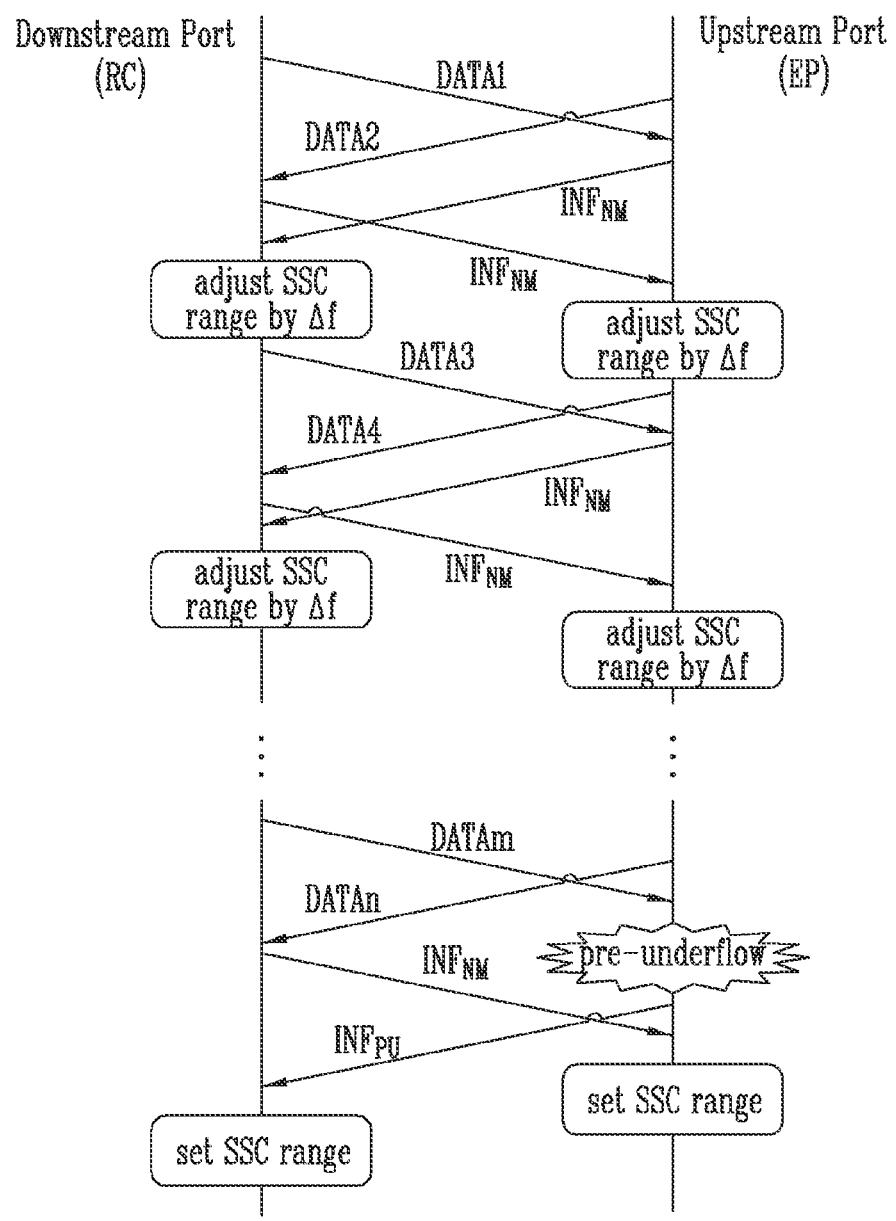
FIG. 13 is a ladder diagram showing another example of the steps shown in FIG. 10.

FIG. 13 is a ladder diagram showing another example of the steps shown in FIG. 10. Referring to FIG. 13, similarly to FIG. 11, the data transmission and reception between the downstream port and the upstream port is shown. As an example, the downstream port may be the root complex RC. In some implementations, the upstream port may be the endpoint EP, as will be discussed with reference to FIGS. 10 and 13 together.

The first data DATA1 is transmitted from the downstream port to the upstream port, and the second data DATA2 is transmitted from the upstream port to the downstream port (S230). Each of the first data DATA1 and the second data DATA2 may include at least one of the TS1 ordered-set TS1 OS and the TS2 ordered-set TS2 OS.

When the pre-overflow or the pre-underflow is not generated in the elastic buffer of the endpoint EP even though the first data DATA1 is received, normal status information $INF_{NM}$ is transferred from the upstream port to the downstream port. The normal status information $INF_{NM}$ is information indicating that the elastic buffer of a corresponding interface device is in the normal status.

In some implementations, when the pre-overflow or the pre-underflow is not generated in the elastic buffer of the root complex RC even though the second data DATA2 is received, the normal status information $INF_{NM}$ is transferred from the downstream port to the upstream port.

Each of the root complex RC and the end point EP determines whether the pre-underflow or the pre-overflow is generated (S240). Since the elastic buffers of each of the root complex RC and the endpoint EP are in the normal status, and the normal status information $INF_{NM}$ indicating that the elastic buffer of a counterpart interface device is in the normal status is received, the root complex RC and the endpoint EP adjust the SSC range by the step value Δf (S220). Based on the adjusted SSC range, the third data DATA3 is transmitted from the downstream port to the upstream port, and fourth data DATA4 is transmitted from the upstream port to the downstream port (S230). Since the elastic buffer is in the normal status in spite of reception of the third and fourth data DATA3 and DATA4, each of the root complex RC and the endpoint EP transfers the normal status information $INF_{NM}$ to the counterpart interface device. Thereafter, the root complex RC and the end point adjusts the SSC range by the step value Δf (S220). Such processes are repeated until the pre-underflow or the pre-overflow is generated.

The m-th data DATAm is transmitted from the downstream port to the upstream port, and the n-th data DATAn is transmitted from the upstream port to the downstream port (S230).

In the case of the root complex RC, the pre-overflow or the pre-underflow is not generated in its elastic buffer while receiving the n-th data DATAn. Therefore, the normal status information $INF_{NM}$ is transferred to the end point EP In the case of the end point EP, the pre-underflow is generated in the elastic buffer as the m-th data DATAm is received. Therefore, in despite of the received normal status information $INF_{NM}$, the end point EP determines the current SSC range as the optimal SSC range. The determined optimal SSC range may be set as the SSC range to be used for data communication later.

As the pre-underflow is generated in the elastic buffer of the endpoint EP, the endpoint EP transfers pre-underflow information $INF_{PU}$ indicating that the pre-underflow is generated in its elastic buffer to the root complex RC. As the root complex RC receives the pre-underflow information $INF_{PU}$, the root complex RC determines the current SSC range as the optimal SSC range.

In a case of the embodiment of FIG. 11, when the pre-overflow or the pre-underflow is not generated in its elastic buffer based on the data reception, the root complex RC or the end point EP first adjusts the SSC range by the step value Δf. When the pre-overflow information $INF_{PO}$ or the pre-underflow information $INF_{PU}$ is received from the counterpart in a state in which the SSC range is adjusted, the adjusted SSC range is re-adjusted again by the minus step value −Δf.

On the other hand, in a case of the embodiment of FIG. 13, the root complex RC or the endpoint EP adjusts the SSC range next to receiving the normal status information $INF_{NM}$ from the counterpart, even though the pre-overflow or the pre-underflow is not generated in its elastic buffer based on the data reception. Accordingly, as in the embodiment of FIG. 11, a situation in which the SSC range is required to be adjusted by the minus step value −Δf does not occur.

FIGS. 10 to 13 show an embodiment in which the optimal SSC range is determined while increasing the SSC range by the step value from the initial SSC range. However, the disclosed technology is not limited thereto, and an embodiment in which the optimal SSC range is determined while decreasing the SSC range by the step value from the initial SSC range is also possible. In some implementations, FIG. 12 shows an embodiment in which the optimal SSC range is determined based on the down-spreading method, however, the disclosed technology is not limited thereto. That is, the optimal SSC range may be determined based on the center-spreading or up-spreading method.

Figure 14:
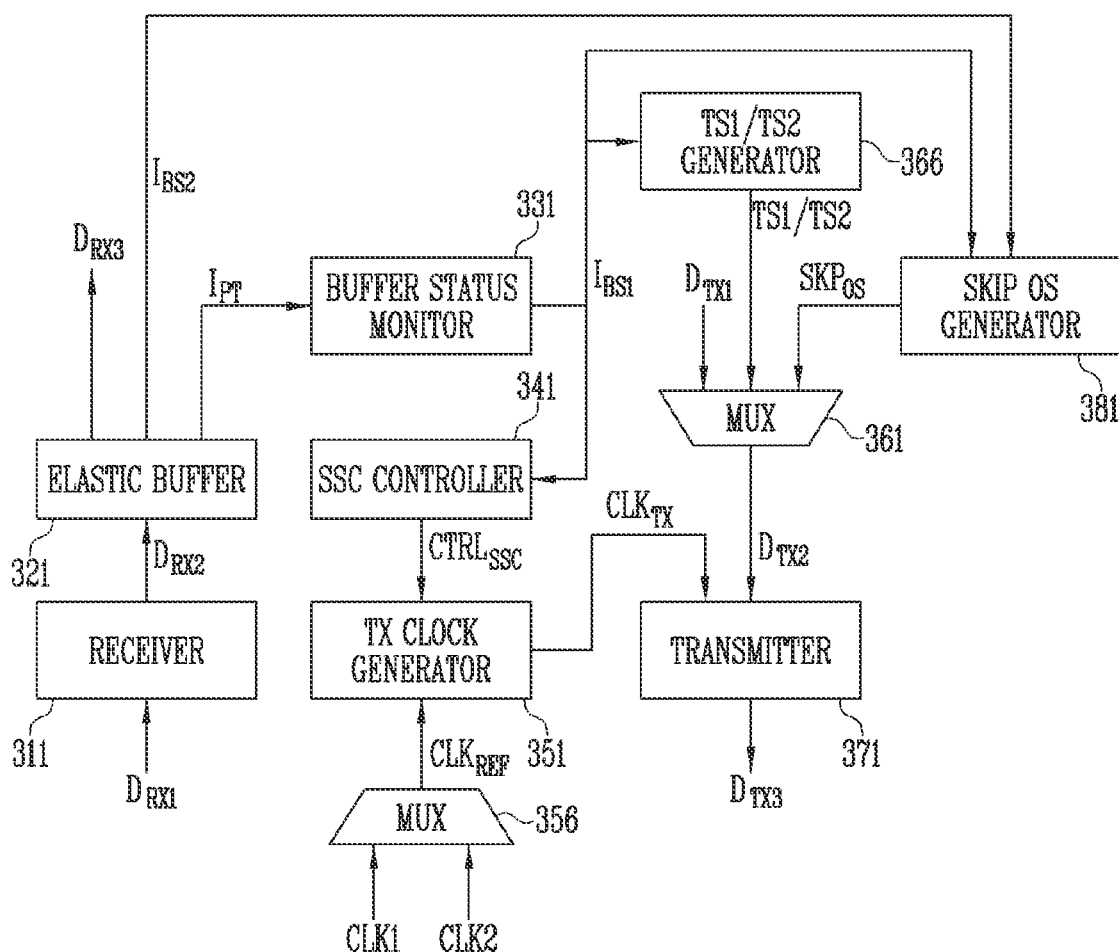
FIG. 14 is a block diagram illustrating an interface device 300b based on another embodiment of the disclosed technology.

FIG. 14 is a block diagram illustrating an interface device 300b based on another embodiment of the disclosed technology. Referring to FIG. 14, the interface device 300b may include a receiver 311, an elastic buffer 321, a buffer status monitor 331, an SSC controller 341, a transmission clock generator 351, MUXes 356 and 361, TS1/TS2 generator 366, a transmitter 371, and a skip OS generator 381.

The receiver 311 receives data $D_{RX1}$ through a link. The receiver 311 may include a deserializer, a descrambler, a clock data recovery (CDR), and the like. The receiver 311 may generate and output data $D_{RX2}$ based on the data $D_{RX1}$ As an example, the data $D_{RX1}$ may be serial data, and the data $D_{RX2}$ may be parallel data.

The data $D_{RX2}$ may be transferred to the elastic buffer 321. The elastic buffer 321 may temporarily store the data $D_{RX2}$ and transfer data DRX3 to an inner core (not shown) of the interface device 300b.

In some implementations, pointer information $I_{PT}$ of the elastic buffer 321 may be transferred to the buffer status monitor 331. The pointer information $I_{PT}$ of the elastic buffer 321 may be used to indicate a position of the last data in the elastic buffer 321 implemented in a FIFO form. A status of the elastic buffer 321 may be determined based on the pointer information $I_{PT}$, and thus first buffer status information $I_{BS1}$ may be generated. The first buffer status information $I_{BS1}$ is used to indicate the status of the elastic buffer 321 included in the interface device 300b. Determining the status of the elastic buffer 321 based on the pointer information $I_{PT}$ is described above with reference to FIGS. 5A to 8C.

In some implementations, second buffer status information $I_{BS2}$ may be transferred from the elastic buffer 321 to the skip OS generator 381. The second buffer status information $I_{BS2}$ may include information on an elastic buffer status of another interface device communicating with the interface device 300b. In this case, the second buffer status information $I_{BS2}$ may be received by the receiver 311 as the data $D_{RX1}$ For example, when the interface device 300b shown in FIG. 14 is the interface device A 201 of FIG. 2, the second buffer status information $I_{BS2}$ may include information on status of the elastic buffer included in the interface device B 203. In this case, the second buffer status information $I_{BS2}$ may be transferred from the transmitter TX of the interface device B 203 to the receiver RX of the interface device A.

In some implementations, the TS1/TS2 generator 366 may generate a TS1 ordered-set TS1 OS and a TS2 ordered-set TS2 OS based on the first buffer status information $I_{BS1}$. The generated TS1 OS and the TS2 OS may be transferred to the MUX 361. The TS1 OS or the TS2 OS may be transferred to the other interface device, and a corresponding interface device may adjust an interval at which the interface device generates the skip OS.

The skip OS generator 381 may receive the first buffer status information $I_{BS1}$ and the second buffer status information $I_{BS2}$ and determine an interval at which the skip OS $SKP_{OS}$ is generated and inserted between transmission data.

The SSC controller 341 generates an SSC control signal $CTRL_{SSC}$. The transmission clock generator 351 receives the SSC control signal $CTRL_{SSC}$ from the SSC controller 341. In addition, the transmission clock generator 351 receives a reference clock $CLK_{REF}$. The reference clock $CLK_{REF}$ may be received from the MUX 356. The MUX 356 may select any one of a first clock CLK1 and a second clock CLk2 and transfer the selected clock to the transmission clock generator 351 as the reference clock $CLK_{REF}$. As an example, the first clock CLK1 may be a reference clock received from the outside of the interface device 300b. In this case, the first clock CLK1 may be a 100 MHz reference clock received from the host. As an example, the second clock CLK2 may be a reference clock generated from an internal clock generator (not shown) of the interface device 300b. In this case, the second clock CLK2 may be an internal reference clock used for a separate reference clock with independent SSC (SRIS) mode or a separate reference clock with no SSC (SRNS) mode. The transmission clock generator 351 may generate a transmission clock $CLK_{TX}$ in which a spectrum is spread based on the reference clock $CLK_{REF}$, based on the SSC control signal $CTRL_{SSC}$. At this time, an SSC range of the transmission clock $CLK_{TX}$ may be determined by the SSC controller 341. The transmission clock $CLK_{TX}$ may be transferred to the transmitter 371.

In some implementations, the buffer status monitor 331 may transfer the first buffer status information $I_{BS1}$ to the MUX 361. The MUX 361 may receive the data $D_{TX1}$ from the inner core (not shown) of the interface device 300b in addition to the first buffer status information $I_{BS1}$. In addition, the MUX 361 may receive the skip OS $SKP_{OS}$ from the skip OS generator 381. In addition, the MUX 361 may receive the TS1 OS or the TS2 OS from the TS1/TS2 generator 366. The MUX 361 may multiplex the first buffer status information $I_{BS1}$, the data $D_{TX1}$, the TS1 OS, the TS2 OS, and the skip OS $SKP_{OS}$ and transmit the data $D_{TX2}$ to the transmitter 371. That is, as well as the data $D_{TX1}$ transferred from the inner core, the first buffer status information $I_{BS1}$ received from the buffer status monitor 331, the TS1 OS or the TS2 OS received from the TS1/TS2 generator 366, the skip OS $SKP_{OS}$ received from the skip OS generator 381 may also be transferred to the transmitter 371 as the data $D_{TX2}$.

The transmitter 371 may receive the data $D_{TX2}$ and the transmission clock $CLK_{TX}$ and generate the data $D_{TX3}$ based on the data $D_{TX2}$ and the transmission clock $CLK_{TX}$. The transmitter 371 may include a serializer, a scrambler, and the like. As an example, the data $D_{TX2}$ may be parallel data, and the data $D_{TX3}$ may be serial data output based on the transmission clock $CLK_{TX}$. The generated data $D_{TX3}$ may be transferred to the other interface device connected through the link.

As described above, the interface device 330b based on an embodiment of the disclosed technology may determine the interval at which the skip OS is inserted based on the first buffer status information $I_{BS1}$ indicating the status of own elastic buffer or the second buffer status information $I_{BS2}$ indicating the status included in the other interface device 330b connected through the link. Accordingly, the insertion interval of the skip OS used for data transmission and reception may be adaptively determined based on a link characteristic.

Figure 15:
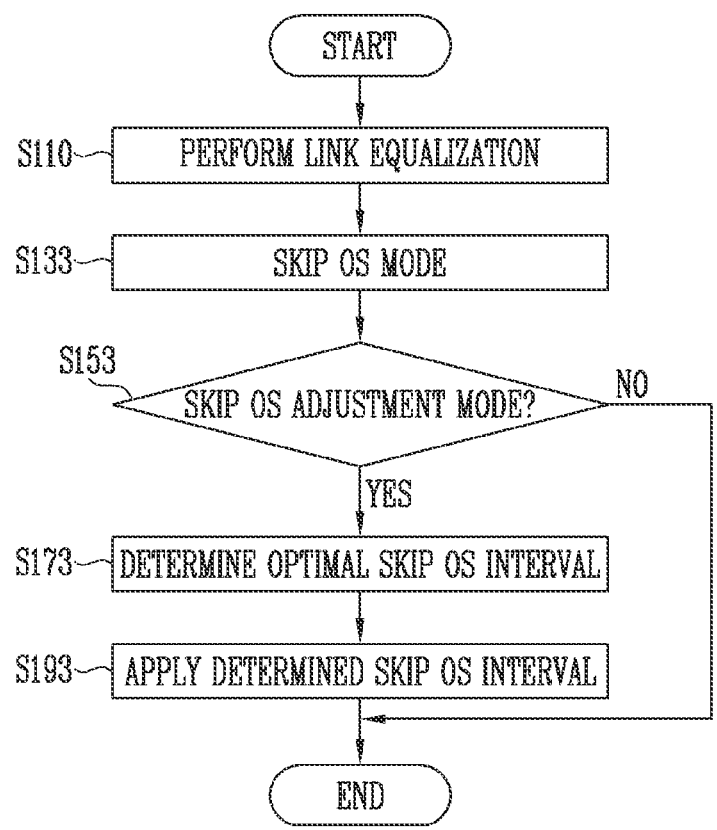
FIG. 15 is a flowchart illustrating a method of operating an interface device based on another embodiment of the disclosed technology.

FIG. 15 is a flowchart illustrating a method of operating an interface device based on another embodiment of the disclosed technology. More specifically, FIG. 15 shows a flowchart for performing a link initialization operation between interface devices based on an embodiment of the disclosed technology.

Referring to FIG. 15, a method of operating an interface device may include performing link equalization (S110), checking a skip OS mode (S133), when the skip OS mode is a skip OS adjustment mode (S153: Yes), determining an optimal skip OS interval (S173), and applying the determined skip OS interval (S193).

In step S110, the link equalization is performed. Step S110 of FIG. 15 may be substantially the same as step S110 of FIGS. 3 and 9. Therefore, repetitive description is omitted.

In step S133, the interface device may check the skip OS mode. Based on an embodiment of the disclosed technology, the interface device may adaptively determine the skip OS interval or use a predetermined skip OS interval based on the skip OS mode.

At S153, it is determined whether the skip OS mode is a skip OS adjustment mode. When the skip OS mode is not the skip OS adjustment mode (S153: No), the interface device may use the predetermined skip OS interval. Accordingly, the link initialization operation between the interface devices is ended.

When the skip OS mode is the skip OS adjustment mode (S153: Yes), the interface device may adaptively determine the skip OS interval. Accordingly, the method proceeds to step S173 to determine the optimal skip OS interval.

At S173, the optimal skip OS interval is determined. More specifically, in step S173, the optimal interval at which the skip OS is inserted into the output data may be determined. In accordance with an interface device and a method of operating the same based on an embodiment of the disclosed technology, the optimal skip OS interval may be determined based on the link characteristic between the interface devices, rather than using a fixed skip OS interval. A detailed method of determining the optimal skip OS interval will be discussed below with reference to FIGS. 16 to 19D.

At S193, the determined skip OS interval may be applied. Therefore, the link initialization operation may be completed. In a subsequent data transmission and reception operation, the interface device may insert the skip OS into the output data based on the determined skip OS interval.

Figure 16:
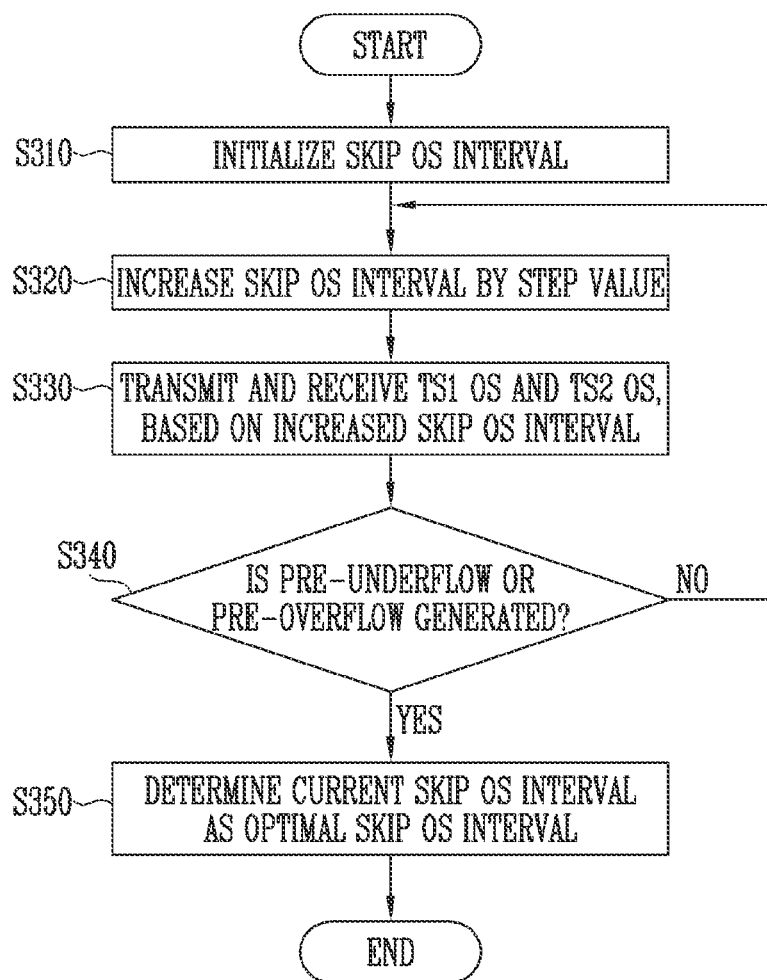
FIG. 16 is a flowchart illustrating an example of step S173 of FIG. 15.

FIG. 16 is a flowchart illustrating an example of step S173 of FIG. 15. Referring to FIG. 16, in order to determine the optimal skip OS interval, the interface device first initializes the skip OS interval (S310). In step S310, the initialized skip OS interval may have a relatively large value. Accordingly, the skip OS may be inserted into the output data at a low frequency in the initial stage.

In step S320, the skip OS interval is adjusted by a step value. In an embodiment, in step S320, the skip OS interval may be increased by the step value. Thereafter, in step S330, the interface device 300b may transmit and receive the TS1 ordered-set TS1 OS and the TS2 ordered-set TS2 OS based on the adjusted skip OS interval. That is, the interface device 300b may transmit and receive the TS1 ordered-set TS1 OS and the TS2 ordered-set TS2 OS to and from the other interface device based on the adjusted skip OS interval.

In a process of transmitting and receiving the TS1 ordered-set TS1 OS and the TS2 ordered-set TS2 OS, the interface device 300b determines whether the pre-underflow or the pre-overflow is generated in the elastic buffer 321 of the interface device 300b or the elastic buffer of the other interface device.

Whether the pre-underflow or the pre-overflow is generated in the elastic buffer 321 of the interface device 300b may be determined by the buffer status monitor 331 shown in FIG. 14. The buffer status monitor 331 receives the pointer information $I_{PT}$ of the elastic buffer 321 and determines the current status of the elastic buffer 321 based on the pointer information $I_{PT}$. As described with reference to FIGS. 6A to 8C, the buffer status monitor 331 may determine whether the elastic buffer 321 is currently in the normal status, the pre-overflow status, the pre-underflow status, the overflow status, or the underflow status based on the position indicated by the pointer of the elastic buffer 321. When the pre-overflow or the pre-underflow is generated in the elastic buffer 321, the buffer status monitor may generate the first buffer status information $I_{BS1}$ indicating that the pre-overflow or the pre-underflow is generated and transfer the first buffer status information $I_{BS1}$ to the skip OS generator 381.

Whether the pre-underflow or the pre-overflow is generated in the elastic buffer of the other interface device communicating with the interface device 300b through the link may be determined through the second buffer status information $I_{BS2}$. When the pre-underflow or the pre-overflow is generated in the elastic buffer of the other interface device, the corresponding interface device may transfer information indicating that the pre-overflow or the pre-underflow is generated to the interface device 300b as the data $D_{RX1}$. The data $D_{RX1}$ is converted to the data $D_{RX2}$ by the receiver 311 and transferred to the elastic buffer 321. Among the data $D_{RX2}$, the second buffer status information $I_{BS2}$ indicating that the pre-underflow or the pre-overflow is generated in the elastic buffer of the other interface device may be extracted and transferred to the skip OS generator 381.

Therefore, the skip OS generator 381 may determine whether the pre-overflow or the pre-underflow is generated in the elastic buffer 321 based on the first buffer status information $I_{BS1}$. In some implementations, the skip OS generator 381 may determine whether the pre-overflow or the pre-underflow is generated in the elastic buffer of the other interface device connected to the interface device 300b based on the second buffer status information $I_{BS2}$.

When the pre-underflow or the pre-overflow is not generated in the elastic buffer 321 of the interface device 300b or the elastic buffer of the other interface device (S340: No), the method returns to step S320 to re-change the skip OS interval range by the step value. Thereafter, the interface device 300b may transmit and receive the TS1 ordered-set TS1 OS and the TS2 ordered-set TS2 OS based on the adjusted skip OS interval (S330). Steps S320, S330, and S340 are repeated until the pre-underflow or the pre-overflow is generated in the elastic buffer 321 of the interface device 300b or the elastic buffer of the other interface device.

When the pre-underflow or the pre-overflow is generated in the elastic buffer 321 of the interface device 300b or the elastic buffer of the other interface device (S340: Yes), the current skip OS interval is determined as the optimal skip OS interval in step S350. Accordingly, in accordance with the interface device and the method of operating the same based on an embodiment of the disclosed technology, the optimal skip OS interval may be determined by adaptively changing the skip OS interval until the pre-overflow or the pre-underflow is generated.

Figure 17:
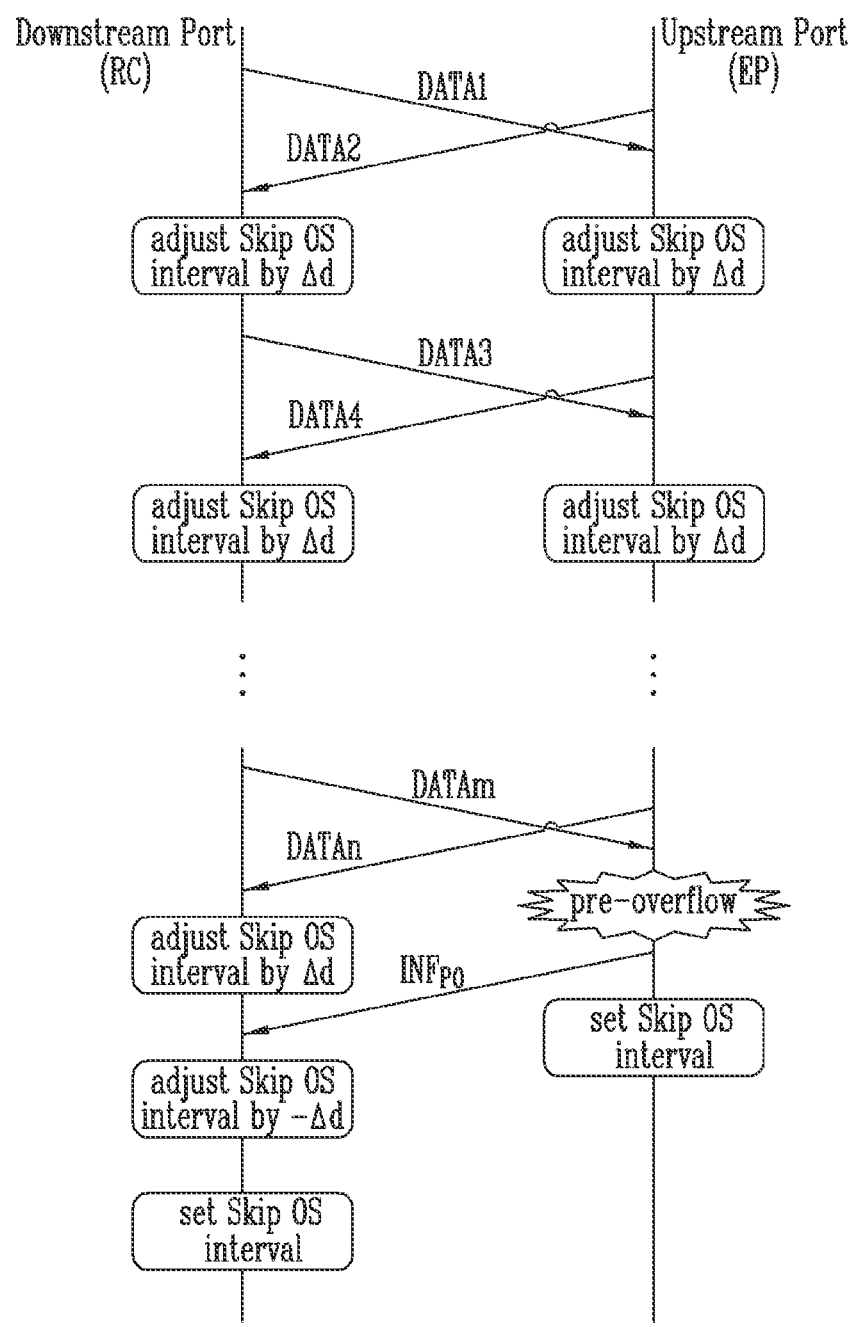
FIG. 17 is a ladder diagram showing an example of steps shown in FIG. 16.

FIG. 17 is a ladder diagram showing an example of the steps shown in FIG. 16. Referring to FIG. 17, data transmission and reception between a downstream port and an upstream port is shown. As an example, the downstream port may be the root complex RC. In some implementations, the upstream port may be the endpoint EP, as will be discussed below with reference to FIGS. 16 and 17.

First data DATA1 is transmitted from the downstream port to the upstream port, and second data DATA2 is transmitted from the upstream port to the downstream port (S330). Each of the first data DATA1 and the second data DATA2 may include at least one of the TS1 ordered-set TS1 OS and the TS2 ordered-set TS2 OS.

Each of the root complex RC and the end point EP determines whether the pre-underflow or the pre-overflow is generated (S340). Since the pre-underflow or the pre-overflow is not generated, the skip OS interval is adjusted by a step value Δd (S320). That is, the skip OS interval is increased by the step value Δd. Based on the skip OS interval, third data DATA3 is transmitted from the downstream port to the upstream port, and fourth data DATA4 is transmitted from the upstream port to the downstream port (S330). Thereafter, each of the root complex RC and the end point EP determines whether the pre-underflow or the pre-overflow is generated (S340). Since the pre-underflow or the pre-overflow is not generated, the skip OS interval is increased by the step value Δd (S320). Such processes are repeated until the pre-underflow or the pre-overflow is generated.

m-th data DATAm is transmitted from the downstream port to the upstream port, and n-th data DATAn is transmitted from the upstream port to the downstream port (S330).

In a case of the root complex RC, the pre-overflow or the pre-underflow is not generated in its elastic buffer while receiving the n-th data DATAn. Therefore, the skip OS interval may be increased by the step value Δd (S320). On the other hand, in a case of the end point EP, the pre-overflow is generated in the elastic buffer as the m-th data DATAm is received. Therefore, the endpoint EP determines the current skip OS interval as the optimal skip OS interval. The determined optimal skip OS interval may be set as the skip OS interval to be used for data communication later.

As the pre-overflow is generated in the elastic buffer of the endpoint EP, the endpoint EP transfers pre-overflow information $INF_{PO}$ indicating that the pre-overflow is generated in its elastic buffer to the root complex RC. As the root complex RC receives the pre-overflow information $INF_{PO}$, the root complex RC may decrease the skip OS interval by the step value Δd. This is to correct increasing the skip OS interval by the step value Δd by the root complex RC immediately before to match with the skip OS interval of the endpoint. Thereafter, the root complex RC determines the current skip OS interval as the optimal skip OS interval.

Figure 18:
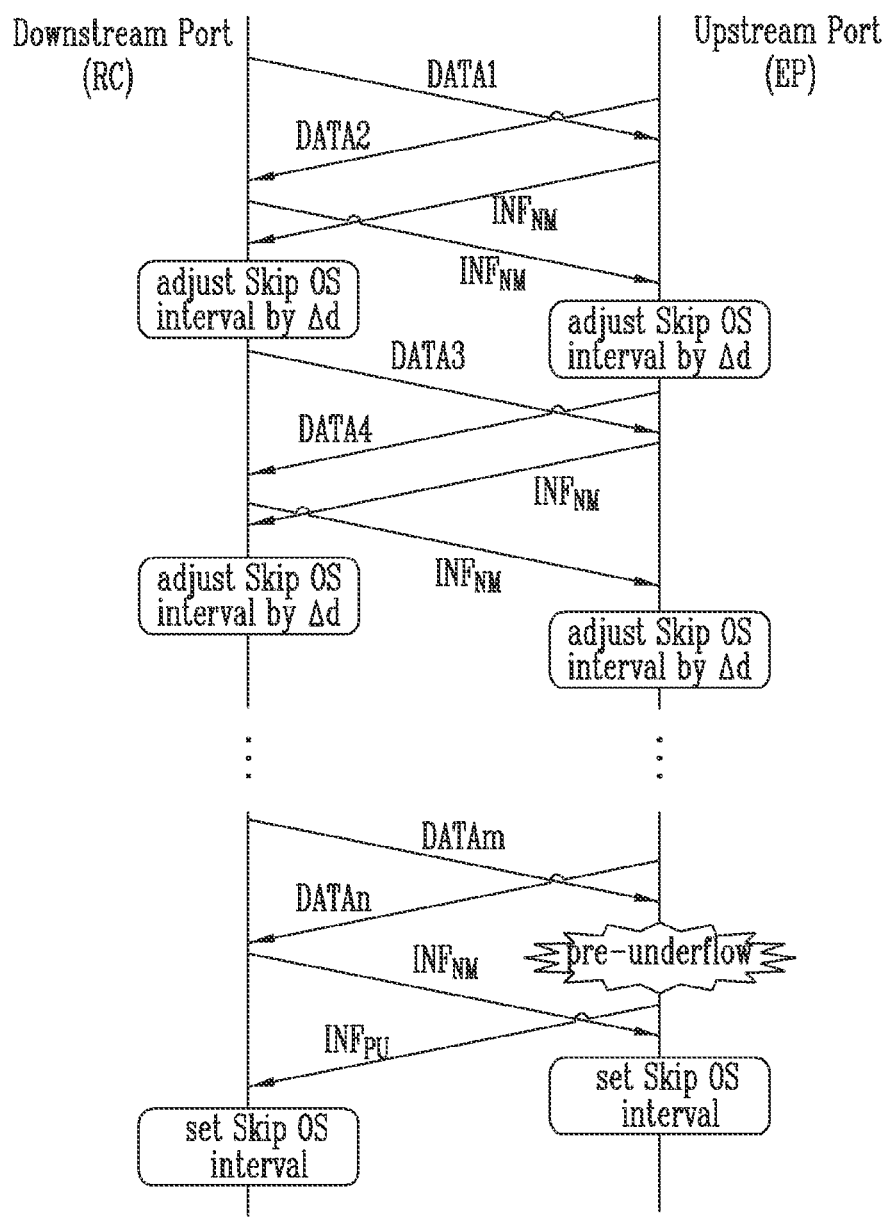
FIG. 18 is a ladder diagram for describing another embodiment of the steps shown in FIG. 16.

FIG. 18 is a ladder diagram for describing another embodiment of the steps shown in FIG. 16. Referring to FIG. 18, similarly to FIG. 17, the data transmission and reception between the downstream port and the upstream port is shown. As an example, the downstream port may be the root complex RC. In some implementations, the upstream port may be the endpoint EP. Hereinafter, description will be given with reference to FIGS. 16 and 18 together.

The first data DATA1 is transmitted from the downstream port to the upstream port, and the second data DATA2 is transmitted from the upstream port to the downstream port (S330). Each of the first data DATA1 and the second data DATA2 may include at least one of the TS1 ordered-set TS1 OS and the TS2 ordered-set TS2 OS.

When the pre-overflow or the pre-underflow is not generated in the elastic buffer of the endpoint EP even though the first data DATA1 is received, normal status information $INF_{NM}$ is transferred from the upstream port to the downstream port. The normal status information $INF_{NM}$ is used to indicate that the elastic buffer of a corresponding interface device is in the normal status.

In some implementations, when the pre-overflow or the pre-underflow is not generated in the elastic buffer of the root complex RC even though the second data DATA2 is received, the normal status information $INF_{NM}$ is transferred from the downstream port to the upstream port.

Each of the root complex RC and the end point EP determines whether the pre-underflow or the pre-overflow is generated (S340). Since the elastic buffers of each of the root complex RC and the endpoint EP are in the normal status, and the normal status information $INF_{NM}$ indicating that the elastic buffer of a counterpart interface device is in the normal status is received, the root complex RC and the endpoint increase the skip OS interval by the step value Δd (S320). Based on the adjusted skip OS interval, the third data DATA3 is transmitted from the downstream port to the upstream port, and fourth data DATA4 is transmitted from the upstream port to the downstream port (S330). Since the elastic buffer is in the normal status in spite of reception of the third and fourth data DATA3 and DATA4, each of the root complex RC and the endpoint EP transfers the normal status information $INF_{NM}$ to the counterpart interface device. Thereafter, the root complex RC and the end point EP increases the skip OS interval by the step value Δd (S320). Such processes are repeated until the pre-underflow or the pre-overflow is generated.

The m-th data DATAm is transmitted from the downstream port to the upstream port, and the n-th data DATAn is transmitted from the upstream port to the downstream port (S330).

In the case of the root complex RC, the pre-overflow or the pre-underflow is not generated in its elastic buffer while receiving the n-th data DATAn. Therefore, the normal status information $INF_{NM}$ is transferred to the end point EP In the case of the end point EP, the pre-underflow is generated in the elastic buffer as the m-th data DATAm is received. Therefore, in despite of the received normal status information $INF_{NM}$, the end point EP determines the current skip OS interval as the optimal skip OS interval. The determined skip OS interval may be set as the skip OS interval to be used for data communication later.

As the pre-underflow is generated in the elastic buffer of the endpoint EP, the endpoint EP transfers pre-underflow information $INF_{PU}$ indicating that the pre-underflow is generated in its elastic buffer to the root complex RC. As the root complex RC receives the pre-underflow information $INF_{PU}$, the root complex RC determines the current skip OS interval as the optimal skip OS interval.

In a case of the embodiment of FIG. 17, when the pre-overflow or the pre-underflow is not generated in its elastic buffer based on the data reception, the root complex RC or the end point EP first increases the skip OS interval by the step value Δd. When the pre-overflow information $INF_{PO}$ or the pre-underflow information $INF_{PU}$ is received from the counterpart in a state in which the skip OS interval is decreased, the adjusted skip OS interval is increased again by the step value Δd.

On the other hand, in a case of the embodiment of FIG. 18, the root complex RC or the endpoint EP adjusts the skip OS interval next to receiving the normal status information $INF_{NM}$ from the counterpart, even though the pre-overflow or the pre-underflow is not generated in its elastic buffer based on the data reception. Accordingly, as in the embodiment of FIG. 17, a situation in which the skip OS interval is required to be decreased again by the step value Δd does not occur.

FIGS. 19A to 19D are graphs showing the steps shown in FIG. 16. Referring to FIG. 19A, a graph in which data is transmitted by inserting a skip OS based on an initial interval $D_0$ is shown. As shown in FIG. 19A, the skip OS SKPos is inserted for each initial interval $D_0$.

When the pre-overflow or the pre-underflow is not generated in a process of transmitting and receiving data by inserting the skip OS based on the initial interval $D_0$ as shown in FIG. 19A, the skip OS interval is increased by the step value Δd as shown in FIG. 19B. Accordingly, the skip OS is inserted for each adjusted skip OS interval $D_1$.

As shown in FIG. 19B, when the pre-overflow or the pre-underflow is not generated in a process of transmitting and receiving data by inserting the skip OS based on the adjusted interval $D_1$, the skip OS interval is increased again by the step value Δd as shown in FIG. 19C. Accordingly, the skip OS is inserted for each adjusted skip OS interval $D_2$.

As shown in FIG. 19C, when the pre-overflow or the pre-underflow is not generated in a process of transmitting and receiving data by inserting the skip OS based on the adjusted interval $D_2$, the skip OS interval is increased again by the step value Δd as shown in FIG. 19D. Accordingly, the skip OS is inserted for each adjusted skip OS interval $D_3$. When the pre-overflow or the pre-underflow is generated as a result of transmitting and receiving data by inserting the skip OS for each adjusted skip OS interval $D_3$, the current skip OS interval $D_3$ is determined as the optimal skip OS interval.

FIGS. 16 to 19D show an embodiment in which the optimal skip OS interval is determined while increasing the skip OS interval by the step value from the initial skip OS interval. However, the disclosed technology is not limited thereto, and an embodiment in which the optimal skip OS interval is determined while decreasing the skip OS interval by the step value from the initial skip OS interval is also possible.

2. Lane Margining by Upstream Port

Figure 20:
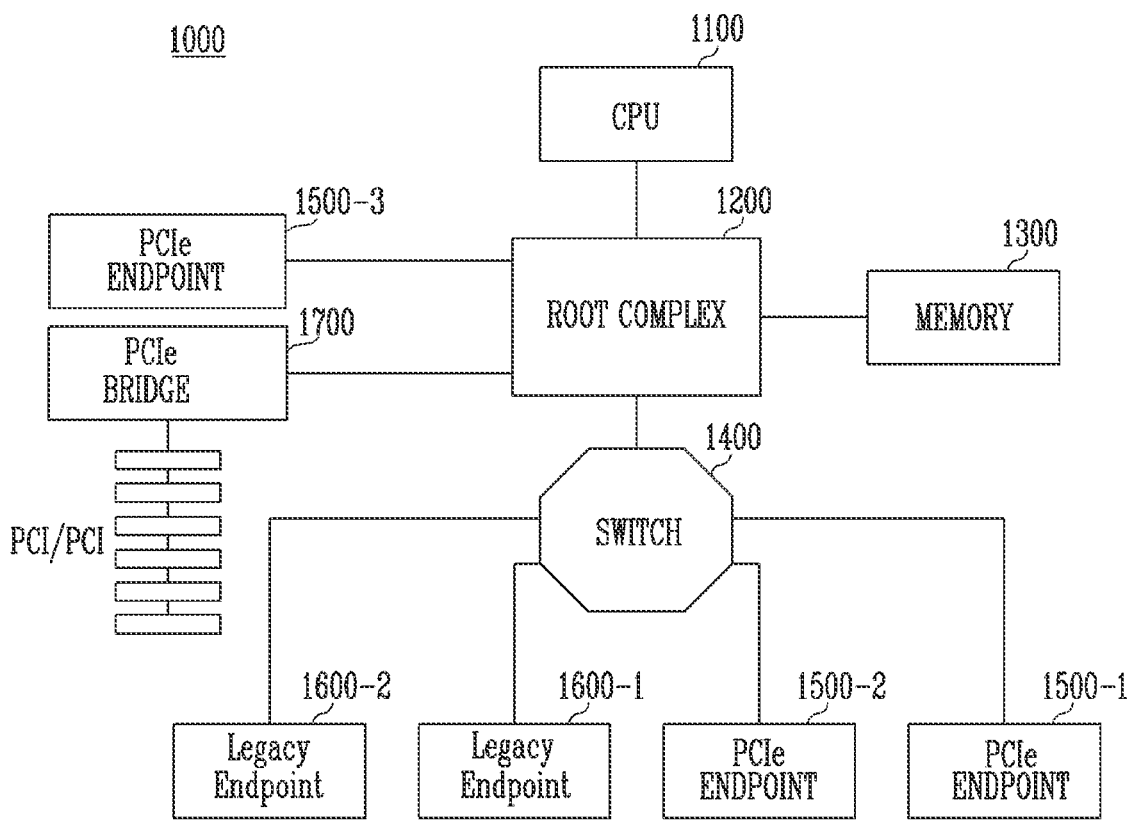
FIG. 20 is a diagram illustrating an example of a computing system based on an embodiment of the disclosed technology.

FIG. 20 is a diagram illustrating an example of a computing system based on an embodiment of the disclosed technology.

Referring to FIG. 20, a computing system 1000 may include a central processing unit (CPU) 1100, a root complex 1200, a memory 1300, a switch 1400, a peripheral component interconnect express (PCIe) endpoints 1500_1 to 1500_3, a legacy endpoints 1600_1 and 1600_2, and a PCIe bridge 1700.

The computing system 1000 may be an electronic device which supports communication using a PCIe interface. The computing system 1000 may be a PC, a laptop computer, or a mobile computing device, and include an expansion card, an expansion board, an adaptor card, an add-in card, or an accessary card. Also, the computing system 1000 may include a printed circuit board (PCB) which can be inserted into an electrical connector or an expansion slot on a mother board of the computing system 1000 so as to provide an additional function to the computing system 1000 through an expansion bus. Also, the computing system 1000 may include a storage device such as a solid state drive (SSD), and include a graphic card, a network card, a USB card, or the like.

The CPU 1100 may be electrically connected to each component of the computing system 1000, and control each operation of the computing system 1000. Specifically, the CPU 1100 may control components of hardware or software, which is connected to the CPU 1100, by driving an operating system or an application program, and perform various data processing and calculations. Also, the CPU 1100 may execute software or an application, which is used to control an operation of the computing system 1000.

The root complex 1200 may be a root hub, a controller hub, or a root controller in a PCIe interconnect architecture. For example, the root complex 1200 may include a chipset, a memory controller hub (MCH), a north bridge, an interconnect controller hub (ICH), a south bridge, and a root controller/hub. Also, the root complex 1200 may connect the CPU 1100 and the memory 1300 to an input/output (I/O) hierarchy. The root complex 1200 may support a peer-to-peer (P2P) routing. The root complex 1200 may include at least one host bridge and at least one root port. The root complex 1200 may support one or more PCIe ports. In some implementations, a port may indicate the interface between a PCIe component and a link and include differential transmitters and receivers. In some implementations, an upstream port is a port that points in the direction of the root complex, and a downstream port is a port that points away from the root complex.

The memory 1300 may store data, commands, or a program code, necessary for an operation of the computing system 1000. In some implementations, the memory 1300 may store program codes for executing one or more operating systems (OSs) and one or more virtual machines (VMs) and program codes for executing a virtualization intermediary (VI) for managing the VMs. Also, the memory 1300 may be implemented as a volatile memory device such as a DRAM or an SRAM.

The switch 1400 may route a packet or message upstream or downstream. Specifically, the switch 1400 may route the packet or message upstream to a layer toward the root complex 1200 from a PCIe endpoint (e.g., 1500_1). Also, the switch 1400 may route the packet or message downstream to a layer toward a PCIe endpoint (e.g., 1500_2) from the root complex 1200.

The switch 1400 may include a logic assembly of a plurality of virtual PCI-to-PCI bridge devices. A device which may be connected to the switch 1400 may include an internal or external device or a component, which is connected to electronic systems such as a network interface controller (NIC), an add-in card, an audio processor, a network processor, a hard-drive, a storage device, a CD/DVD ROM, a monitor, a printer, a mouse, a keyboard, a router, a mobile storage device, a firewire device, a universal serial bus (USB), a scanner, and other input/output devices. Although not shown in detail, the device may include a PCIe-to-PCI/PCI-X bridge supporting a PCI device of legacy or another version.

In some implementations, the root complex 1200 may be connected to an endpoint. The endpoint may represent a type of function which may become a requester or completer of a PCIe transaction. Here, the requester may include a device that originates a transaction in a PCIe architecture, and the completer may include a device addressed or targeted by a requester. The endpoint may be classified into a legacy endpoint and a PCIe endpoint. In some implementations, endpoints are devices other than root complex and switches that are requesters or completers of PCIe transactions.

The PCIe endpoints 1500_1 to 1500_3 and the legacy endpoints 1600_1 and 1600_2 may serve as the requester or completer of the PCIe transaction. A transaction layer packet (TLP) communicated through the PCIe endpoints 1500_1 to 1500_3 and the legacy endpoints 1600_1 and 1600_2 provides a configuration space header. Also, the PCIe endpoints 1500_1 to 1500_3 and the legacy endpoints 1600_1 and 1600_2 provide a configuration request as a completer.

The PCIe endpoints 1500_1 to 1500_3 and the legacy endpoints 1600_1 and 1600_2 may be divided based on the size of a memory transaction. For example, when an endpoint supports a memory transaction exceeding 4 GB, the endpoint may be categorized as the PCIe endpoints 1500_1 to 1500_3. When an endpoint does not support a memory transaction exceeding 4 GB, the endpoint may be the legacy endpoints 1600_1 and 1600_2. The PCIe endpoints 1500_1 to 1500_3 does not generate any input/output request, but the legacy endpoints 1600_1 and 1600_2 may provide or generate an input/output request. In addition, the PCIe end point 1500_3 may communicate a TPL with the root complex 1200. In addition, PCI/PCI-X may communicate a TLP with the root complex 1200 through the PCIe bridge 1700.

The PCIe endpoints 1500_1 and 1500_2 or the legacy endpoints 1600_1 and 1600_2 may communicate a TLP with the switch 1400.

The PCIe endpoints 1500_1 to 1500_3 may be a function having a type 00h configuration space header. The PCIe endpoints 1500_1 to 1500_3 may support a configuration request as a completer. A PCIe compatible software driver and an application program may be made such that any lock semantic is not used when the PCIe endpoints 1500_1 to 1500_3 are accessed. The PCIe endpoints 1500_1 to 1500_3 operating as the requester of the memory transaction may generate an address greater than 4 GB. When an interrupt resource is requested, the PCIe endpoints 1500_1 to 1500_3 may be necessary to support message signaled interrupt (MSI), MSI-X, or both of them. When the MSI is implemented, the PCIe endpoints 1500_1 to 1500_3 may support a 64-bit message address version of an MSI functional structure. A minimum memory address range requested by a base address register may be 128 bytes. The PCIe endpoints 1500_1 to 1500_3 may exhibit in one of hierarchy domains started in the root complex 1200.

The legacy endpoints 1600_1 and 1600_2 may be a function that includes a type 00h configuration space header. The legacy endpoints 1600_1 and 1600_2 may support a configuration request as a completer. The legacy endpoints 1600_1 and 1600_2 may support an I/O request as the completer. The legacy endpoints 1600_1 and 1600_2 may accept an I/O request for one or both of positions 80h and 84h, regardless of the I/O decode configuration of a corresponding endpoint. The legacy endpoints 1600_1 and 1600_2 may generate an I/O request. The legacy endpoints 1600_1 and 1600_2 may include extended configuration space capabilities. It is unnecessary for the legacy endpoints 1600_1 and 1600_2 operating as the requester of the memory transaction to generate an address having 4 GB or more. When an interrupt resource is requested, the legacy endpoints 1600_1 and 1600_2 are necessary to support the MSI, the MSI-X, or both of them. When the MSI is implemented, the legacy endpoints 1600_1 and 1600_2 may support a 32-bit or 64-bit message address version of the MSI functional structure. The legacy endpoints 1600_1 and 1600_2 may support 32-bit address specification with respect to the base address register which requests a memory resource. The legacy endpoints 1600_1 and 1600_2 may exhibit in one of the hierarchy domains started in the root complex 1200.

Figure 21:
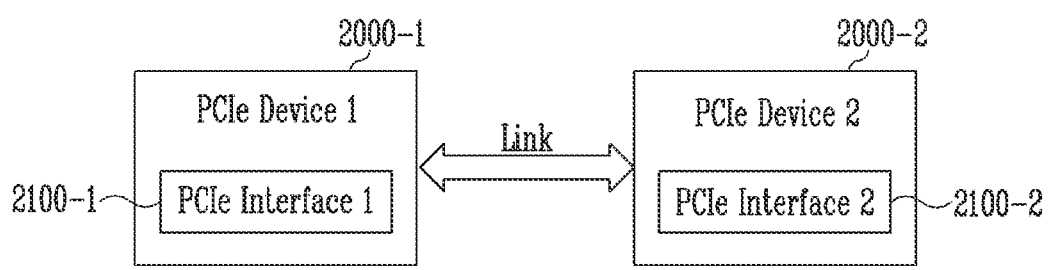
FIG. 21 is a diagram illustrating a peripheral component interconnect express (PCIe) device based on an embodiment of the disclosed technology.

FIG. 21 is a diagram illustrating a PCIe device based on an embodiment of the disclosed technology.

Referring to FIG. 21, the PCIe device may include a PCIe interface. In some implementations, the PCIe device may be an electronic device which supports transmission/reception using the PCIe interface. For example, a first PCIe device 2000-1 or a second PCIe device 2000-2 may be any one of the root complex 1200, the switch 1400, the PCIe endpoints 1500_1 to 1500_3, the legacy endpoints 1600_1 and 1600_2, and the PCIe bridge 1700, which are shown in FIG. 20.

Also, the first PCIe device 2000-1 or the second PCIe device 2000-2 may perform communication by using a first PCIe interface 2100-1 or a second PCIe interface 2100-2. Specifically, the first PCIe device 2000-1 may convert data to be transmitted from the second PCIe device 2000-2 into a protocol suitable for communication by using the first PCIe interface 2100-1. In addition, the first PCIe device 2000-1 and the second PCIe device 2000-2 may form a link. The first PCIe device 2000-1 and the second PCIe device 2000-2 may communicate with each other through the formed link. For example, the first PCIe device 2000-1 or the second PCIe device 2000-2 may transmit/receive a packet through the link.

Figure 22:
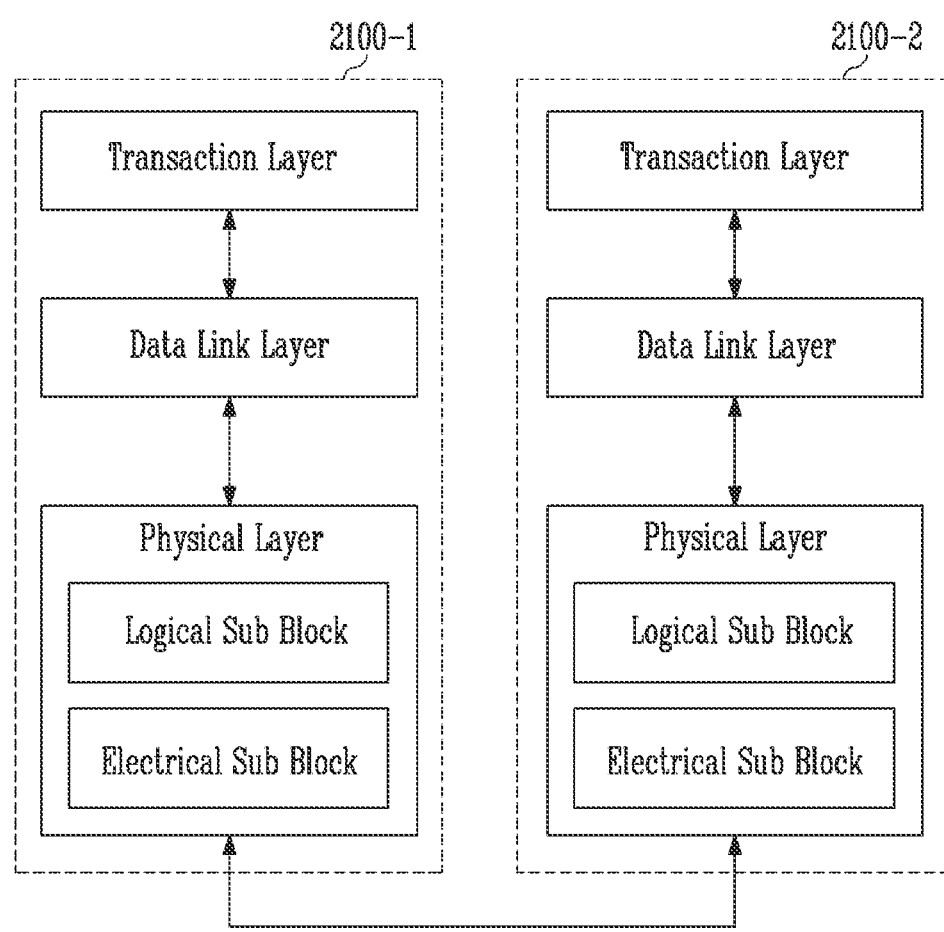
FIG. 22 is a diagram illustrating a PCIe interface based on an embodiment of the disclosed technology.

FIG. 22 is a diagram illustrating a PCIe interface based on an embodiment of the disclosed technology.

Referring to FIG. 22, a first PCIe interface 2100-1 and a second PCIe interface 2100-2 are illustrated. The first PCIe interface 2100-1 and the second PCIe interface 2100-2 may be formed in the same structure, and therefore, the first PCIe interface 2100-1 will be mainly described.

PCIe layers included in the first PCIe interface 2100-1 may include three discrete logical layers. For example, the first PCIe interface 2100-1 may include a transaction layer, a data link layer, and a physical layer. Each of the layers may include two sections. One section may process outbound (or transmitted) information, and the other may process inbound (or received) information. Also, the first PCIe interface 2100-1 may use packets to communicate information between other PCIe interfaces.

An upper layer in the structure of the PCIe interface may be the transaction layer. The transaction layer may assemble and disassemble transaction layer packets (TLPs). Also, the transaction layer may implement a split transaction, which allows another traffic to be transferred through a link while a target system assembles data necessary for a response. In some implementations, four transaction address spaces may include a configuration address space, a memory address space, an input/output address space, and a message address space. A memory space transaction may include one or more of read and write requests to transfer data to/from a memory-mapped location. In one example, the memory space transaction may use two different address formats, e.g., a short address format, such as a 32-bit address, or a long address format, such as 64-bit address. A configuration space transaction may be used to access a configuration space of the PCIe devices. A transaction to the configuration space may include read and write requests. A message space transaction (or message) may be defined to support in-band communication between PCIe devices.

The transaction layer may store link configuration information or others. Also, the transaction layer may generate a TLP, or convert a received TLP into a payload or status information.

A middle layer in the structure of the PCIe interface may be the data link layer, and the data link layer may perform a function of an intermediate stage between the transaction layer and the physical layer. A major function of the data link layer may include link management and data integrity including error detection and error correction. Specifically, a transmission side of the data link layer may accept TLPs assembled in the transaction layer, provide a data protection code, or calculate a TLP sequence number. Also, the transmission side of the data link layer may transmit the data protection code and the TLP sequence number to the physical layer such that the data protection code and the TLP sequence number are transmitted through the link. A reception side of the data link layer may check the data integrity of TLPs received from the physical layer, and transmit the TLPs to the transaction layer so as to perform additional processing.

The physical layer may include circuitry for an interface operation. The circuitry may include a driver, an input buffer, a series-parallel conversion circuit, a parallel-series conversion circuit, phase locked loops (PLLs), and an impedance matching circuit.

Also, the physical layer may include a logical sub-block and an electrical sub-block, which physically transmit a packet to an external PCIe device. The logical sub-block may perform a role necessary for a digital function of the physical layer. In relation to this, the logical sub-block may include a transmission section for preparing sending information to be transmitted by the physical sub-block and a reception section for identifying and preparing information received before the received information is transferred to the data link layer. The physical layer may include a transmitter and a receiver. The transmitter may receive a symbol transmitted to an external device as the transmitter is serialized by the logical sub-block. In addition, the receiver may receive serialized symbols from the external device, and convert the received symbol into a bit stream. The bit stream may be deserialized to be supplied to the logical sub-block. For instance, the physical layer may convert TLPs received from the data link layer into a serialized format, and convert a packet received from the external device into a deserialized format. Also, the physical layer may include logical functions associated with interface initialization and maintenance.

Although the structure of the first PCIe interface 2100-1 and the second PCIe interface 2100-2 is exemplarily illustrated in FIG. 22, the structure of the first PCIe interface 2100-1 and the second PCIe interface 2100-2 may include an arbitrary form such as a quick path interconnect structure, a next generation high performance computing interconnect structure, or another hierarchical structure.

Figure 23:
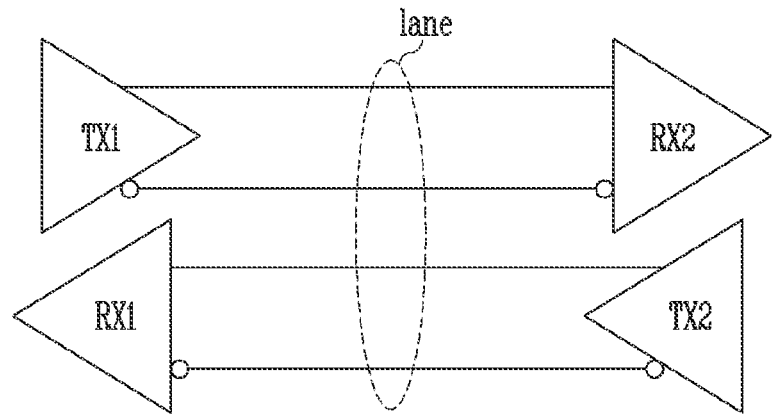
FIG. 23 is a diagram illustrating a transmitter, a receiver, and a lane based on an embodiment of the disclosed technology.

FIG. 23 is a diagram illustrating a transmitter, a receiver, and a lane based on an embodiment of the disclosed technology.

Referring to FIG. 23, a first transmitter TX1, a second transmitter TX2, a first receiver RX1, and a second receiver RX2 are illustrated. A lane may include a path that includes differentially driven signaling pairs. In some implementations, a lane may include two differential signaling pairs, with one pair for receiving data and the other for transmitting data. For example, a lane may include a transmission path pair configured for transmission and a reception path pair configured for reception. A PCIe device may include a transmission logic for transmitting data to another PCIe device and a reception logic for receiving data from another PCIe device. For example, the lane may include two transmission paths connected to the first transmitter TX1 and two reception paths connected to the first receiver RX1.

The transmission path may include an arbitrary path for transmitting data, such as a transmission line, a copper line, an optical line, a wireless communication channel, an infrared communication link, or another communication path. In addition, the reception path may include a path that is implemented identically to the transmission path although it is used for reception.

Connection between two PCIe devices, e.g., the first PCIe device 2000-1 and the second PCIe device 2000-2 may be a link. The link may support one or more lanes. For example, the link may include a plurality of lanes. In addition, each lane may include a set of differential signal pairs (one pair for transmission and one pair for reception). The differential signal may include signal pairs which have the same frequency and the same amplitude but have phases opposite to each other. For example, when a first signal is at a rising edge at which the first signal is toggled from 0 to V+, a second signal may be at a falling edge at which the second signal is toggled from 0 to V−. The PCIe device can use signal integrity, e.g., more satisfactory electrical characteristics such as cross-coupling, voltage overshoot/undershoot, and ringing, by using the differential signal. The PCIe device can more rapidly adjust a transmission frequency. Also, the link may include a plurality of lanes so as to adjust a bandwidth. For example, the link may include 1 lane, 2 lanes, 4 lanes, 8 lanes, 12 lanes, 32 lanes, 64 lanes, or the like.

Figure 24:
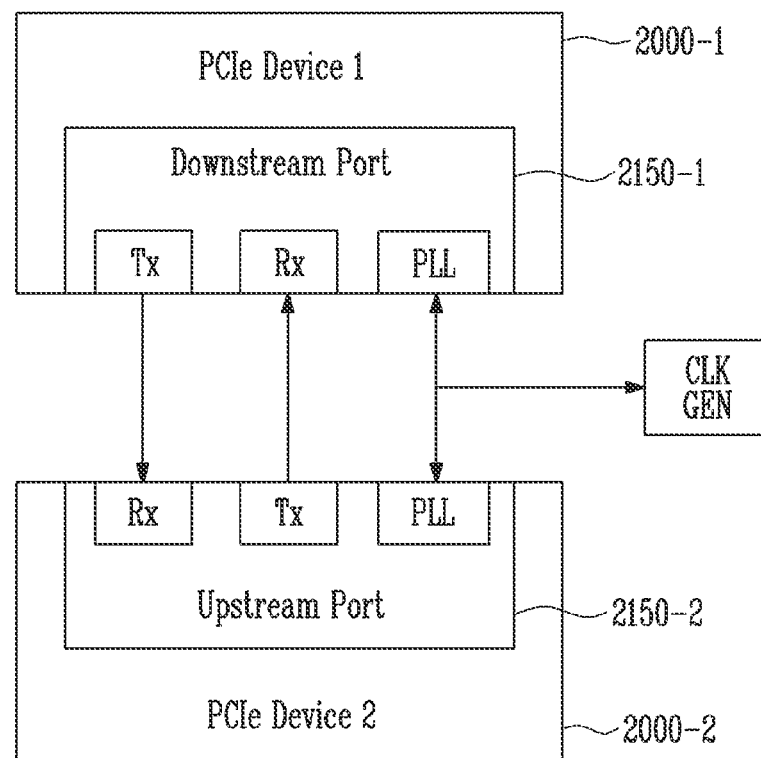
FIG. 24 is a diagram illustrating a port based on an embodiment of the disclosed technology.

FIG. 24 is a diagram illustrating a port based on an embodiment of the disclosed technology.

Referring to FIG. 24, there are illustrated a downstream port 2150-1 and an upstream port 2150-2 respectively included in a first PCIe device 2000-1 and a second PCIe device 2000-2.

In some implementations, the first PCIe device 2000-1 may be a layer upper than that of the second PCIe device 2000-2, and data movement and transmission to an upper layer may be referred to as upstream. On the contrary, data movement and transmission to a lower layer may be referred to as downstream. For example, referring to FIG. 20, the switch 1400 may support routing of the upstream and the downstream. Specifically, the upstream may be routing of a packet or message upstream to a layer toward the root complex 12000 from a PCIe endpoint (e.g., 1500_1), and the downstream may be routing of a packet or message downstream to a layer toward a PCIe endpoint (e.g., 1500_2) from the root complex 1200.

In some implementations, a first PCIe device 2000-1 that includes the downstream port 2150-1 may be referred to as an "upstream component." The upstream component may include the root complex 1200 or the switch 1400, which is shown in FIG. 20. In addition, the second PCIe device 2000-2 including the upstream port 2150-2 may be referred to as a "downstream component." The downstream component may represent any one of the switch 1400, the PCIe endpoints 1500_1 to 1500_3, the legacy endpoints 1600_1 and 1600_2, and the PCIe bridge 1700, which are shown in FIG. 20.

Each of the downstream port 2150-1 and the upstream port 2150-2 may include a transmitter Tx, a receiver Rx, and a phase locked loop (PLL) circuit. The PLL circuit may generate a clock signal to be supplied to the transmitter Tx or the receiver Rx by using a clock signal provided from a clock signal generator CLK GEN. The PLL circuit may generate a clock signal with a changed frequency by multiplying a signal received from the clock signal generator CLK GEN. For example, the PLL circuit may multiply a reference clock signal REFCLK having a frequency of 100 MHz into a clock signal having a frequency of 2.5 GHz. The transmitter Tx may convert a parallel data signal into a serial data signal by using an output signal of the PLL circuit, and transmit the serial data signal to the external device, e.g., an external PCIe device. The receiver Rx may receive a serial data signal transmitted from the external device, and generate a clock signal for recovering the received serial data signal and a clock signal for converting the recovered serial data signal into a parallel data signal by using the output signal of the PLL circuit. The clock signal generator CLK GEN may generate a reference clock signal REFCLK used for an operation of a PCIe interface. The operation of the PCIe interface may be communication with the external PCIe device.

Figure 25:
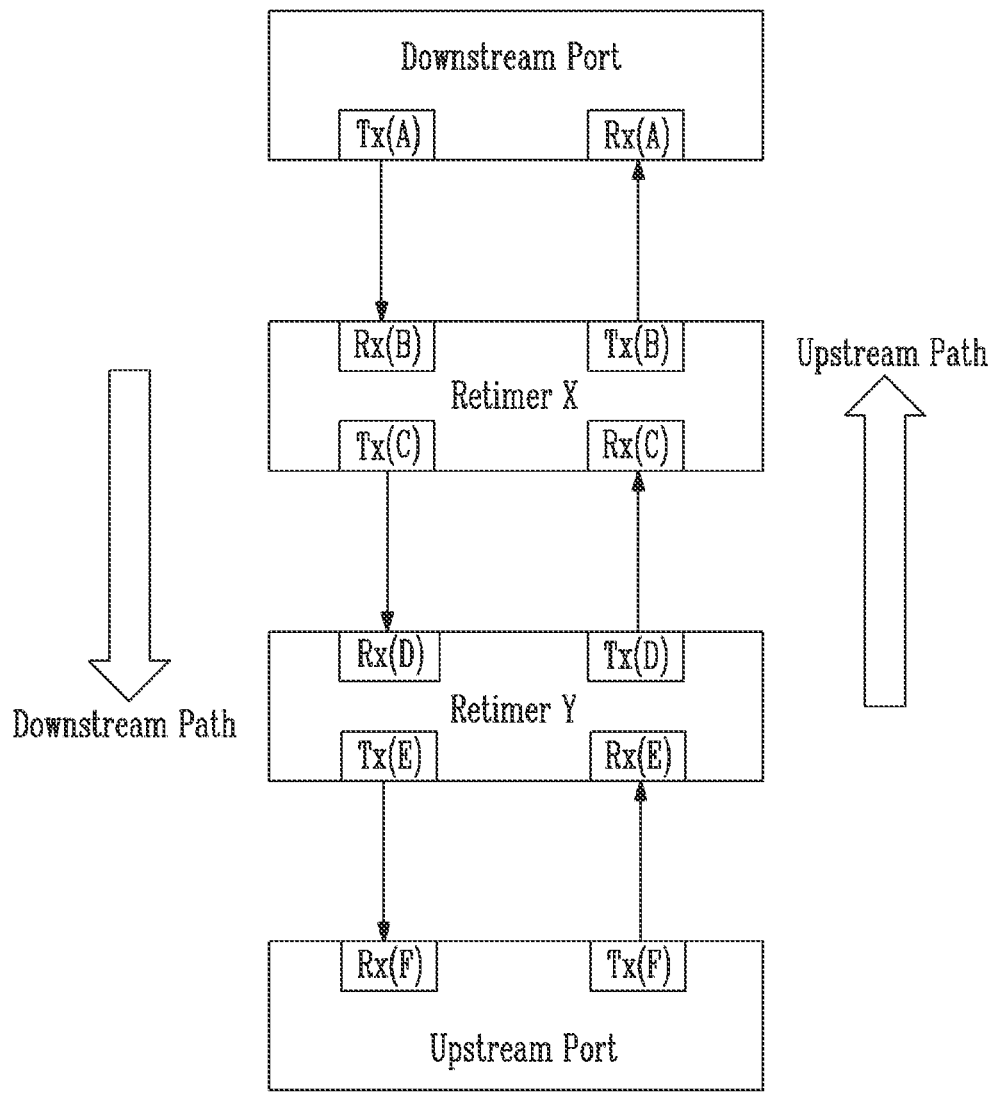
FIG. 25 is a diagram illustrating an interconnect structure that includes one or more retimers based on an embodiment of the disclosed technology.

FIG. 25 is a diagram illustrating an interconnect structure that includes one or more retimers based on an embodiment of the disclosed technology.

Referring to FIG. 25, the interconnect structure may include a downstream port, an upstream port, and one or more retimers. The downstream port may be a port included in an upstream component, and the upstream port may be a port included in a downstream component. The downstream port may interconnect components of the computing system in a downstream path. For example, the downstream port may indicate a port that is disposed in an upstream component to provide an interface for transmission from an upstream component to a downstream component. The upstream port may interconnect components of the computing system in an upstream path. For example, the upstream port may indicate a port that is disposed in a downstream component to provide an interface for transmission from a downstream component to an upstream component. Since an interconnect operates at a high speed, one or more retimers may be connected between the downstream port and the upstream port.

The retimer may serve a signal repeater which operates in a physical layer to finely tune signals from the downstream port and the upstream port. A main function of the retimer may be signal retiming. The retimer may recover a reception signal and retransmit the recovered signal by using a local clock and a new transmission equalization circuit.

In some implementations, the retimer may include two pseudo ports. The pseudo port may dynamically determine each of downstream/upstream directions. The pseudo port oriented in the downstream direction may be a downstream pseudo port. The pseudo port oriented in the upstream direction may be an upstream pseudo port.

The downstream port may include a transmitter Tx(A) and a receiver Rx(A). A retimer X may include transmitters Tx(B) and Tx(C) and receivers Rx(B) and Rx(C). A retimer Y may include transmitters Tx(D) and Tx(E) and receivers Rx(D) and Rx(E). The upstream port may include a transmitter Tx(F) and a receiver Rx(F).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter TX(C). The receiver Rx(D) may be connected to the transmitter Tx(C), and repeat the data and the signal to the transmitter Tx(E). The receiver Rx(F) may be connected to the transmitter Tx(E).

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the transmitter Tx(B).

The downstream port, the upstream port, and the retimers may be connected through a link. In some implementations, the downstream port may acquire margin status information of a plurality of lanes included in the link through a lane margining operation. For example, the downstream port may transmit a margin command to the retimer X, the retimer Y, and the upstream port, and the retimer X, the retimer Y, and the upstream port may provide the margin status information to the downstream port in response to the margin command. The margin command and a response signal to the margin command may be transmitted through a control skip ordered set. For example, the downstream port may provide the margin command through the control skip ordered set. Also, the retimer X, the retimer Y, and the upstream port may provide the response signal to the margin command through the control skip ordered set.

The lane margining operation may be performed in all ports. The computing system may acquire margin status information in a receiver included in the port receiving the margin command through the lane margining operation of the corresponding receiver. In some implementations, the margin status information may include voltage and time associated with a receiver position. In one example, the margin status information may include margin information on a voltage and timing at a current receiver position. The lane margining operation of the receiver may be performed when the margin command is received, when the link operates at a data speed of 16.0 GT/s or more, and when the link is in an L0 state.

The lane margining operation may include issuing a command that instructs the receiver to shift a sampling spot to the left or right in a voltage timing diagram through several steps with respect to the timing or to shift the sampling spot to the top or bottom in the voltage timing diagram through several steps with respect to the voltage. The receiver may report the margin status information as a response to the margin command. The margin command may include commands indicating various operations associated with the lane margining operation.

The computing system may use a margining lane control register and a margining lane status register in each port to obtain the margin status information on the receiver. The downstream port may control the lane margining operation of the receiver by performing recording on an appropriate bit of the margining lane control register. Also, the downstream port may update the margin status information of the receiver through the margining lane status register.

A conventional lane margining operation may be controlled by only the downstream port. A conventional upstream port cannot control the lane margining operation, and may provide only the margin status information acquired through the lane margining operation. In addition, characteristics of the physical layer may vary depending on a kind of platform and whether the retimer exists. The setting of a transmitter and a receiver of the physical layer may also vary.

The disclosed technology can be implemented in some embodiments to tune the setting of a transmitter and a receiver by controlling the lane margining operation in the upstream port.

Figure 26:
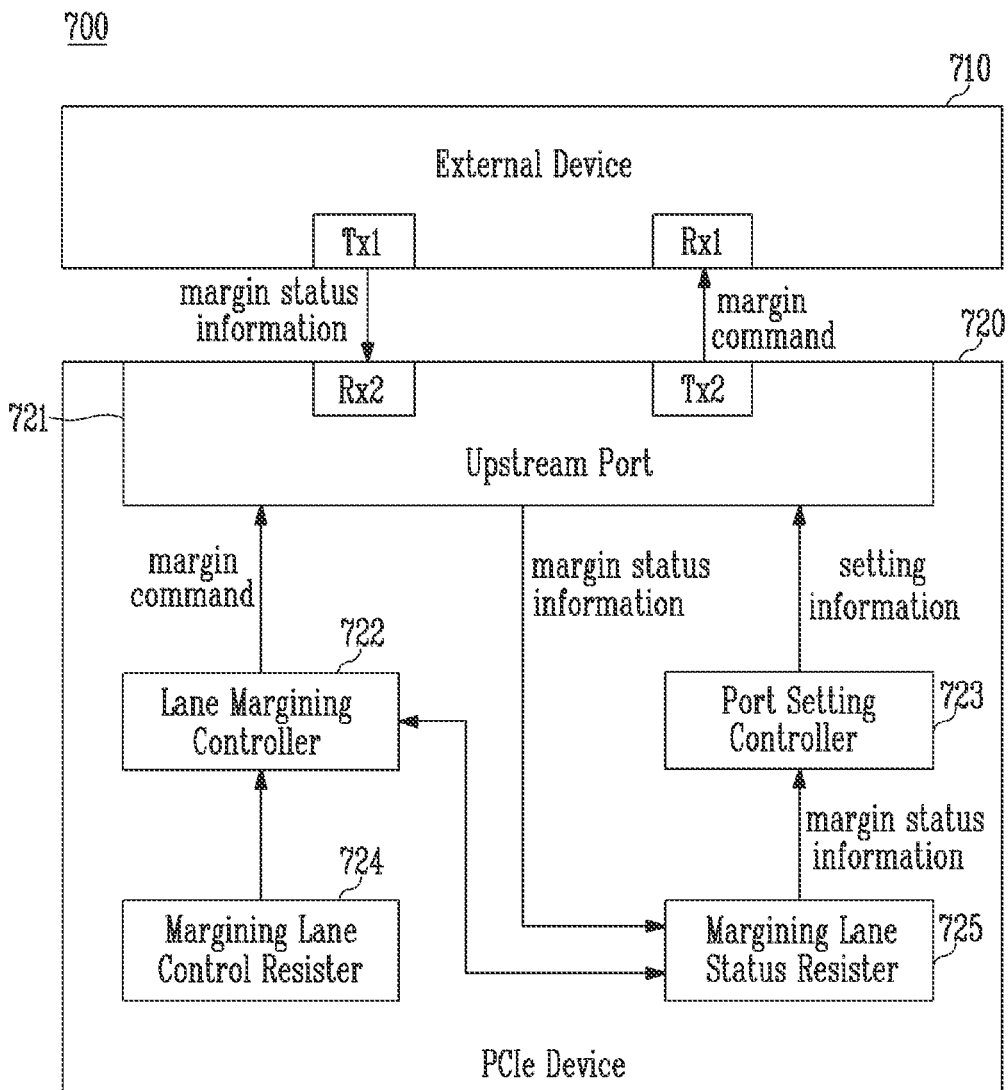
FIG. 26 is a diagram illustrating a computing system that includes a PCIe device based on an embodiment of the disclosed technology.

FIG. 26 is a diagram illustrating a computing system that includes a PCIe device based on an embodiment of the disclosed technology.

The computing system 700 based on the embodiment of the disclosed technology may include an external device 710 and a PCIe device 720.

The external device 710 may use a PCIe interface connected to the PCIe device 720 through a link. The link may include a plurality of lanes. Although FIG. 26 illustrates only one external device 710, more than one external device 710 may be connected to the PCIe device 720.

In some implementations, the external device 710 may be a device located on an upstream path. For example, the external device 710 may be an upstream component or a retimer. The external device 710 may be a device belonging to a layer upper than the PCIe device 720. Therefore, a direction in which a signal moves from the external device 710 to the PCIe device 720 may be defined as downstream, and a direction in which a signal moves from the PCIe device 720 to the external device 710 may be defined as upstream.

In some implementations, the external device 710 may include a downstream port. The downstream port may include a transmitter Tx1 and a receiver Rx1. The transmitter Tx1 included in the external device 710 may be connected to a receiver Rx2 included in the PCIe device 720, and the receiver Rx1 included in the external device 710 may be connected to a transmitter Tx2 included in the PCIe device 720.

In some implementations, the PCIe device 720 may be a downstream component located on a downstream path.

The PCIe device 720 may include an upstream port 721, a lane margining controller 722, a port setting controller 723, a margining lane control register 724, and a margining lane status register 725.

The upstream port 721 may be connected to the external device 710 through the link. Specifically, the upstream port 721 may communicate data or a signal with the downstream port included in the external device 710. The upstream port 721 may include the transmitter Tx2 and the receiver Rx2.

The lane margining controller 722 may control a lane margining operation. The lane margining controller 722 may control the upstream port 721 to transmit a margin command for requesting the lane margining operation to the external device 710. The upstream port 721 may generate the margin command and transmit the margin command through the transmitter.

The lane margining operation may be an operation of acquiring margin status information of each of the plurality of lines included in the link. The margin status information may include at least one of eye margin information and error information. The eye margin information may include an indication regarding the quality of signal transmitted/received through the plurality of lanes. The error information may include information associated with an error occurring from the lane margining operation. For example, the margin status information may include a timing step number, a maximum timing offset, a voltage step number, a maximum voltage offset, a voltage sampling ratio, a timing sampling ratio, a maximum lane number (e.g., a maximum lane number with which the lane margining operation can be simultaneously performed), an independent error sampler (e.g., whether any error has occurred due to the lane margining operation), an error number (e.g., a number of errors which have occurred during the lane margining operation), a sample number (e.g., a number of margined bits), and the like.

In some implementations, the margin command and the margin status information may be transmitted through a control skip ordered set.

A skip ordered set may be used in clock tolerance compensation. Specifically, the skip ordered set may be used to compensate for a frequency difference between bit rates at two ends of the link. An elastic buffer which performs the compensation may be included in a logical sub-block of a physical layer at a reception side. A transmission interval of the skip ordered set may be set based on predesigned transmission and the absolute value of a reception clock frequency difference.

The elastic buffer may temporarily store data to be transmitted or temporarily store data to be received. Specifically, the elastic buffer may be included in each of transmission and reception sides. The elastic buffer may temporarily store a skip ordered set and a data block.

In some implementations, the lane margining controller 722 may increase/decrease the transmission interval of the skip ordered set, based on a transmission history of the skip ordered set. The transmission history may include a transmission interval of the skip ordered set, a recovery state entrance frequency corresponding to a change in the transmission interval or the transmission interval, and the like. For example, the lane margining controller 722 may calculate a frequency of recovery state entrance corresponding to the transmission interval, and increase/decrease the transmission interval of the skip ordered set, based on the frequency of the recovery state entrance. In another example, the lane margining controller 722 may fix the transmission interval of the skip ordered set, when a request for the recovery state entrance is not received for a predetermined time.

Also, the lane margining controller 722 may increase/decrease the transmission interval of the skip ordered set, based on the state of the elastic buffer included in the external device 710. For example, the transmission side and the reception side operate at different frequencies, an error of overflow or underflow may occur. When the error of the overflow or underflow occurs, the computing system 700 may enter into the recovery state. For instance, communication between PCIe devices may be suspended, and the problem of large performance deterioration and data loss may occur in a PCIe system. Therefore, the lane margining controller 722 may request information representing the state of the elastic buffer included in the external device 710 through the margin command. Specifically, the lane margining controller 722 may request the external device 710 of the information representing the state of the elastic buffer by transmitting the margin command having a vendor defined type to the external device 710. The lane margining controller 722 may increase/decrease the transmission interval of the skip ordered set, based on the received state of the elastic buffer of the external device 710.

In some implementations, the external device 710 may perform a lane margining operation in response to the margin command. The external device 710 may acquire margin status information through the lane margining operation, and store the acquired margin status information. In addition, the lane margining controller 722 may control the upstream port 721 to receive the margin status information from the external device 710. The upstream port 721 may receive the margin status information through the receiver.

The port setting controller 723 may determine a setting of the upstream port 721, based on the margin status information. The port setting controller 723 may adjust characteristics of a signal transmitted/received through the link by controlling settings of the transmitter and the receiver, which are included in the upstream port 721, based on the margin status information. For example, the port setting controller 723 may control the settings of the transmitter and the receiver, which are connected to each lane, to improve the quality of signals transmitted/received through the lanes and satisfy specified requirements.

The margining lane control register 724 may store information associated with the margin command. For example, the margining lane control register 724 may include a receiver number, a margin type, a usage model, a margin payload, and the like. The receiver number may be information for identifying a receiver receiving the margin command. The margin type may be information representing the type of a margin. The usage model may be information representing whether the lane margining operation is to be performed. The margin payload may be information representing an operation to be instructed through the margin command.

The margining lane status register 725 may store the margin status information. For example, the margining lane status register 725 may include a receiver number status, a margin type status, a usage model status, a margin payload status, and the like.

The lane margining controller 722 may control the lane margining operation of the computing system 700 by using the margining lane control register 724 and the margining lane status register 725. For example, the lane margining controller 722 may record information associated with the margin command in the margining lane control register 724. Also, the lane margining controller 722 may record the margin status information in the margining lane status register 725.

In some implementations, the lane margining controller 722 may control the upstream port 721 to transmit a transmitter setting request to the external device 710. The transmitter setting request may be used to request an operation for determining a setting of the transmitter included in the external device 710. For example, a setting of the receiver Rx2 included in the upstream port 721 may be determined based on a setting of the transmitter Tx1 included in the external device 710. When errors are detected frequently in the receiver Rx2 or when the setting of the receiver Rx2 according to the setting of the transmitter Tx1 does not satisfy a required value of the system, it is necessary to perform an operation for updating the setting of the receiver Rx2. The PCIe device 720 may allow the setting of the transmitter Tx1 to be re-determined by transmitting a transmitter setting request to the external device 710. For instance, the PCIe device 720 may induce a transmitter setting operation of the external device 710 through the transmitter setting request. In some implementations, upon receiving a transmitter setting request for requesting the external device 710 to provide transmitter setting information, the external device 710 may perform a transmitter setting operation to obtain and/or provide the transmitter setting information.

The external device 710 may determine the setting of the transmitter Tx1, based on the transmitter setting request. Subsequently, the PCIe device 720 may control the upstream port 721 to receive transmitter setting information from the external device 710. The transmitter setting information may include information associated with the setting of the transmitter included in the external device 710. For example, the transmitter setting information may include a hint associated with the setting of the transmitter. The PCIe device 720 may determine a setting of the receiver included in the upstream port 721, based on the transmitter setting information.

In some implementations, the transmitter setting request and the transmitter setting information may be transmitted through the margin command having the vendor defined type.

Figure 27:
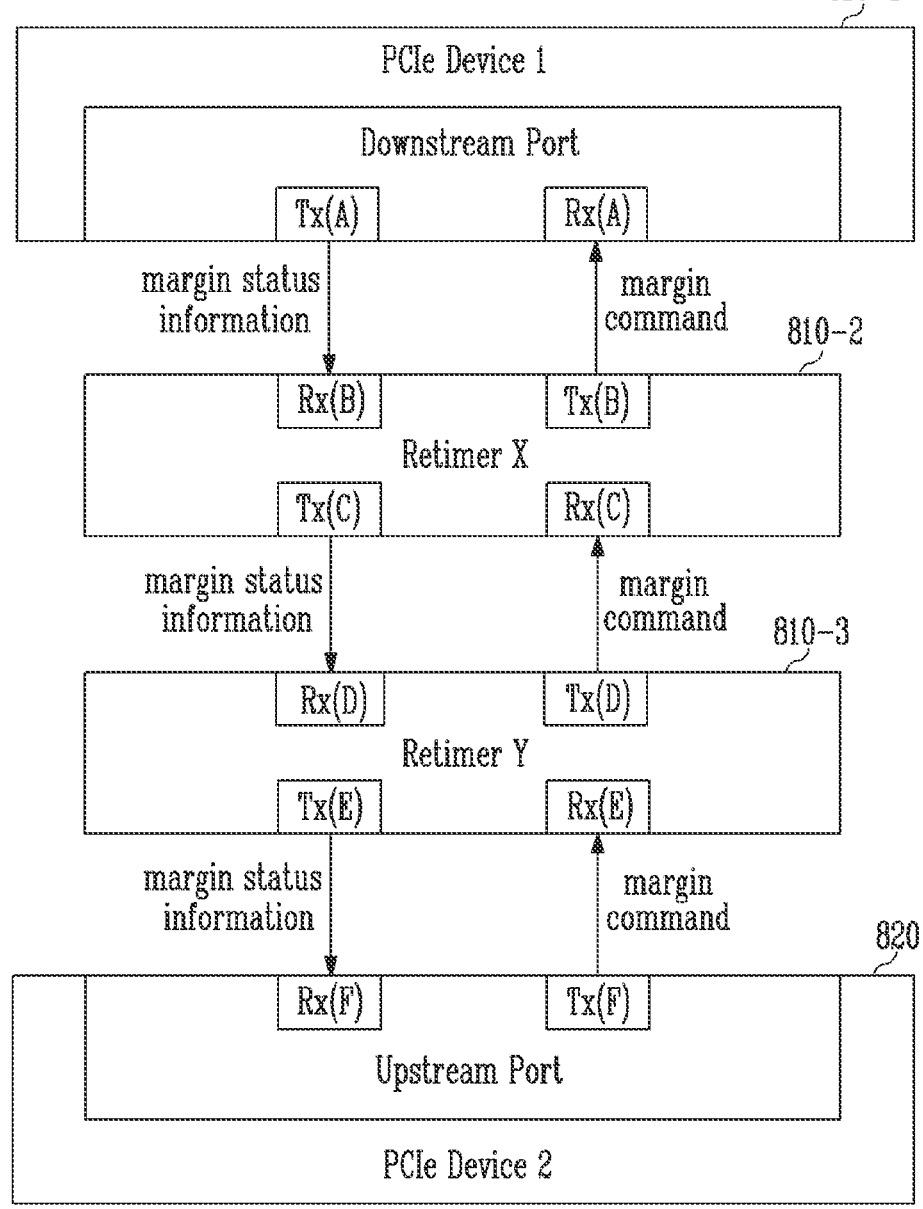
FIG. 27 is a diagram illustrating an operation for determining a setting of a transmitter controlled by an upstream port based on an embodiment of the disclosed technology.

FIG. 27 is a diagram illustrating an operation for determining a setting of a transmitter controlled by an upstream port based on an embodiment of the disclosed technology.

Referring to FIG. 27, a computing system 800 may include a first PCIe device 810-1, retimers 810-2 and 810-3, and a second PCIe device 820. The first PCIe device 800-1 and the retimers 810-2 and 810-3 may represent the external device 710 shown in FIG. 26. The second PCIe device 820 may represent the PCIe device 720 shown in FIG. 26.

In some implementations, the first PCIe device 810-1 may include a downstream port. The downstream port may include a transmitter Tx(A) and a receiver Rx(A). A retimer X 810-2 may include transmitters Tx(B) and Tx(C) and receivers Rx(B) and Rx(C). A retimer Y 810-3 may include transmitters Tx(D) and Tx(E) and receivers Rx(D) and Rx(E). The second PCIe device 820 may include an upstream port. The upstream port may be connected to the downstream port through a link. The upstream port may include a transmitter Tx(F) and a receiver Rx(F).

In some implementations, the retimers 810-2 and 810-3 may be connected between the first PCIe device 810-1 and the second PCIe device 820.

In some implementations, each of the retimers 810-2 and 810-3 may include a downstream pseudo port. For example, a downstream pseudo port of the retimer X 810-2 may include the transmitter Tx(C) and the receiver Rx(C). A downstream pseudo port of the retimer Y 810-3 may include the transmitter Tx(E) and the receiver Rx(E). Also, each of the retimers 810-2 and 810-3 may include an upstream pseudo port. For example, an upstream pseudo port of the retimer X 810-2 may include the transmitter Tx(B) and the receiver Rx(B). An upstream pseudo portion of the retimer Y 810-3 may include the transmitter Tx(D) and the receiver Rx(D).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter Tx(C). The receiver Rx(D) may be connected to the transmitter Tx(C), and repeat the data and the signal to the transmitter Tx(E). The receiver Rx(F) may be connected to the transmitter Tx(E).

The downstream pseudo ports and the upstream pseudo ports of the retimers 810-2 and 810-3 may be connected to the upstream port and the downstream port through the link.

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the transmitter Tx(B).

In some implementations, each of the first PCIe device 810-1 and the second PCIe device 820 may include a margining lane control register and a margining lane status register. Each of the first PCIe device 810-1 and the second PCIe device 820 may record information associated with a margin command in the margining lane control register, and record margin status information in the margining lane status register.

In some implementations, the second PCIe device 820 may transmit a margin command to the first PCIe device 810-1 and the retimers 810-2 and 810-3 through the upstream port. For example, the upstream port may generate a margin command. The margin command may include information for identifying any one of the receivers included in the first PCIe device 810-1, the second PCIe device 820, and the retimers 810-2 and 810-3. The upstream port may provide the margin command to the first PCIe device 810-1 and the retimers 810-2 and 810-3 through a control skip ordered set.

The first PCIe device 810-1 and the retimers 810-2 and 810-3 may acquire margin status information of each of a plurality of lanes in response to the margin command. For example, the first PCIe device 810-1 and the retimers 810-2 and 810-3 may acquire margin status information by performing a lane margining operation corresponding to the margin command. The first PCIe device 810-1 and the retimers 810-2 and 810-3 may transmit the margin status information to the second PCIe device 820 through the control skip ordered set in response to the margin command. For example, the downstream port may transmit the margin status information to the upstream port through the control skip ordered set in response to the margin command.

In addition, the second PCIe device 820 may receive the margin status information as a response to the margin command from the first PCIe device 810-1 and the retimers 810-2 and 810-3. For example, the upstream port may receive the margin status information as a response to the margin command from the downstream port. The second PCIe device 820 may determine a setting of the transmitter Tx(F) included in the upstream port, based on the margin status information. Subsequently, the first PCIe device 810-1 may determine a setting of the receiver Rx(A) included in the downstream port, based on the setting of the transmitter Tx(F), which is determined by the second PCIe device 820. In addition, the retimers 810-2 and 810-3 may determine settings of the receiver Rx(C) and the receiver Rx(E), based on the setting of the transmitter Tx(F), which is determined by the second PCIe device 820.

Thus, based on the embodiment of the disclosed technology, the lane margining operation is controlled through the upstream port, so that settings of the transmitter and the receiver, which are included in the upstream port, can be tuned in real time. Accordingly, the state of the link can be optimized.

Figure 28:
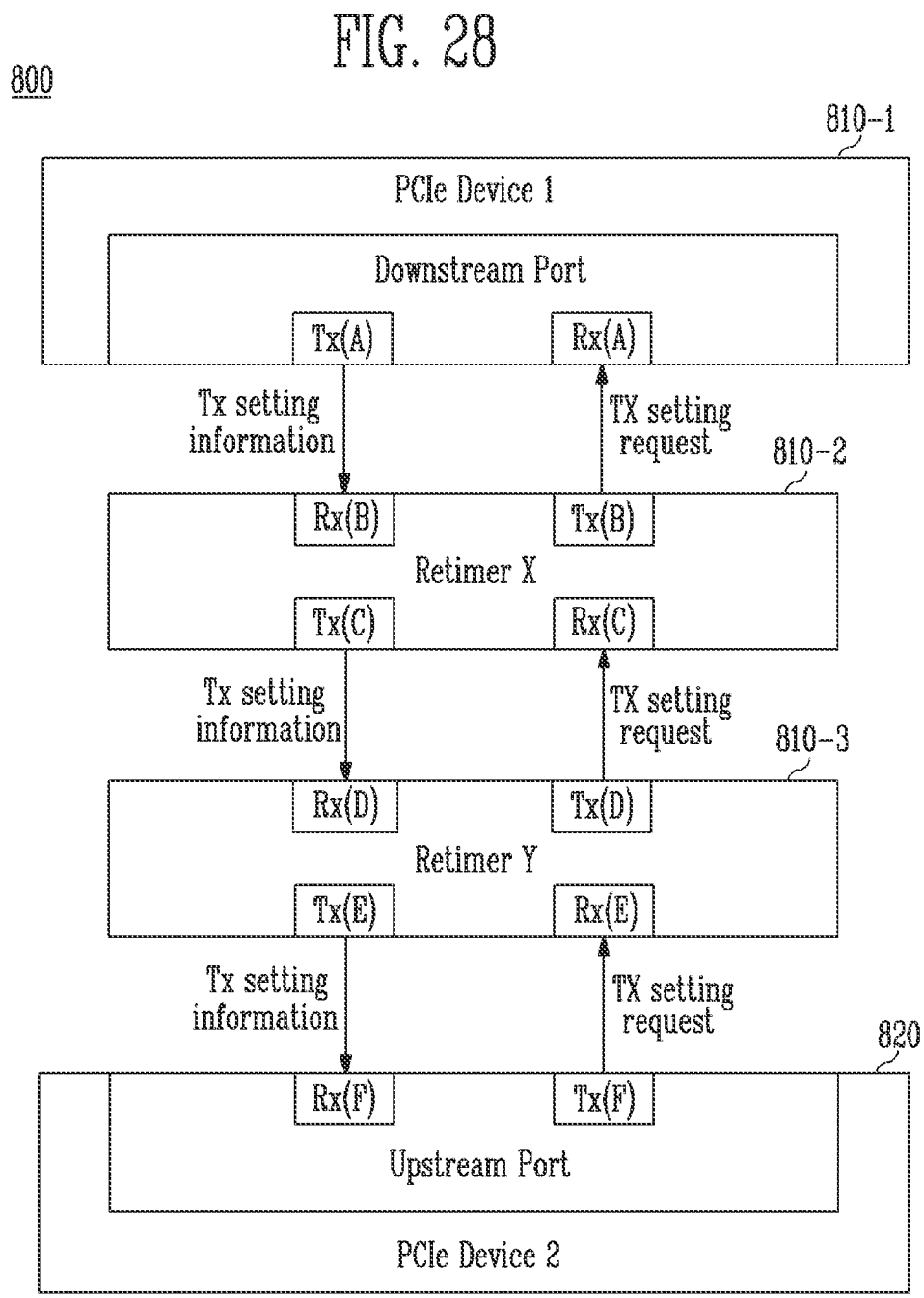
FIG. 28 is a diagram illustrating an operation for determining a setting of a receiver controlled by an upstream port based on an embodiment of the disclosed technology.

FIG. 28 is a diagram illustrating an operation for determining a setting of a receiver controlled by an upstream port based on an embodiment of the disclosed technology.

Referring to FIG. 28, the computing system 800 may include a first PCIe device 810-1, retimers 810-2 and 810-3, and a second PCIe device 820. The first PCIe device 800-1 and the retimers 810-2 and 810-3 may represent the external device 710 shown in FIG. 26. The second PCIe device 820 may represent the PCIe device 720 shown in FIG. 26.

In some implementations, the first PCIe device 810-1 may include a downstream port. The downstream port may include a transmitter Tx(A) and a receiver Rx(A). A retimer X 810-2 may include transmitters Tx(B) and Tx(C) and receivers Rx(B) and Rx(C). A retimer Y 810-3 may include transmitters Tx(D) and Tx(E) and receivers Rx(D) and Rx(E). The second PCIe device 820 may include an upstream port. The upstream port may be connected to the downstream port through a link. The upstream port may include a transmitter Tx(F) and a receiver Rx(F).

In some implementations, the retimers 810-2 and 810-3 may be connected between the first PCIe device 810-1 and the second PCIe device 820.

In some implementations, each of the retimers 810-2 and 810-3 may include a downstream pseudo port. For example, a downstream pseudo port of the retimer X 810-2 may include the transmitter Tx(C) and the receiver Rx(C). A downstream pseudo port of the retimer Y 810-3 may include the transmitter Tx(E) and the receiver Rx(E). Also, each of the retimers 810-2 and 810-3 may include an upstream pseudo port. For example, an upstream pseudo port of the retimer X 810-2 may include the transmitter Tx(B) and the receiver Rx(B). An upstream pseudo portion of the retimer Y 810-3 may include the transmitter Tx(D) and the receiver Rx(D).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter Tx(C). The receiver Rx(D) may be connected to the transmitter Tx(C), and repeat the data and the signal to the transmitter Tx(E). The receiver Rx(F) may be connected to the transmitter Tx(E).

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the transmitter Tx(B).

In some implementations, each of the first PCIe device 810-1 and the second PCIe device 820 may include a margining lane control register and a margining lane status register. Each of the first PCIe device 810-1 and the second PCIe device 820 may record information associated with a margin command in the margining lane control register, and record margin status information in the margining lane status register.

The second PCIe device 820 may transmit a transmitter setting request to the downstream port through the upstream port. The transmitter setting request may be used to request an operation for determining a setting of the transmitter included in the downstream port. For example, a setting of the receiver Rx(F) included in the upstream port may be determined according to a setting of the transmitter Tx(A) included in the downstream port. When the occurrence frequency of an error detected in the receiver Rx(F) is increased or when the setting of the receiver Rx(F) according to the setting of the transmitter Tx(A) does not satisfy a required value of the system, it is necessary to perform an operation for updating the setting of the receiver Rx(F). The second PCIe device 820 may allow the setting of the transmitter Tx(A) to be re-determined by transmitting the transmitter setting request to the downstream port. For instance, the second PCIe device 820 may induce a transmitter setting operation of the downstream port through the transmitter setting request.

The first PCIe device 810-1 may determine a setting of the transmitter included in the downstream port, based on the transmitter setting request. Subsequently, the second PCIe device 820 may receive transmitter setting information from the first PCIe device 810-1 through the upstream port. The transmitter setting information may include information associated with the setting of the transmitter included in the downstream port. For example, the transmitter setting information may include a hint associated with the setting of the transmitter. The second PCIe device 820 may determine a setting of the receiver included in the upstream port, based on the transmitter setting information.

In some implementations, the transmitter setting request and the transmitter setting information may be transmitted through the margin command having a vendor defined type.

Figure 29:
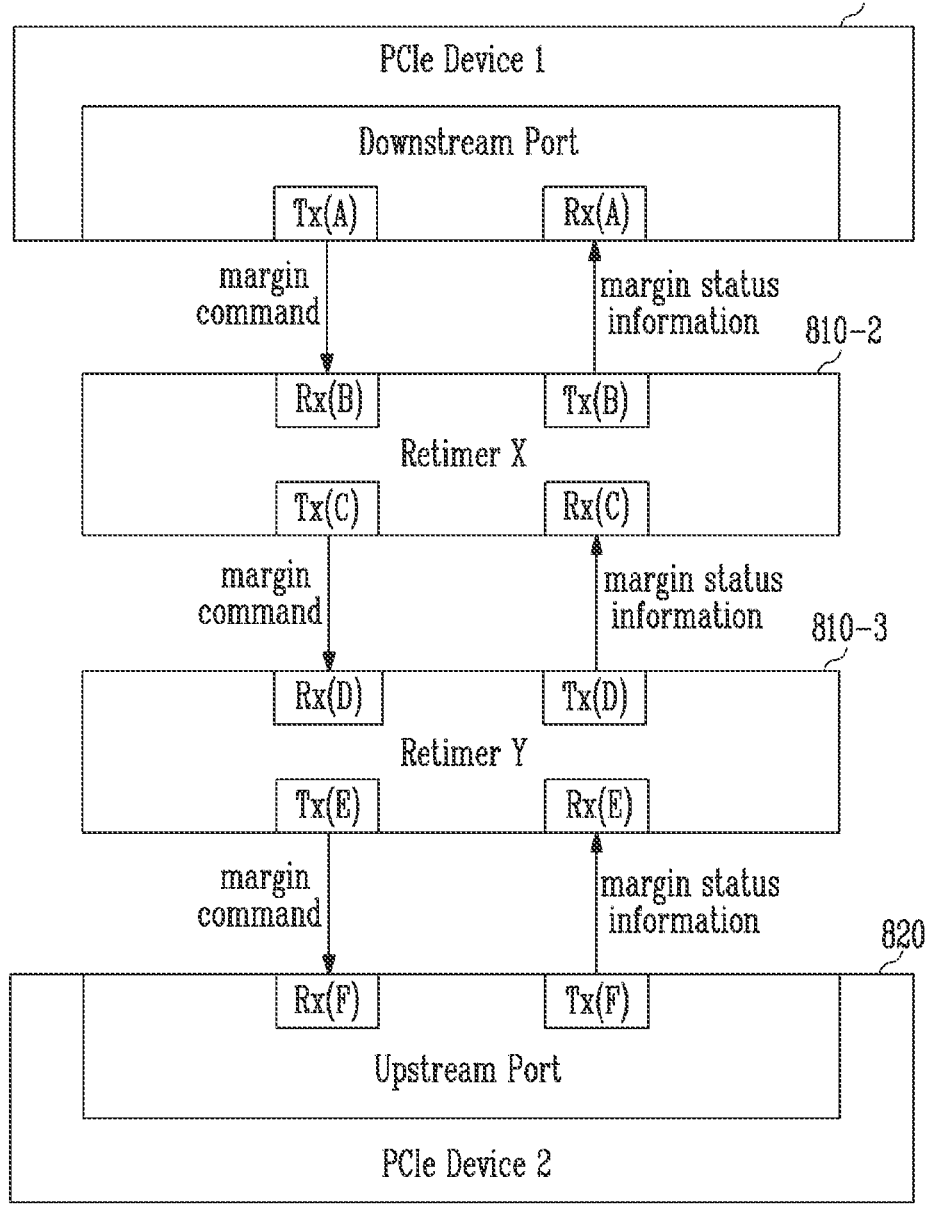
FIG. 29 is a diagram illustrating an operation for determining a setting of a transmitter controlled by a downstream port based on an embodiment of the disclosed technology.

FIG. 29 is a diagram illustrating an operation for determining a setting of a transmitter controlled by a downstream port based on an embodiment of the disclosed technology.

Referring to FIG. 29, the computing system 800 may include a first PCIe device 810-1, retimers 810-2 and 810-3, and a second PCIe device 820. The first PCIe device 800-1 and the retimers 810-2 and 810-3 may represent the external device 710 shown in FIG. 26. The second PCIe device 820 may represent the PCIe device 720 shown in FIG. 26.

In some implementations, the first PCIe device 810-1 may include a downstream port. The downstream port may include a transmitter Tx(A) and a receiver Rx(A). A retimer X 810-2 may include transmitters Tx(B) and Tx(C) and receivers Rx(B) and Rx(C). A retimer Y 810-3 may include transmitters Tx(D) and Tx(E) and receivers Rx(D) and Rx(E). The second PCIe device 820 may include an upstream port. The upstream port may be connected to the downstream port through a link. The upstream port may include a transmitter Tx(F) and a receiver Rx(F).

In some implementations, the retimers 810-2 and 810-3 may be connected between the first PCIe device 810-1 and the second PCIe device 820.

In some implementations, each of the retimers 810-2 and 810-3 may include a downstream pseudo port. For example, a downstream pseudo port of the retimer X 810-2 may include the transmitter Tx(C) and the receiver Rx(C). A downstream pseudo port of the retimer Y 810-3 may include the transmitter Tx(E) and the receiver Rx(E). Also, each of the retimers 810-2 and 810-3 may include an upstream pseudo port. For example, an upstream pseudo port of the retimer X 810-2 may include the transmitter Tx(B) and the receiver Rx(B). An upstream pseudo portion of the retimer Y 810-3 may include the transmitter Tx(D) and the receiver Rx(D).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter Tx(C). The receiver Rx(D) may be connected to the transmitter Tx(C), and repeat the data and the signal to the transmitter Tx(E). The receiver Rx(F) may be connected to the transmitter Tx(E).

The downstream pseudo ports and the upstream pseudo ports of the retimers 810-2 and 810-3 may be connected to the upstream port and the downstream port through the link.

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the transmitter Tx(B).

In some implementations, each of the first PCIe device 810-1 and the second PCIe device 820 may include a margining lane control register and a margining lane status register. The Each of the first PCIe device 810-1 and the second PCIe device 820 may record information associated with a margin command in the margining lane control register, and record margin status information in the margining lane status register In some implementations, the first PCIe device 810-1 may transmit a margin command to the second PCIe device 820 and the retimers 810-2 and 810-3 through the downstream port. For example, the downstream port may generate a margin command. The margin command may include information for identifying any one of the receivers included in the first PCIe device 810-1, the second PCIe device 820, and the retimers 810-2 and 810-3. The downstream port may provide the margin command to the second PCIe device 820 and the retimers 810-2 and 810-3 through a control skip ordered set.

The second PCIe device 820 and the retimers 810-2 and 810-3 may acquire margin status information of each of a plurality of lanes in response to the margin command. For example, the second PCIe device 820 and the retimers 810-2 and 810-3 may acquire margin status information by performing a lane margining operation corresponding to the margin command. The second PCIe device 820 and the retimers 810-2 and 810-3 may transmit the margin status information to the first PCIe device 810-1 through the control skip ordered set in response to the margin command. For example, the upstream port may transmit the margin status information to the downstream port through the control skip ordered set in response to the margin command.

In addition, the first PCIe device 810-1 may receive the margin status information as a response to the margin command from the second PCIe device 820 and the retimers 810-2 and 810-3. For example, the downstream port may receive the margin status information as a response to the margin command from the upstream port. The first PCIe device 810-1 may determine a setting of the transmitter Tx(A) included in the upstream port, based on the margin status information. Subsequently, the second PCIe device 820 may determine a setting of the receiver Rx(F) included in the upstream port, based on the setting of the transmitter Tx(A), which is determined by the first PCIe device 810-1. In addition, the retimers 810-2 and 810-3 may determine settings of the receiver Rx(C) and the receiver Rx(E), based on the setting of the transmitter Tx(A), which is determined by the first PCIe device 810-1.

Thus, based on the embodiment of the disclosed technology, the lane margining operation is controlled through the downstream port in addition to the upstream port, so that a means for optimizing the state of the link can be diversified.

Figure 30:
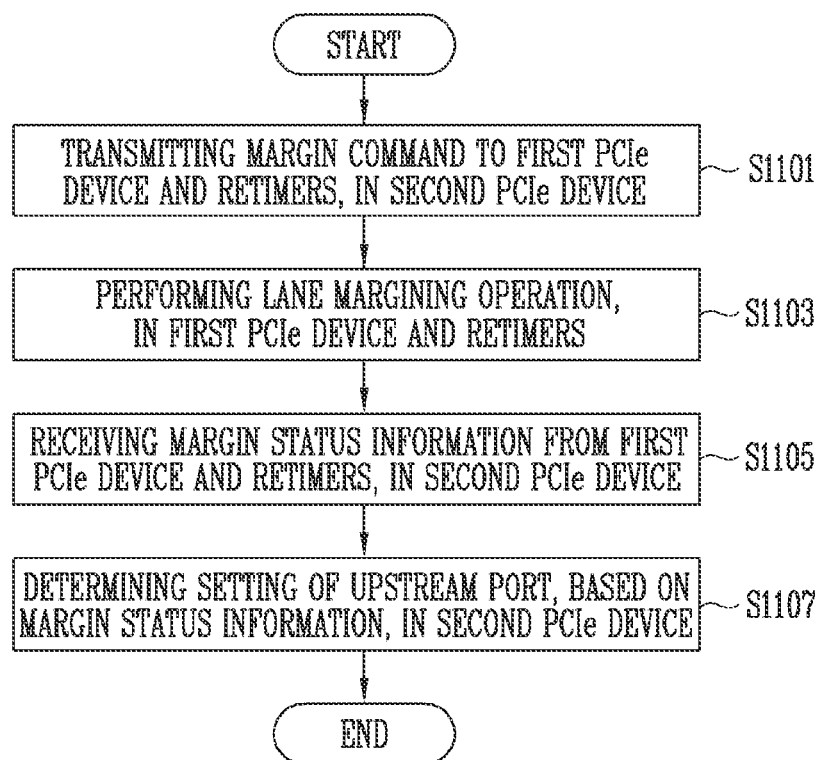
FIG. 30 is a flowchart illustrating a method for determining a setting of an upstream port based on an embodiment of the disclosed technology.

FIG. 30 is a flowchart illustrating a method of determining a setting of an upstream port based on an embodiment of the disclosed technology.

The method shown in FIG. 30 may be performed by, for example, the computing system shown in FIG. 26 or 27. Hereinafter, for convenience of description, the method will be described based on the computing system 800 shown in FIG. 27.

In operation S1101, the computing system 800 may transmit a margin command for requesting a lane margining operation to the first PCIe device and the retimers, in the second PCIe device.

Margin status information may include eye margin information, error information, or others. In some implementations, the eye margin information may include an indication regarding the quality of signal transmitted/received through the plurality of lanes. In some implementations, the error information may include information associated with an error occurring from the lane margining operation In operation S1103, the computing system 800 may perform the lane margining operation, in the first PCIe device and the retimers. In some implementations, the lane margining operation may be performed to acquire margin status information that indicates a margin of each of the plurality of lanes.

In operation S1105, the computing system 800 may receive margin status information of each of the plurality of lanes from the first PCIe device and the retimers, in the second PCIe device.

In operation S1107, the computing system 800 may determine a setting of the upstream port, based on the margin status information, in the second PCIe device.

The computing system 800 may determine a setting of the transmitter included in the second PCIe device, based on the margin status information.

Figure 31:
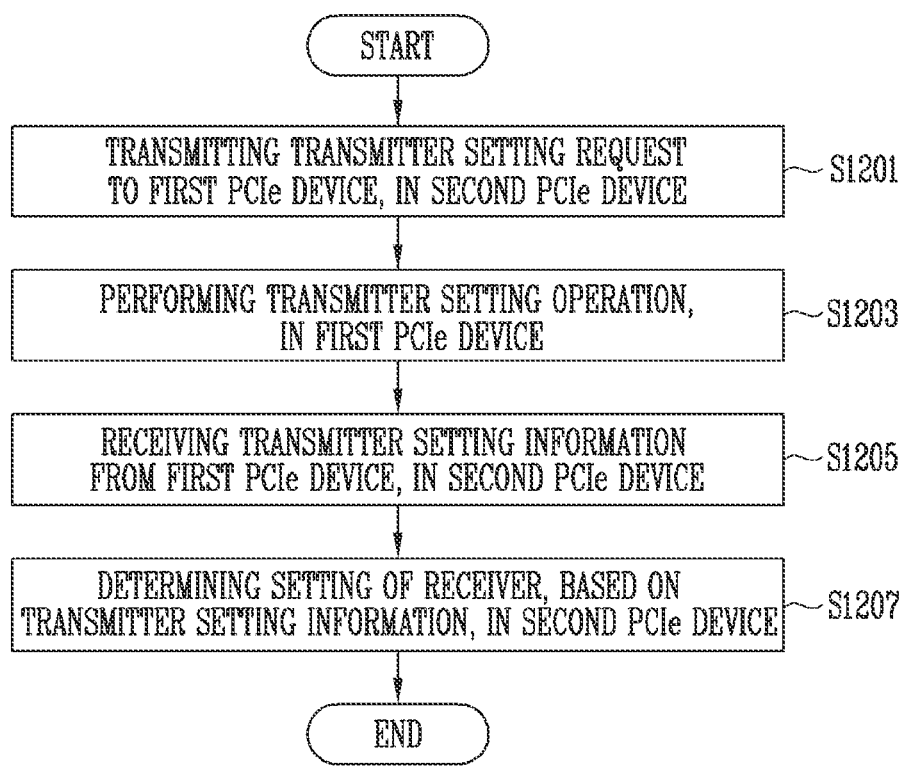
FIG. 31 is a flowchart illustrating a method for determining a setting of a receiver based on an embodiment of the disclosed technology.

FIG. 31 is a flowchart illustrating a method of determining a setting of a receiver based on an embodiment of the disclosed technology.

The method shown in FIG. 31 may be performed by, for example, the computing system shown in FIG. 26 or 27. Hereinafter, for convenience of description, the method will be described based on the computing system 800 shown in FIG. 27.

In operation S1201, the computing system 800 may transmit a transmitter setting request to the first PCIe device, in the second PCIe device.

In operation S1203, the computing system 800 may perform a transmitter setting operation, in the first PCIe device. In some implementations, the first PCIe device may perform the transmitter setting operation to obtain transmitter setting information.

In operation S1205, the computing system 800 may receive the transmitter setting information from the first PCIe device, in the second PCIe device. The transmitter setting information may include information associated with a setting of the transmitter included in the first PCIe device.

In operation S1207, the computing system 800 may determine a setting of the receiver, based on the transmitter setting information, in the second PCIe device.

Figure 32:
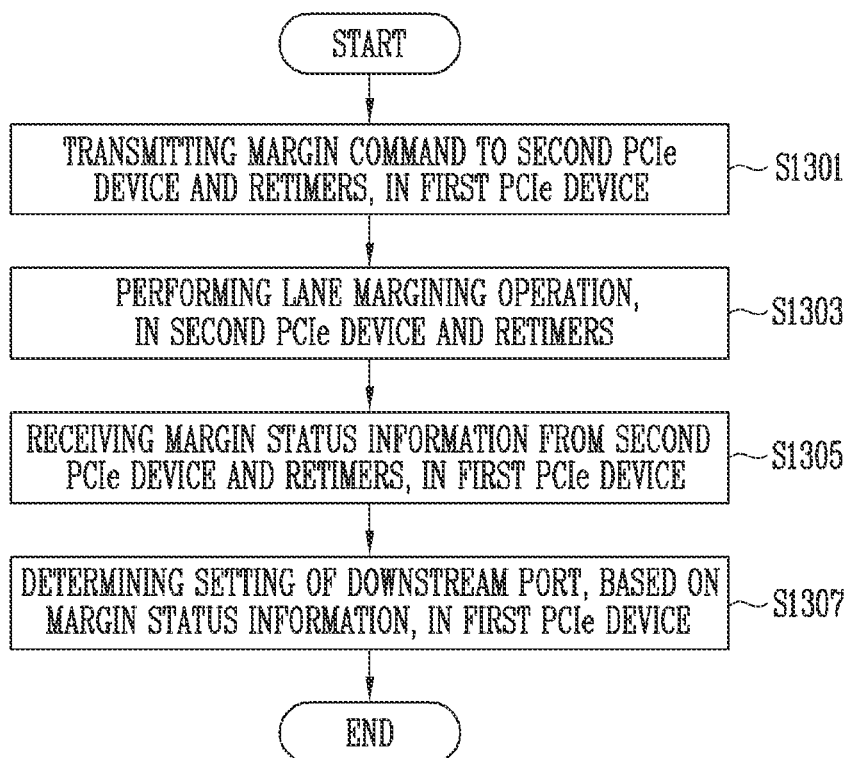
FIG. 32 is a flowchart illustrating a method for determining a setting of a downstream port based on an embodiment of the disclosed technology.

FIG. 32 is a flowchart illustrating a method of determining a setting of a downstream port based on an embodiment of the disclosed technology.

The method shown in FIG. 32 may be performed by, for example, the computing system shown in FIG. 26 or 27. Hereinafter, for convenience of description, the method will be described based on the computing system 800 shown in FIG. 26.

In operation S1301, the computing system 800 may transmit a margin command for requesting a lane margining operation to the second PCIe device and the retimers, in the first PCIe device.

Margin status information may include eye margin information, error information, or others.

In operation S1303, the computing system 800 may perform the lane margining operation, in the second PCIe device and the retimers.

In operation S1305, the computing system 800 may receive margin status information of each of the plurality of lanes from the second PCIe device and the retimers, in the first PCIe device.

In operation S1307, the computing system 800 may determine a setting of the downstream port, based on the margin status information, in the first PCIe device.

The computing system 800 may determine a setting of the transmitter included in the first PCIe device, based on the margin status information.

In some embodiments of the disclosed technology, there can be provided a PCIe device capable of controlling a lane margining operation in an upstream port, and a computing system that includes the PCIe device.

In some embodiments of the disclosed technology, a lane margining operation is controlled in an upstream port, so that setting of a transmitter and a receiver, which are included in the upstream port, can be tuned in real time. Accordingly, the state of a link connecting PCIe devices can be optimized.

3. Transmission Interval of Skip OS Optimization

Figure 33:
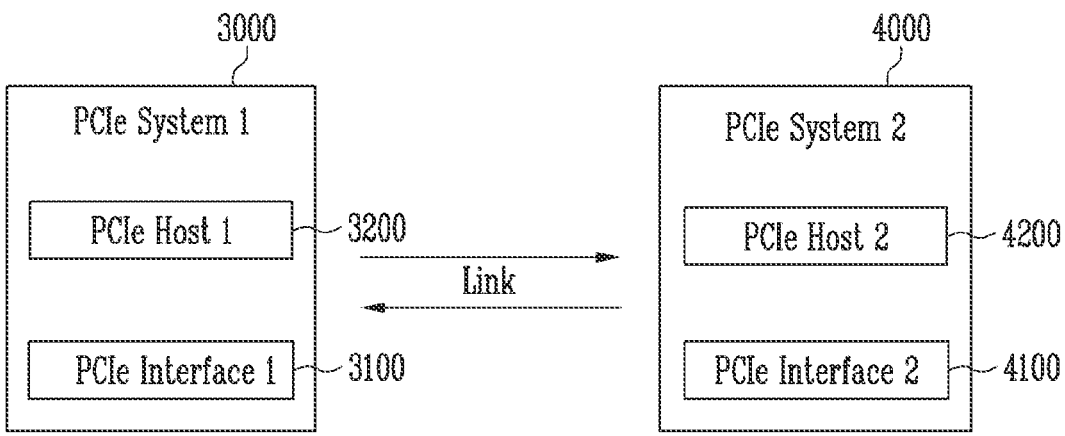
FIG. 33 is a diagram illustrating a peripheral component interconnect express (PCIe) system in accordance with an embodiment of the disclosed technology.

FIG. 33 is a diagram illustrating a peripheral component interconnect express (PCIe) system in accordance with an embodiment of the disclosed technology.

Referring to FIG. 33, the PCIe system may include a PCIe host and a PCIe interface. Specifically, a first PCIe system 3000 may include a first PCIe interface 3100 and a first PCIe host 3200, and a second PCIe system 4000 may include a second PCIe interface 4100 and a second PCIe host 4200.

The first PCIe system 3000 or the second PCIe system 4000 may be an electronic device which supports communication using a PCIe interface. For example, the first PCIe system 3000 may be a PC, a laptop computer, or a mobile computing device. In addition, the second PCIe system 4000 may mean an expansion card, an expansion board, an adaptor card, an add-in card, or an accessary card, and each of them may mean a printed circuit board (PCB) which can be inserted into an electrical connector or an expansion slot on a mother board of the first PCIe system 3000 so as to provide an additional function to the first PCIe system 3000 through an expansion bus. Also, the second PCIe system 4000 may be a storage device such as a solid state drive (SSD), and be a graphic card, a network card, or a USB card.

The first PCIe system 3000 or the second PCIe system 4000 may perform communication by using the first PCIe interface 3100 or the second PCIe interface 4100. Specifically, the first PCIe system 3000 or the second PCIe system 4000 may convert data received from the first PCIe host 3200 or the second PCIe host 4200 into a protocol suitable for communication by using the first PCIe interface 3100 or the second PCIe interface 4100. The first PCIe system 3000 or the second PCIe system 4000 may form a link, and communicate with each other through the link. For example, the first PCIe system 3000 or the second PCIe system 4000 may transmit and/or receive a packet through the link.

Figure 34:
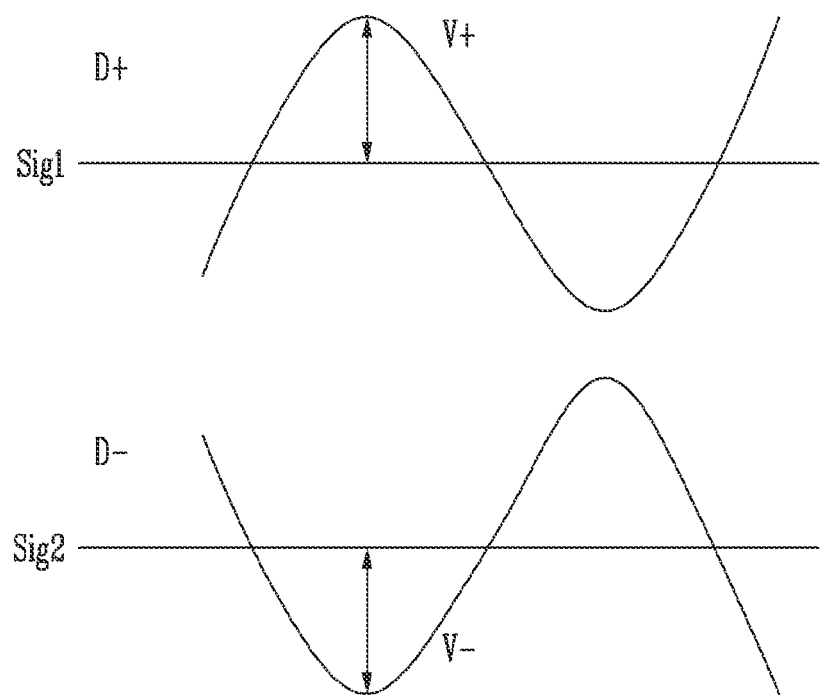
FIG. 34 is a diagram illustrating a differential signal in accordance with an embodiment of the disclosed technology.

FIG. 34 is a diagram illustrating a differential signal in accordance with an embodiment of the disclosed technology.

Referring to FIG. 34, a differential signal pair (Sig1 and Sig2) is illustrated. A PCIe system may use a differential signal pair for transmission and/or reception. The differential signal pair includes two signals which have a same frequency and a same amplitude but with phases opposite to each other. For example, when a first signal is at a rising edge at which the first signal is toggled from 0 to V+, a second signal may be at a falling edge at which the second signal is toggled from 0 to V−. The PCIe system can use signal integrity, e.g., more satisfactory electrical characteristics such as cross-coupling, voltage overshoot/undershoot, and ringing, by using the differential signal. The PCIe system can more rapidly adjust a transmission frequency.

Figure 35:
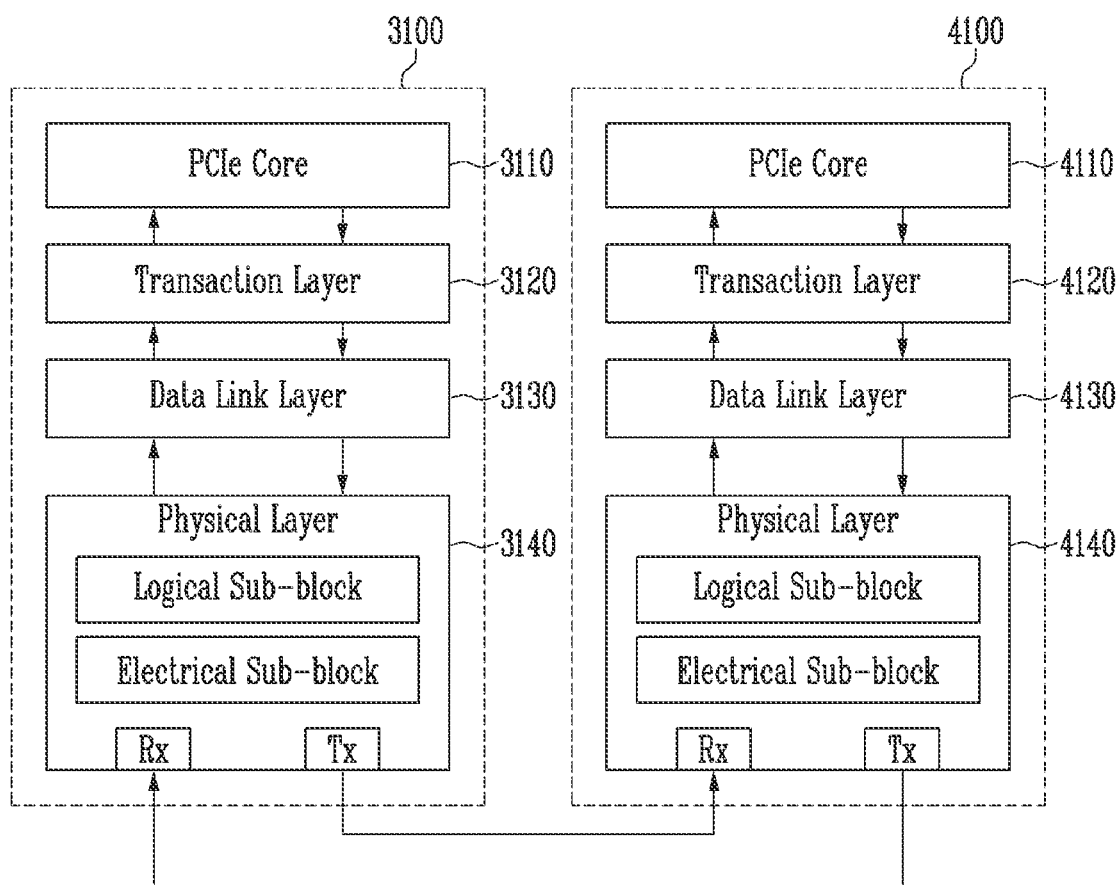
FIG. 35 is a diagram illustrating a PCIe interface in accordance with an embodiment of the disclosed technology.

FIG. 35 is a diagram illustrating a PCIe interface in accordance with an embodiment of the disclosed technology.

Referring to FIG. 35, a first PCIe interface 3100 and a second PCIe interface 4100 are illustrated.

PCIe layers included in the PCIe interface may include three discrete logical layers. For example, the first PCIe interface 3100 may include a PCIe core 3110, a transaction layer 3120, a data link layer 3130, and a physical layer 3140. The second PCIe interface 4100 may include a PCIe core 4110, a transaction layer 4120, a data link layer 4130, and a physical layer 4140. Each of the layers 3120, 3130, 3140, 4120, 4130, and 4140 may include two sections that include Tx and Rx. One section Tx may process outbound (or transmitted) information, and the other section RX may process inbound (or received) information. In some implementations, the PCIe interface may use packets to communicate information with other PCIe interfaces.

The PCIe core 3110 or 4110 may generally control the PCIe interface 3100 or 4100. For example, the PCIe core 3110 or 4110 may include a software layer for operating an interface. In some implementations, the PCIe core 3110 or 4110 may transmit and/or receive, to and/or from the transaction layer 3120 or 4120, an address, a transaction type, data, or others.

The transaction layer 3120 or 4120 may correspond to an upper layer in the structure of the PCIe interface. The transaction layer 3120 or 4120 may provide an interface between the PCIe host 3200 or 4200 of the PCIe system 3000 or 200 and an interconnect architecture (e.g., the data link layer 3130 or 4130 and the physical layer 3140 or 4140). A main function of the transaction layer 3120 or 4120 may be or include assembling and disassembling of transaction layer packets (TLPs). In some implementations, the transaction layer 3120 or 4120 may implement a split transaction, i.e., a transaction which allows another traffic to be transferred through a link while a target system assembles data necessary for a response. For example, the transaction layer 3120 or 4120 may implement a transaction in which a request and a response are temporally separated from each other. In an embodiment, four transaction address spaces may include a configuration address space, a memory address space, an input/output address space, and a message address space. A memory space transaction may include one or more of read and write requests to transfer data to/from a memory-mapped location. In one embodiment, the memory space transaction may use two different address formats, e.g., a short address format, such as a 32-bit address, or a long address format, such as 64-bit address. A configuration space transaction may be used to access a configuration space of the PCIe devices. A transaction to the configuration space may include read and write requests. A message space transaction (or message) may be defined to support in-band communication between PCIe systems.

The transaction layer 3120 or 4120 may store link configuration information and others that is received from the PCIe core 3110 or 4110. In some implementations, the transaction layer 3120 or 4120 may generate a TLP requested from the PCIe core 3110 or 4110, or convert a received TLP into a payload or status information.

The data link layer 3130 or 4130 may correspond to a middle layer in the structure of the PCIe interface, and perform a function of an intermediate stage between the transaction layer 3120 or 4120 and the physical layer 3140 or 4140. A main function of the data link layer 3130 or 4130 may include link management and data integrity including error detection and error correction. Specifically, a transmission side of the data link layer 3130 or 4130 may accept TLPs assembled in the transaction layer 3120 or 4120, provide a data protection code, or calculate a TLP sequence number. In some implementations, the transmission side of the data link layer 3130 or 4130 may transmit the data protection code and the TLP sequence number to the physical layer 3140 or 4140 such that the data protection code and the TLP sequence number are transmitted through the link. A reception side of the data link layer 3130 or 4130 may check the data integrity of TLPs received from the physical layer 3140 or 4140, and transmit the TLPs to the transaction layer 3120 or 4120 so as to perform additional processing.

The physical layer 3140 or 4140 may include circuitry for an interface operation. The circuitry may include a driver, an input buffer, a series-parallel conversion circuit, a parallel-series conversion circuit, phase locked loops (PLLs), and an impedance matching circuit.

In some implementations, the physical layer 3140 or 4140 may include a logical sub-block and an electrical sub-block, which physically transmit a packet to an external PCIe system. The logical sub-block may perform a role necessary for a 'digital' function of the physical layer. In relation to this, the logical sub-block may include a transmission section for preparing sending information to be transmitted by the physical sub-block and a reception section for identifying and preparing information received before the received information is transferred to the data link layer 3130 or 4130. The physical layer 3140 or 4140 may include a transmitter TX and a receiver RX. The transmitter TX may receive a symbol, from the logical sub-block, to be serialized and transmitted to an external device by the transmitter. In addition, the receiver RX may receive a serialized symbol from the external device, and convert the received symbol into a bit stream. The bit stream may be deserialized to be supplied to the logical sub-block. That is, the physical layer 3140 or 4140 may convert TLPs received from the data link layer 3130 or 4130 into a serialized format, and convert a packet received from the external device into a deserialized format. Also, the physical layer 3140 or 4140 may include logical functions associated with interface initialization and maintenance.

The structure of the PCIe interface 3100 or 4100 is exemplarily illustrated in FIG. 35 and can be modified. For example, the structure of the PCIe interface 3100 or 4100 may include an arbitrary form such as a quick path interconnect structure, a next generation high performance computing interconnect structure, or another hierarchical structure.

Figure 36:
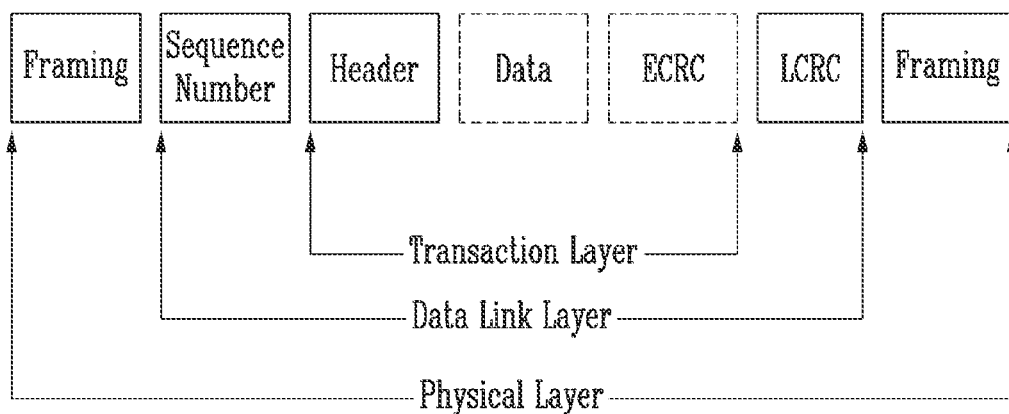
FIG. 36 is a diagram illustrating a configuration of a packet in accordance with an embodiment of the disclosed technology.

FIG. 36 is a diagram illustrating a configuration of a packet in accordance with an embodiment of the disclosed technology.

Referring to FIG. 36, each component of the packet 50 may be sequentially processed in each layer of the PCIe interface. Specifically, the packet 50 may configured with different protocols in a form processed in each layer. For example, a transaction layer packet (TLP) may be generated and processed in the transaction layer 3120 or 4120. The TLP may include a header field, a data field, and an end-to-end cyclic redundancy check (ECRC) field. The header field may be a field including a type of the TLP, information on whether data is to be included, information on whether a cyclic redundancy check (CRC) is to be included, and the like. In addition, the data field may be a field including data to be transmitted or received, and the ECRC field may be a field including an ECRC value representing information on an end point. In some implementations, the data field and the ECRC field may not be included in the TLP.

In addition, a data link layer packet (DLLP) may be generated and processed in the data link layer 3130 or 4130. The DLLP may further include a sequence number field and a link cyclic redundancy check (LCRC) field in addition to the TLP. The sequence number field may be a field including information on a sequence number of the TLP, and the LCRC field may be a field including information on an LCRC.

In addition, a physical layer packet (PLP) may be generated and processed in the physical layer 3140 or 4140. The PLP may further include a framing field in addition to the DLLP. The framing field may be a field including information on a serialized format.

Figure 37:
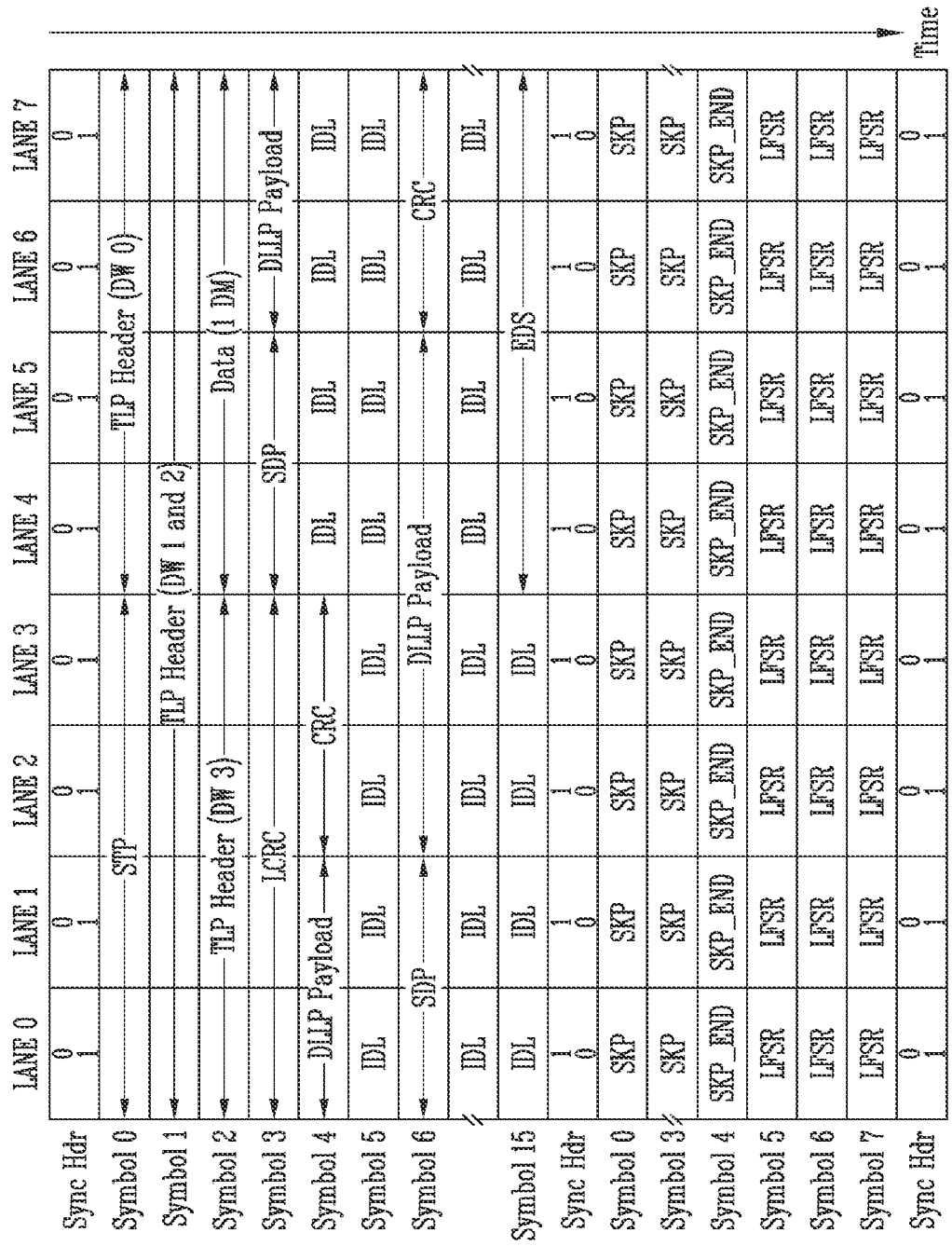
FIG. 37 is a diagram illustrating a data stream in accordance with an embodiment of the disclosed technology.

FIG. 37 is a diagram illustrating a data stream in accordance with an embodiment of the disclosed technology.

Referring to FIG. 37, a data stream transmitted through an x8 link is illustrated. The data stream may include transmission of a skip ordered set (SKP).

The data stream may start with transmission of a sync header Sync Hdr H1H=10b, which represents a data block. Therefore, a start of TLP (STP) framing token may be transmitted as a zeroth symbol representing the start of a TLP stream in lane 0 to lane 3. In addition, a TLP header and TLP data may be transmitted as a first symbol and a second symbol. A link cyclic redundancy check (LCRC) may be transmitted posterior to the TLP data, an SDP header representing that DLLP data is to be transmitted posterior to the LCRC may be transmitted as a third symbol. In addition, cyclic redundancy check (CRC) data may also be provided in relation to the DLLP data.

Subsequently, a logical idle token (IDL) representing that any data is not transmitted through the link may be transmitted. In addition, an EDS token may be transmitted to represent that data is changed to SKP OS data on the lane. For example, another sync data may be transmitted, which is encoded as "01b" representing that a subsequent block is to be an SKP OS data block.

An SKP OS may include a parity bit representing a parity state for each of lanes (e.g., zeroth to seventh lanes) of the link. The SKP OS may further include a layout that is predefined and identifiable by a receiver. For example, the SKP OS may include 16 basic symbols in the case of 128b/130b encoding in PCIe. Four SKP symbol groupings may be added or removed by a port, and the SKP OS may include 8 symbols, 12 symbols, 16 symbols, 20 symbols, 24 symbols, or the like. In addition, an SKP_END symbol may be provided to represent an end position of the SKP OS on the lane and a position of a next block sync header transmitted through the lane.

Figure 38:
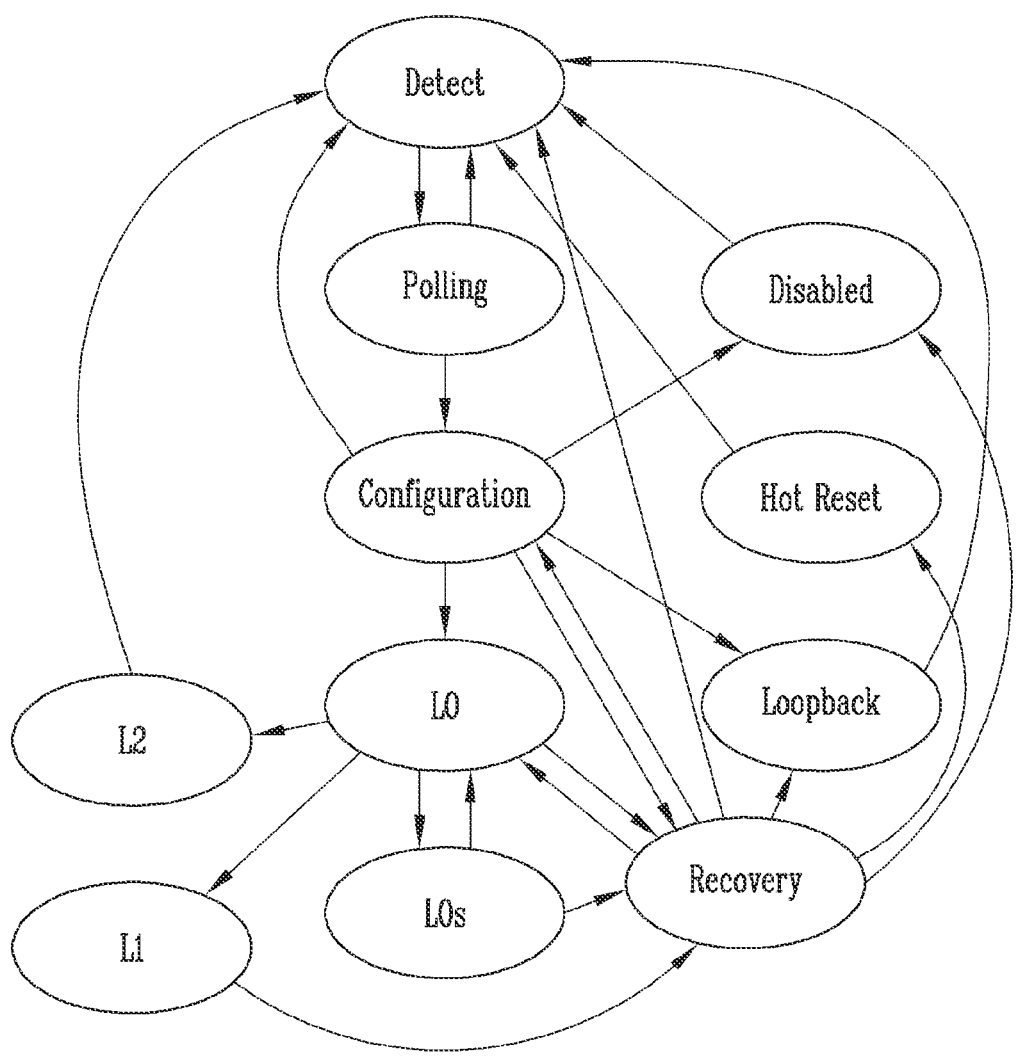
FIG. 38 is a diagram illustrating a link state of the PCIe system in accordance with an embodiment of the disclosed technology.

FIG. 38 is a diagram illustrating a link state of a PCIe system in accordance with an embodiment of the disclosed technology.

In FIG. 38, link states of the PCIe system are illustrated, which include a detect state, a polling state, a configuration state, a hot reset state, a disabled state, an L0 state, etc.

The detect state is an initialization state after a power-on reset. For example, the detect state may be entered from the configuration state, the hot reset state, the disabled state, an L2 state, a loopback state, and a recovery state.

The detect state and disabled state may generally enable ultra-low power consumption while maintaining the configuration setting of a lane.

During the polling state, a lane available for data communication is identified among detected lanes. During the polling state, a polarity inversion may be checked, which includes checking Rx+ and Rx−.

During the configuration state, a lane width available for data communication is confirmed. During the configuration state, a lane inversion may be checked. The configuration state may be entered from the polling state. Alternatively, the configuration state may be entered for lanes reduction and lanes width up after the L0 state is entered.

The recovery state may be used for a reconfiguration of a link bandwidth. In the recovery state, the link bandwidth of a set link may be changed. During the recovery state, at least one of a bit lock, a symbol lock, and/or a lane-to-lane de-skew may be reset. The recovery state may be entered when an error occurs in the L0 state. The recovery state may be changed to the L0 state after the error is recovered in the recovery state.

The L0 state may be a normal operation state in which data and packets can be transmitted and received through the link. For example, the L0 state may be an operation state of a physical bus interface through which data and control packets can be transmitted and received.

An L0s state may be a power saving state which enables the physical bus interface to rapidly enter into a power conservation state and to be recovered from the power conservation state without going through any recovery state.

An L1 state may be a power saving state in which power can be actively saved. Most of transmitters and receivers may be shut off. Main power and clocks are not ensured, but auxiliary power may be used.

The loopback state may be a state used for test and malfunction separation. The loopback state is operated only in units of lanes, and a loopback reception lane is to be selected and configured.

The disabled state is to disable a set link until further notice. The hot reset state may be triggered by only a downstream port. The downstream port may use training sequences (e.g., TS1 or TS2) to propagate a hot reset.

Figure 39:
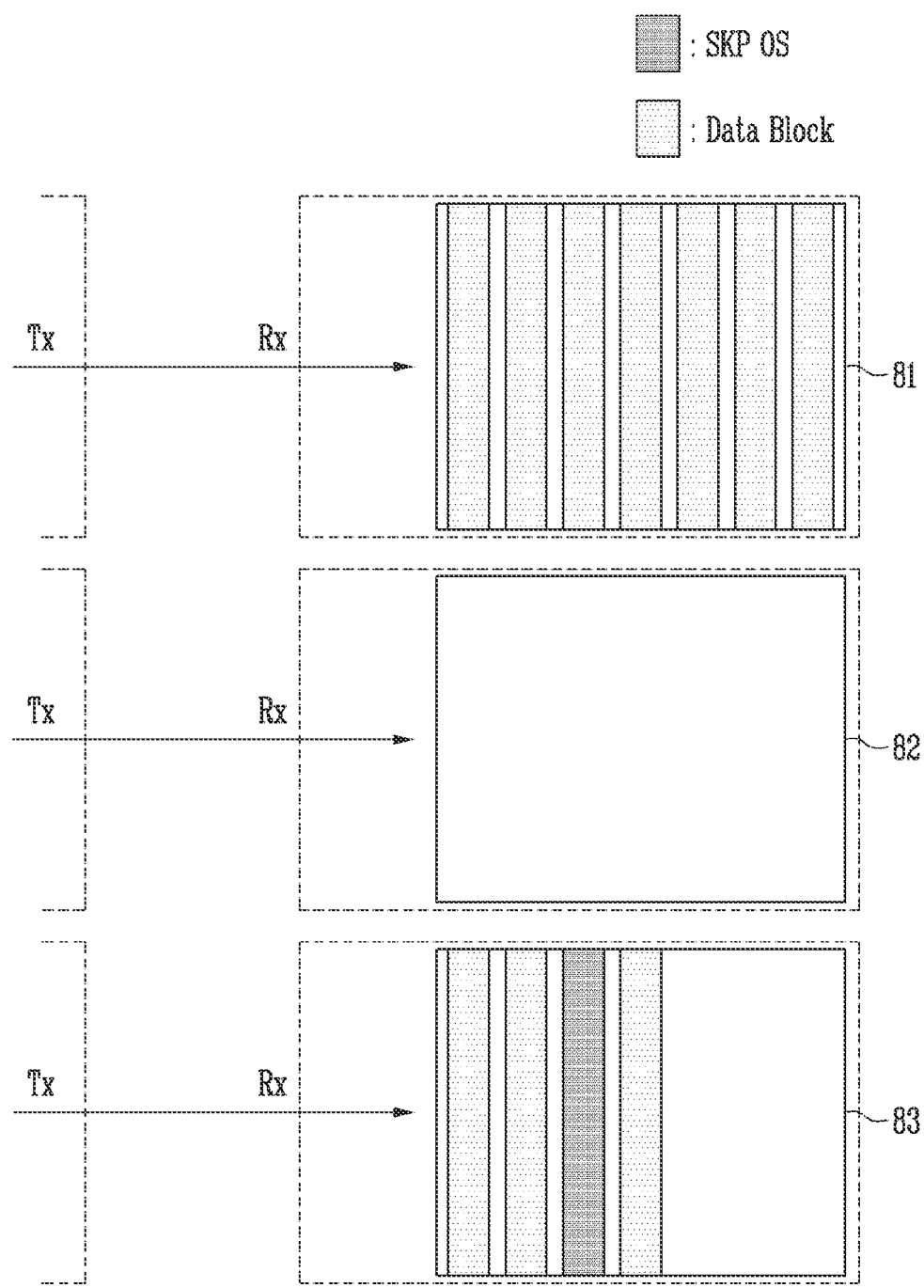
FIG. 39 is a diagram illustrating states of an elastic buffer in accordance with an embodiment of the disclosed technology.

FIG. 39 is a diagram illustrating states of an elastic buffer in accordance with an embodiment of the disclosed technology.

Referring to FIG. 39, first to third states 81 to 83 of an elastic buffer when communication is performed between PCIe systems are illustrated. The elastic buffer may temporarily store data to be transmitted or temporarily store data to be received. In some implementations, the elastic buffer may be included in each of a transmission side and a reception side. The elastic buffer may temporarily store an SKP OS and a data block.

Each of PCIe systems at the transmission and reception sides may include a clock, and the clocks included in the respective PCIe systems may be operated at different frequencies. The different frequencies may cause an overflow or underflow error. For example, the first state 81 of the elastic buffer is a case where a speed at which the data block is transmitted at the transmission side is faster than that at which the data block is received and processed at the reception side, and may be a state in which overflow occurs at the reception side. That is, the first state 81 of the elastic buffer may be a case where the clock at the transmission side is faster than that at the reception side, and the PCIe system may enter into the recovery state so as to solve an error of the overflow. That is, the communication between the PCIe system may be suspended, and the problem of large performance deterioration and data loss may occur in the PCIe system.

The second state 82 of the elastic buffer is a case where a speed at which the data block is received and processed at the reception side is faster than that at which the data block is transmitted at the transmission side, and may be a state in which underflow occurs at the reception side. That is, the second state 82 of the elastic buffer is a case where the clock at the reception side is faster than that at the transmission side, and the PCIe system may enter into the recovery state so as to solve an error of the underflow. Therefore, the problem of large performance deterioration may occur in the PCIe system.

In order to prevent the error of the overflow or the underflow, which is caused by the clock difference between the PCIe systems, the PCIe system may use a means for adding or removing special symbols. Specifically, the PCIe system may prevent occurrence of the overflow or the underflow by using an SKP OS. In the third state 83 of the elastic buffer, an SKP OS generated at the transmission side may be transferred to the reception side. The SKP OS may be transmitted between transmissions of data blocks.

Hereinafter, rules and contents of the SKP OS will be described.

Clock Tolerance Compensation

The SKP OS may be used to compensate for a frequency difference between bit rates at two ends of the link. The elastic buffer which performs the compensation may be included in a logical sub-block of a physical layer at the reception side. A transmission interval of the SKP OS may be set based on predesigned transmission and the absolute value of a reception clock frequency difference. This specification may support two kinds of clockings having different speeds of transmitter Tx and receiver Rx reference clocks (Refclks). One clocking is separate reference clock with no SSC (SRNS), and may allow a maximum of 600 ppm difference without any separate reference clocks (SSC). In addition, the other clocking is separate reference clocks with independent SSC (SRIS), and may allow a 5600 ppm difference with respect to separate Refclks using independent SSC. However, an Refclk architecture generally uses the same Refclk with the transmitter Tx and the receiver Rx, and therefore, any difference between Refclk speeds of the transmitter Tx and the receiver Rx may not occur.

A specific form factor specification may use only the SRIS or use only the SRNS, and be allowed to provide a mechanism for selecting a clocking architecture. An upstream port may implement supporting for all combinations of the SRIS and the SRNS (including a case where any support for one of both the SRIS and the SRNS), but requirements of all related form factor specifications are to be obeyed.

A downstream port supporting the SRIS is to support the SRNS as long as the downstream port is not connected to only a specific form factor with respect to which the port modifies these requirements. A port configuration for satisfying requirements of a specific related form factor may be changed according to implementation. When a clock tolerance error is an average of 600 ppm, the clock of each of the transmitter Tx and the receiver Rx may move one clock for every 1666 clock. When the clock tolerance error is 5600 ppm, the clock of each of the transmitter Tx and the receiver Rx may move one clock for every 178 clock.

When the receiver operates with an SKP OS generated at the speed used in SRNS even though the port is executed in the SRIS, the port may set a bit at an appropriate data speed in a speed vector which supports reception of a lower SKP OS of a field of a link capabilities 2 register. When the transmitter operates with an SKP OS generated at the speed used in SRNS even though the port is executed in the SRIS, the port may set a bit at an appropriate data speed in a speed vector which supports reception of the lower SKP OS of the field of the link capabilities 2 register. System software may check whether any bit is set in a lower SKP OS reception support speed vector field before an appropriate data speed bit is set in a lower SKP OS generation vector activation field of a link control 3 register. All software expansion devices (e.g., repeaters) existing in the link may support lower SKP OS generation such that the system software sets a bit in the lower SKP OS generation vector activation field. The configuration of software supported in the expansion device may be changed according to implementation. When an enable bit with respect to the data speed at which the link is executed is set in the lower SKP OS generation vector activation field, the transmitter may reserve generation of the SKP OS in the L0 state at the speed used in the SRNS, regardless of the clocking architecture in which the link is executed. Scheduling of the SKP OS in a link training and status state machine (LTSSM) state may be at a speed suitable for the clocking architecture.

A component supporting the SRIS may allow the elastic buffer to require a large number of requirements, as compared with a design supporting only the SRNS. These requirements may have additional time to schedule the SKP OS, when the SKP OS is transmitted just after a packet having a maximum payload size.

SKP OS for 8b/10b Encoding

When 8b/10b encoding is used, transmitted SKP OS may have three SKP symbols posterior to a COM symbol, except a case where the SKP OS is allowed in a loopback slave in a loopback-active state. Received SKP OS may have one to five SKP symbols following the COM symbol.

SKP OS for 128b/130b Encoding

When 128b/130b encoding is used, transmitted SKP OS may have 16 symbols, and received SKP OS may have 8, 12, 16, 20 or 24 symbols.

As shown in Table 1 and Table 2, two SKP OS formats may be defined with respect to the 128b/130b encoding. Both the two format may include 1 to 5 groups configured with 4 SKP symbols, in which a final group configured with 4 symbols designated as an SKP_END or SKP_END_CTL is located last. When the PCIe system operates 8.0 GT/s, only the standard SKP OS may be used. When the PCIe system operates 16.0 GT/s, both the standard SKP OS and the control SKP OS may be used. All states of specifications which do not refer a specific SKP OS format may be applied to both the two formats. When an SKP OS is transmitted, all lanes may transmit the same type of SKP OS. All the lanes may transmit the standard SKP OS or transmit the control SKP OS.

Information next to the SKP_END symbol based on an LTSSM state and a block sequence may be included in the standard SKP OS. In a Polling. Compliance state, a symbol may include error status information of the lane. Otherwise, the symbol may include an LFSR value and a data parity bit, when the SKP OS follows a data block. Additional information following three data parity bits and the SKP_END_CTL symbol may be included in the control SKP OS.

When the PCIe system operates a data speed of 8.0 GT/s, the data parity bit of the standard SKP OS may be an even-numbered parity of all data block payloads which the lane communicates, and be independently calculated for each lane. An upstream and downstream port transmitter may calculate a parity as follows.

In an embodiment, the parity may be initialized when an SDS OS is transmitted.

In an embodiment, the parity may be updated as each bit of a data block payload, after scrambling is performed.

In an embodiment, a data parity bit of the standard SKP OS, which is transmitted just next to a data block, may be set as a current parity.

In an embodiment, the parity may be initialized after the standard SKP OS is transmitted.

The upstream and downstream port receiver may calculate the parity and operate.

In an embodiment, when the SDS OS is received, the parity may be initialized.

In an embodiment, the parity may be updated as each bit of the data block payload, before de-scrambling is performed.

In an embodiment, when the standard SKP OS is received just next to the data block, each lane may compare received data parity bit with the calculated parity. When discordance is sensed, a receiver may set a lane error status register bit corresponding to a basic lane number of the lane. The discordance is not any error of the receiver, and link retrain may not be performed due to the discordance.

In an embodiment, when the standard SKP OS is received, the parity is initialized.

When the PCIe system operates at a data speed of 16.0 GT/s, the data parity bit of both the standard SKP OS and the control SKP OS may be an even-numbered parity of all data block payloads which the lane communicates, and be independently calculated for each lane. The upstream and downstream port transmitter may calculate a parity as follows.

In an embodiment, the parity may be initialized when the LTSSM is in a Recovery.Speed state.

In an embodiment, the parity may be initialized when the SDS OS is transmitted.

In an embodiment, the parity may be updated as each bit of the data block payload, after the scrambling is performed.

In an embodiment, the data parity bit of the standard SKP OS, which is transmitted just next to the data block, may be set as a current parity.

In an embodiment, a data parity of the control SKP OS, a first retimer data parity, and a second retimer parity may all be set as the current parity.

In an embodiment, the parity may be initialized after the control SKP OS is transmitted. However, the parity may not be initialized after the standard SKP OS is transmitted.

An upstream and downstream port receiver may calculate a parity and operate as follows.

In an embodiment, the parity may be initialized when the LTSSM is in the Recovery.Speed state.

In an embodiment, when the SDS OS is received, the parity may be initialized.

In an embodiment, before the de-scrambling is performed, the parity may be updated as each bit of the data block payload.

In an embodiment, when the control SKP OS is received, each lane may compare received parity bit of first retimer data with the calculated parity. When discordance is sensed, the receiver may set a bit of a register representing a discordance state of the first retimer data parity of the port corresponding to the basic lane number of the lane. The discordance is not any error of the receiver, and link retrain may not be performed due to the discordance.

In an embodiment, when the control SKP OS is received, each lane may compare received parity bit of second retimer data with the calculated parity. When discordance is sensed, the receiver may set a bit of a register representing a discordance state of the second retimer data parity of the port corresponding to the basic lane number of the lane. The discordance is not any error of the receiver, and link retrain may not be performed due to the discordance.

In an embodiment, when the standard SKP OS is received just next to the data block, the receiver may compare received data parity bit with the calculated parity. However, the comparison result has no influence on the state of the register, which represents the lane error status.

In an embodiment, the parity may be initialized when the control SKP OS is received. However, the parity may not be initialized when the standard SKP OS is received.

TABLE 1

Standard SKP OS in 128b/130b encoding

| Symbol number | Value | Contents |
|---|---|---|
| from 0 (4*N − 1) at 0 [N is 1 to 5] | AAh | SKP symbol<br>Symbol 0 is SKP OS identifier |
| 4*N | E1h | SKP_END symbol represents end of SKP OS, after three additional symbols |
| 4*N + 1 | 00-FFh | (i) When previous block is Polling.Compliance state: AAh<br>(ii) When previous block is data block:<br>Bit [7] = data parity<br>Bit [6:0] = LFSR [22:16]<br>(iii) Others:<br>Bit [7] = −LFSR [22]<br>Bit [6:0] = −LFSR [22:17] |
| 4*N + 2 | 00-FFh | (i) When LTSSM state is Polling.Compliance state: Error Status [7:0]<br>(ii) Others: LFSR [15:8] |
| 4*N + 3 | 00-FFh | (i) When LTSSM state is Polling.Compliance state: −Error Status [7:0]<br>(ii) Others: LFSR [7:0] |

The control SKP OS may be different from the standard SKP OS configured with last four symbols. In addition to the data parity bit calculated by the upstream and downstream port, the parity bit calculated by each retimer may be used for communication. In addition, the parity bit may be used for a lane margin of a retimer receiver as described below.

TABLE 2

Control SKP OS in 128b/130b encoding

| Symbol number | Value | Technique |
|---|---|---|
| from 0 (4*N − 1) at 0 [N is 1 to 5] | AAh | SKP symbol<br>Symbol 0 is SKP OS identifier |
| 4*N | 78 hours | SKP_END_CLT symbol represents end of SKP OS, after three additional symbols |
| 4*N + 1 | 00-FFh | Bit 7: data parity<br>Bit 6: first retimer data parity<br>Bit 5: second retimer parity<br>Bit [4:0]: margin CRC [4:0] |
| 4*N + 2 | 00-FFh | Bit 7: margin parity |

'Margin CRC [4:0]' may be calculated in bits [6:0] of symbols 4N+2 (d[0] may be bit 0 of the symbols 4N+2, d[1] may be bit 1 of the symbols 4N+2, . . . , and d[6] may be bit 6 of the symbols 4N+2), and bits [7:0] of symbols 4N+3 (d[7] may be bit 0 of the symbols 4N+3, d[8] may be bit 1 of the symbols 4N+3, . . . , and d[14] may be bit 7 of the symbols 4N+3).

Margin CRC [0]=d [0]^d [3]^d [5]^d [6]^d [9]^d [10]^d [11]^d [12]^d [13]

Margin CRC [1]=d [0]^d [4]^d [6]^d [7]^d [10]^d [11]^d [12]^d [13]^d [14]

Margin CRC [2]=d [0]^d [2]^d [3]^d [6]^d [7]^d [8]^d [9]^d [10]^d [14]

Margin CRC [3]=d [1]^d [3]^d [4]^d [7]^d [8]^d [9]^d [10]^d [11]

Margin CRC [4]=d [2]^d [4]^d [5]^d [8]^d [9]^d [10]^d [11]^d [12]

'Margin Parity' may be an even-numbered parity of the bits [4:0] of symbols 4N+1, the bits [6:0] of symbols 4N+2, and the bits [7:0] of symbols 4N+3. (i.e., Margin parity=Margin CRC [0]^Margin CRC [1]^Margin CRC [2]^Margin CRC [3]^Margin CRC [4]^d [0]^d [1]^d [2]^d [3]^d [4] A d [5]^d [6]^d [7]^d [8]^d [9]^d [10]^d [11]^d [12]^d [13]^d [14]).

Error Protection of Control SKP OS 21 bits of the symbols 4N+1 (bits [4:0]), the symbols 4N+2 (bits [7:0]), and the symbols 4N+3 (bits [7:0]) may include a CRC of 5 bits and a parity of 1 bit, and leave 15 bits for information transfer. While the parity bit may provide sensing on an odd-numbered bit flip (e.g., bit 1 or bit 3), the CRC may provide ensured sensing of 1-bit and 2-bit flips. Thus, triple bit flip sensing on 21 bits and bust error sensing of length 5 can be ensured. The 5-bit CRC may be derived from a polynomial expression, i.e., $x^5+x^2+1$.

The 21 bits is not a portion of a TLP, and therefore, transfer may be ensured when the same content is repeatedly transferred. This may be achieved through a structuralized register. While a downstream command may be transferred from a downstream port reflecting contents of an architecture register, an upstream state passing through an error test may be updated through a status register of the downstream port. Therefore, a mechanism which executes a command and waits for a state to be again reflected before a new command is executed is again reflected may exist in software. Accordingly, the 15-bit information may serve as a micro packet.

Transmitter Standard

In an embodiment, all lanes may transmit a symbol at the same frequency (the difference between bit rates in all multi-lane links may be 0 ppm).

In an embodiment, an SKP OS having the same length may be simultaneously transmitted in all lanes of a multi-lane link, except a case where a loopback slave is allowed in a loopback activation LTSSM state in the transmission.

In an embodiment, when the 8b/10b encoding is used:
in a case where the link does not operation in the SRIS, or a bit corresponding to a current link speed is set in the lower SKP OS generation vector activation field, and the LTSSM is in the L0 state, an SKP OS may be scheduled to be transmitted at an interval of 1118 symbol times to 1538 symbol times.
in the case where the link is operating in the SRIS, the bit corresponding to the current link speed is cleared in the lower SKP OS generation vector activation field, or the LTSSM is not in the L0 state, the SKP OS may be scheduled to be transmitted at an interval of less than 154 symbol times.

In an embodiment, when the 128b/130b encoding is used:
in a case where the link does not operation in the SRIS, or the bit corresponding to the current link speed is set in the lower SKP OS generation vector activation field, and the LTSSM is in the L0 state, the SKP OS may be scheduled to be transmitted at an interval of 370 blocks to 375 blocks. A loopback slave may operate to satisfy this requirement, until the loopback slave starts looping back a received bit stream.
in the case where the link is operating in the SRIS, the bit corresponding to the current link speed is cleared in the lower SKP OS generation vector activation field, or the LTSSM is not in the L0 state, the SKP OS may be scheduled to be transmitted at an interval shorter than 38 blocks. The loopback slave may operate to satisfy this requirement, until the loopback slave starts looping back a received bit stream.
in a case where the LTSSM is in the loopback state, and the link does not operate in the SRIS, a loopback master may be scheduled to transmit two SKP OSs spaced apart from each other by a maximum of two blocks at an interval of 370 blocks to 375 blocks.
in a case where the LTSSM is in the loopback state, and the link is operating in the SRIS, the loopback master may be scheduled to transmit two SKP OSs spaced apart from each other by a maximum of two blocks at an interval of less than 38 blocks.

The control SKP OS may be transmitted at only the following time.

When the data speed is 16.0 GT/s, and a data stream is transmitted, the standard SKP OS and the control SKP OS may be alternately transmitted with respect to the SKP OS transmitted within the data stream.

When the data speed is 16.0 GT/s, and the LTSSM is in a Configuration.Idle state or a Recovery.Idle state, the above-described requirement of a minimum constant interval may not be applied to instant transmission of the control SKP OS. The transmitter may reset a scheduling interval timer of the SKP OS, after the transmitter transmits an instance of the control SKP OS.

In an embodiment, the scheduled SKP OS is to be transmitted even when a packet or an ordered set (OS) is not under progress. Otherwise, the SKP OS may be accumulated. Therefore, the SKP OS may be continuously inserted into a boundary of a next packet or a next OS. For reference: when the 128b/130b encoding is used, the SKP OS cannot be transmitted in continuous blocks within the data stream.

In an embodiment, when continuous symbols or OSs are monitored, the SKP OS may not be calculated due to suspension (e.g., 8 continuous TS1 Oss in a Polling.Active state).

In an embodiment, when the 8b/10b encoding is used: the SKP OS may not be transmitted, in a case where the compliance SOS bit of a link control 2 register is 0b while a compliance pattern or a modified compliance pattern is under progress in the Polling.Compliance state. When the 8b/10b encoding is used, two (instead of one) continuous SKP OSs may be transmitted with respect to all SKP OS time intervals scheduled while the compliance pattern or the modified compliance pattern is under progress, in a case where the compliance SOS bit of the link control 2 register is 1b.

In an embodiment, when the 128b/130b encoding is used: a compliance SOS register bit has no effect. During the Polling.Compliance state, the transmitter may transmit only an SKP OS designated as a specific portion in the modified compliance pattern.

In an embodiment, when the transmitter is electrically in an idle state, a counter or another mechanism, used to reserve an SKP OS may be reset.

Receiver Rules

In an embodiment, when the 8b/10b encoding is used, the receiver may recognize an SKP OS received as has already been decided. When the 128b/130b encoding is used, the receiver may recognize an SKP OS received as has already been decided.

In an embodiment, the length of the received SKP OS may not be changed for each lane of a multi-lane link, except a case occurring during a Loopback.Active state.

In an embodiment, the receiver may receive and process the SKP OS at an interval of an average of 1180 to 1538 symbol times, when the link in the lower SKP OS receiver supporting the speed vector field does not operate in the SRIS, or when the link does not operate in a bit for a set current link speed, and when the 8b/10b encoding is used. Also, when the 128b/130b encoding is used, the receiver may receive and process the SKP OS at an interval of an average of 370 to 375 blocks. When the link operates in the SRIS and when the 8b/10b encoding is used, the receiver may receive and process the SKP OS at an interval of an average of 154 symbol times. Also, when the 128b/130b encoding is used, the receiver may receive and process the SKP OS at an interval of less than an average of 38 blocks.

In some implementations, the transmitter which is electrically in the idle state does not require resetting of mechanism for time-based scheduling of the SKP OS. Hence, after the receiver is electrically in the idle state, the receiver may receive and process a firstly scheduled SKP OS within a time shorter than an average time interval of the SKP OS.

In an embodiment, in the case of a data speed of 8.0 GT/s or more, the receiver in the L0 state may check whether any data block having an EDS token exists prior to each SKP OS.

In an embodiment, the receiver may continuously receive and process the SKP OS at data speeds of 2.5 GT/s and 5.00 GT/s.

The receiver may receive and process the SKP OS at a maximum interval according to Max_Payload_Size supported by a component thereof. In the case of the data speeds of 2.5 GT/s and 5.00 GT/s, a formula with respect to a maximum symbol number N between SKP OSs may be N=1538+(Max_payload_size_byte+28). For example, when the Max_Payload_Size is 4096 bytes, N=1538+4096+28=5662.

Figure 40:
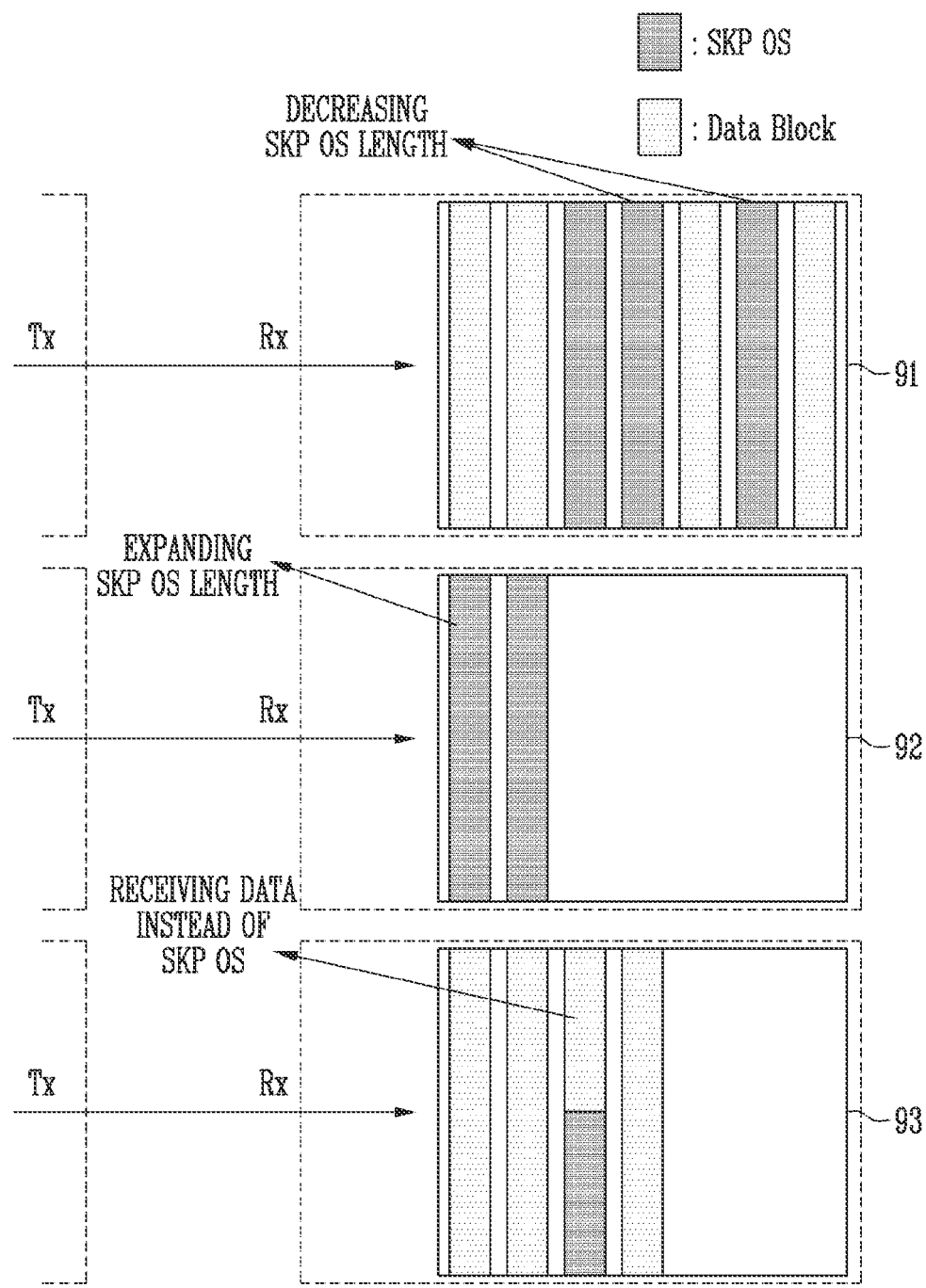
FIG. 40 is a diagram illustrating states of an elastic buffer in accordance with an embodiment of the disclosed technology.

FIG. 40 is a diagram illustrating states of an elastic buffer in accordance with an embodiment of the disclosed technology.

Referring to FIG. 40, first to third states 91 to 93 of an elastic buffer when communication is performed between PCIe systems are illustrated.

The elastic buffer may temporarily store data to be transmitted or temporarily store data to be received. Specifically, the elastic buffer may be included in each of a transmission side and a reception side. The elastic buffer may temporarily store an SKP OS and a data block. The PCIe system may prevent occurrence of overflow or underflow by using the SKP OS. Specifically, in Gen3 or more in Gen3/4/5 PCIe-based specifications, the PCIe system may transmit the SKP OS for every 370 to 375 data block in the case of a common reference clock or the SRNS. The PCIe system may transmit the SKP OS every 37 data block in the case of the SRIS. However, transmission of the SKP OS without considering a clock difference between the PCIe systems may result in performance deterioration caused by an unnecessary SKP OS. Specifically, the overflow or the underflow cannot be prevented in the case of the SRNS in which the clock difference between the PCIe systems is 600 ppm or more. Also, the overflow or the underflow cannot be prevented in the case of in the SRIS in which the clock difference between the PCIe systems is 5600 ppm or more.

In accordance with an embodiment of the disclosed technology, an optimum SKP OS interval may be applied in real time regardless of the common reference clock, the SRNS, or the SRIS. In an embodiment, when the PCIe systems use an SRNS mode or an SRIS mode, performance may be improved by removing an unnecessary SKP OS. Alternatively, the PCIe system may be prevented from entering into the recovery state by adding SKP OSs of which number corresponding to an optimum number when SKP OSs are further required, and data loss may be prevented by preventing linkdown.

Referring to the first state 91 of the elastic buffer, the PCIe system at the transmission side may transmit the data block and the SKP OS by adding SKP OSs of which quantity is greater than that of conventional SKP OSs, and the elastic buffer at the reception side may remove the added SKP OSs. When a clock at the transmission side is faster than that at the reception side in the SRIS or the SRNS, the elastic buffer at the reception side removes the added SKP OSs, so that the occurrence of the overflow can be prevented. In addition, an additional SKP OS is generated at the transmission side, so that the transmission speed of the data block can be reduced. Further, data loss or entrance into the recovery state can be prevented. When the SKP OS is removed, the PCIe system cannot remove all SKP OS existing in the elastic buffer. The PCIe system may decrease the length of the SKP OS by removing only some of the SKP OSs existing in the elastic buffer according to PCI/PCIe rules.

Referring to the second state 92 of the elastic buffer, the elastic buffer at the reception side may prevent the occurrence of the underflow by expanding the length of the received SKP OS. Specifically, when a clock at the reception side is faster than that at the transmission side in the SRIS or the SRNS, the elastic buffer at the reception side may prevent the occurrence of the underflow by adding an SKP OS. In some implementations, the elastic buffer at the reception side may add an SKP OS only when the SKP OS is received from the transmission side.

Referring to the third state 93 of the elastic buffer, the PCIe system at the transmission side may transmit SKP OSs of which quantity is smaller than that of conventional SKP OSs, so that PCIe maximum efficiency can be achieved. Specifically, when the transmission side and the reception side hardly have a clock difference (e.g., in the case of the common reference clock), the probability that the overflow or the underflow will occur is extremely low. Therefore, the data block instead of the SKP OS is transmitted, so that communication efficiency can be maximized.

Figure 41:
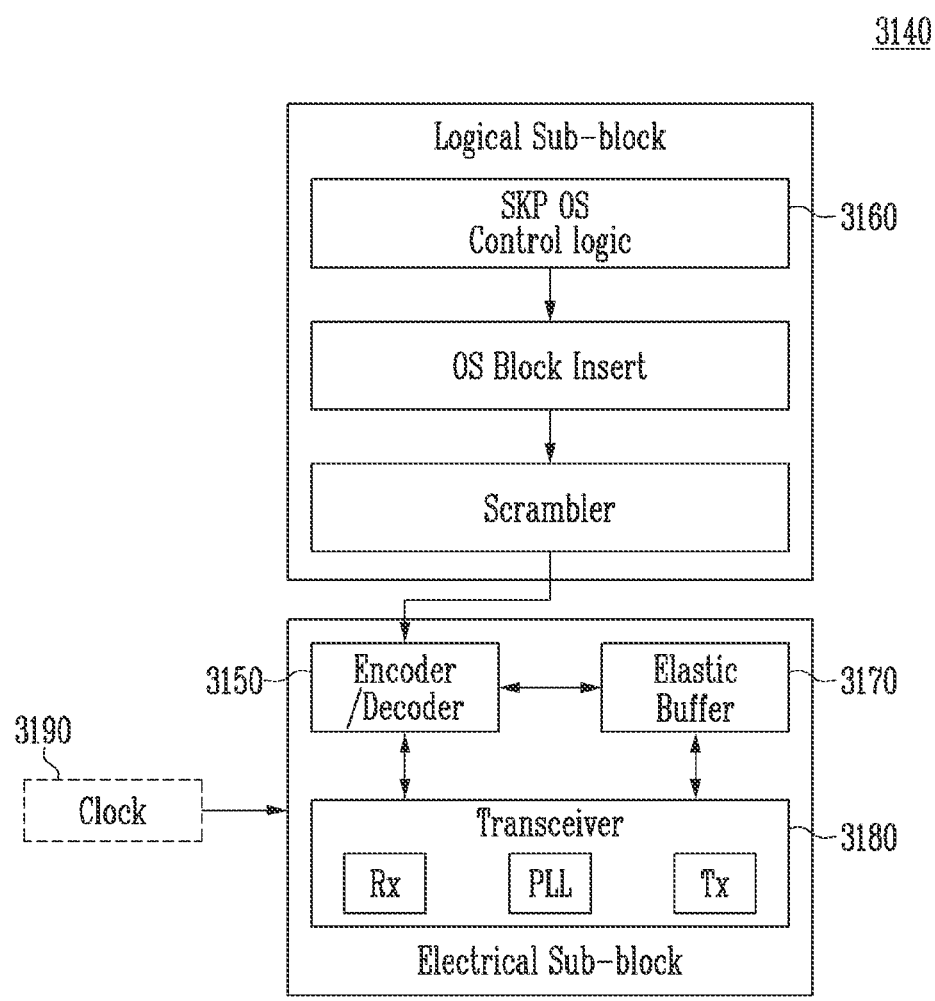
FIG. 41 is a diagram illustrating a configuration of a physical layer in accordance with an embodiment of the disclosed technology.

FIG. 41 is a diagram illustrating a configuration of a physical layer in accordance with an embodiment of the disclosed technology.

Referring to FIG. 41, the physical layer 3140 may include components for transmitting a packet to an external PCIe system. Specifically, the physical layer 3140 may include an encoder/decoder 3150, an SKP OS control logic 3160, an elastic buffer 3170, a transceiver 3180, and a clock signal generator 3190.

The encoder/decoder 3150 may be a component for performing encoding and decoding on a packet for the purpose of serialization and deserialization. For example, the encoder/decoder 3150 may encode a DLLP received from the data link layer 3130, and the physical layer 3140 may convert the encoded DLLP into a serialized format. Also, the encoder/decoder 3150 may decode a packet received from an external device.

The SKP OS control logic 3160 may generate an SKP OS and control a transmission interval. In some implementations, the SKP OS control logic 3160 may generate the SKP OS. The SKP OS control logic 3160 may control the transceiver 3180 to control the transmission interval. The SKP OS control logic 3160 will be described in detail with reference to FIG. 42.

The elastic buffer 3170 may temporarily store a packet received from the external device. For example, the elastic buffer 3170 may temporarily store an SKP OS and a data block, which are received through the transceiver 3180. Also, the elastic buffer 3170 may remove or add the received SKP OS. For example, since the PCIe system may enter the recovery state in an overflow state or an underflow state. Therefore, the elastic buffer 3170 may remove the temporarily stored SKP OS so as to prevent the overflow state in which a volume becomes largest. Also, the elastic buffer 3170 may add the received SKP OS so as to prevent the underflow state in which the volume becomes smallest.

The transceiver 3180 may include a phase locked loop (PLL) circuit, a transmitter Tx, and a receiver Rx. The PLL circuit may generate a clock signal to be supplied to the transmitter Tx or the receiver Rx by using a clock signal provided from the clock signal generator 3190. The PLL circuit may generate a clock signal with a changed frequency by multiplying a signal received from the clock signal generator 3190. For example, the PLL circuit may multiply a reference clock signal REFCLK having a frequency of 100 MHz into a clock signal having a frequency of 2.5 GHz. The transmitter Tx may convert a parallel data signal into a serial data signal by using an output signal of the PLL circuit, and transmit the serial data signal to the external device, e.g., the external PCIe system. The receiver Rx may receive a serial data signal transmitted from the external device, and generate a clock signal for recovering the received serial data signal and a clock signal for converting the recovered serial data signal into a parallel data signal by using the output signal of the PLL circuit.

The clock signal generator 3190 may generate a reference clock signal REFCLK used for an operation of the PCIe interface. The operation of the PCIe interface may communicate with the external device. For example, the clock signal generator 3190 may automatically detect whether a clock signal is supplied from the PCIe system, and generate an internal clock signal, based on a detection result. When a clock signal is provided from the PCIe system, the clock signal generator 3190 may use the clock signal received from the PCIe system. In some implementations, the clock signal generator 3190 may transmit the reference clock signal REFCLK to the SKP OS control logic 3160 and the transceiver 3180.

Figure 42:
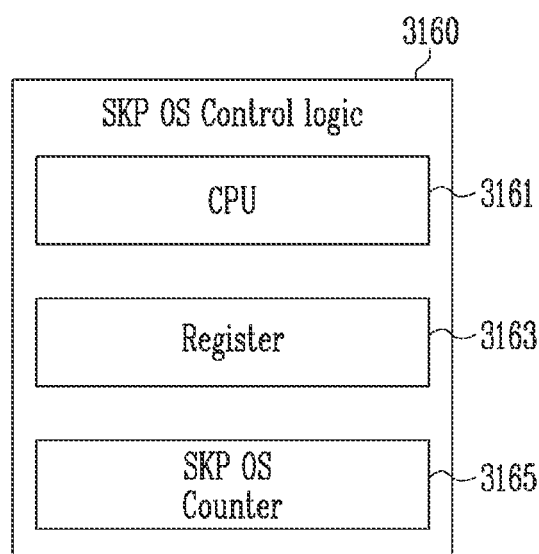
FIG. 42 is a diagram illustrating a skip ordered set (SKP OS) control logic in accordance with an embodiment of the disclosed technology.

FIG. 42 is a diagram illustrating an SKP OS control logic in accordance with an embodiment of the disclosed technology.

Referring to FIG. 42, the SKP OS control logic 3160 may include a central processing unit (CPU) 3161, a register 3163, and an SKP OS counter 3165.

The CPU 3161 may generally control operations for generating and removing an SKP OS. For example, the CPU 3161 may control the transceiver to increase or decrease a transmission interval of the SKP OS. In some implementations, the CPU 3161 may control the transmission interval of the SKP OS in response to recovery state entrance or a recovery state entrance request. In some implementations, the CPU 3161 may calculate a frequency of recovery state entrance corresponding to the transmission interval. The CPU 3161 may increase or decrease the transmission interval of the SKP OS, based on the frequency of the recovery state entrance. The CPU 3161 may increase or decrease the transmission interval only a predetermined number. When the PCIe system does not enter into the recovery state for a predetermined time, the CPU 3161 may store a current SKP OS transmission interval in the register 3163, and fix the transmission interval of the SKP OS.

The CPU 3161 may determine whether the recovery state entrance has occurred due to an increase or decrease in the transmission interval of the SKP OS. In some implementations, a link state of the PCIe system may enter into the recovery state by a request of another PCIe system linked with the PCIe system. For example, when the PCIe system receives training sequence TS1 transmitted from the another PCIe system, the PCIe system may enter into the recovery system. When the PCIe system enters into the recovery state, the CPU 3161 may check the reason why the PCIe system enters into the recovery state. In some implementations, the CPU 3161 may check the reason why the PCIe system enters into the recovery state from another PCIe system according to the following sequence. In some implementations, the CPU 3161 may identify that the PCIe system enters into the recovery state due to the increase or decrease in the transmission interval of the SKP OS, when the recovery state does not correspond to the following cases:

(1) Speed change request
(2) Re-equalization request
(3) Lane reduce or lane upconfigure request
(4) Hot reset, disabled or loopback request
(5) Replay timeout or replay rollover The speed change request may be made by any one of connected ports to request a speed change (e.g., a speed change request from Gen1 to Gen3). Any one of the connected ports may request the speed change by setting a speed change bit of TS1 or TS2 to 1. The re-equalization request may be made by any one of the connected ports to request a change of an EQ coefficient. Any one of the connected ports may request re-equalization by setting a request equalization bit of TS2 to 1. In addition, the lane reduce or lane upconfigure request may be made by any one of the connected ports to request an increase or decrease of a lane width. For example, the lane reduce or lane upconfigure request may request a change from lane 1 to lane 4 or a change from lane 4 to lane 1. The hot reset, disabled or loopback request is a state change request made by any one of the connected ports. Any one of the connected ports may request a state change by setting a hot reset bit, disable bit, or loopback bit to 1. The replay timeout or replay rollover may be made to request a recovery state entrance from a port receiving a certain number or more of negative acknowledges (NAKs) to a state port, when an LCRC error occurs.

When the recovery state entrance corresponds to the increase in the transmission interval of the SKP OS, the CPU 3161 may decrease the transmission interval by ½ of an increment of the transmission interval. In some implementations, the CPU determines that the recovery state entrance corresponds to the increase of the transmission interval of the SKP OS based on whether the CPU has previously increased the transmission interval. When the recovery state entrance corresponds to the decrease in the transmission interval of the SKP OS, the CPU 3161 may increase the transmission interval by ½ of a decrement of the transmission interval. In some implementations, the CPU determines that the recovery state entrance corresponds to the decrease of the transmission interval of the SKP OS based on whether the CPU has previously decreased the transmission interval. The CPU 3161 may control the transmission interval, based on an elastic buffer state of the external device.

The register 3163 may store a transmission history of the SKP OS. In some implementations, the register 3163 may store the transmission history including the transmission interval of the SKP OS, a transmission interval control number of the SKP OS, which is counted by the SKP OS counter 3165, a change in transmission interval of the SKP OS for each time, a recovery state entrance frequency per unit time, and the like.

The SKP OS counter 3165 may count transmission of the SKP OS. The SKP OS counter 3165 may provide the CPU 3161 or the register 3163 with information representing that the SKP OS has been transmitted. In some implementations, the CPU 3161 may calculate the transmission interval of the SKP OS, based on the information provided by the SKP OS counter 3165.

Figure 43:
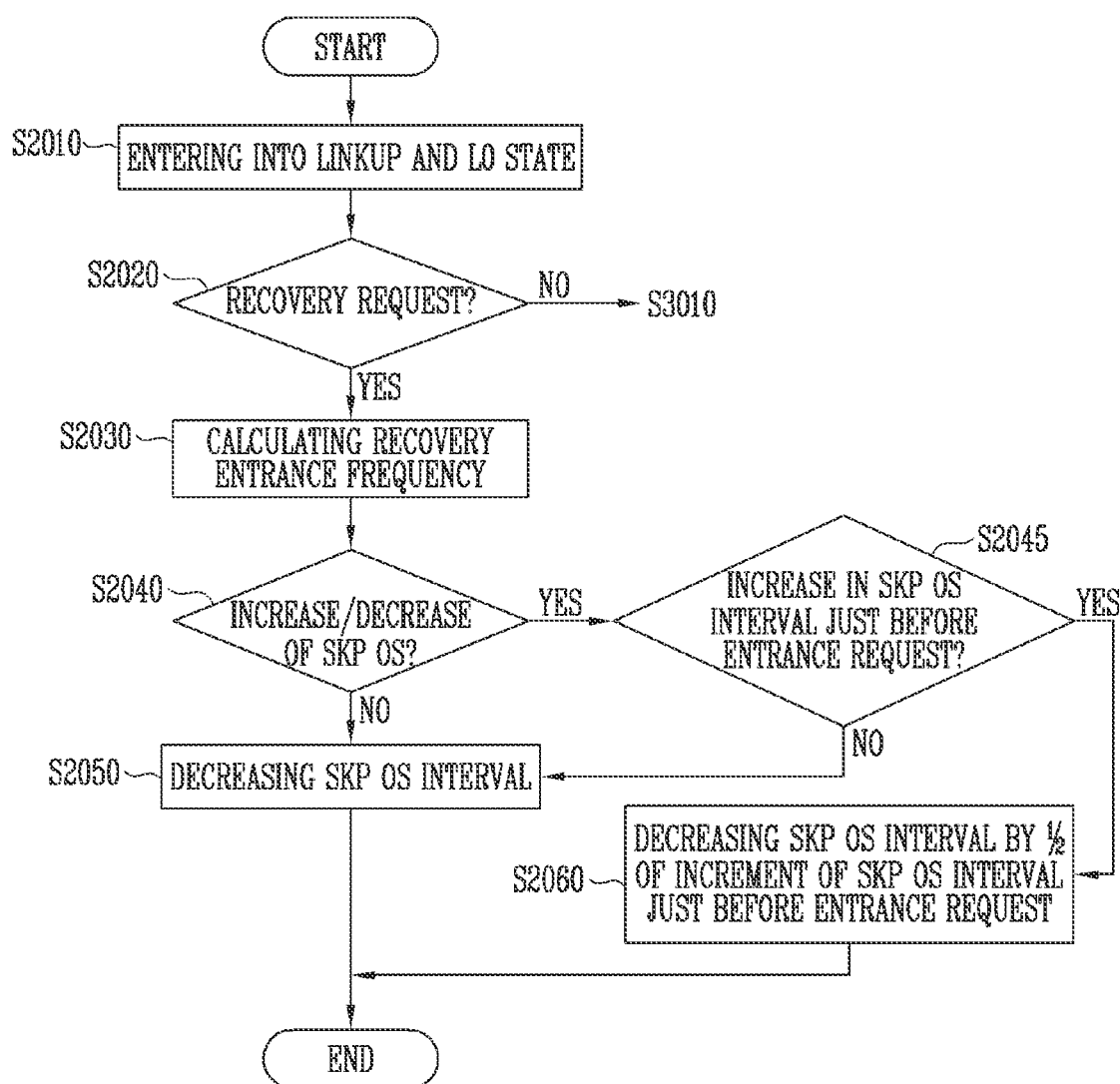
FIG. 43 is a diagram illustrating an operating method of the PCIe system in accordance with an embodiment of the disclosed technology.

FIG. 43 is a diagram illustrating an operating method of the PCIe system in accordance with an embodiment of the disclosed technology.

FIG. 43 illustrates an operating method that is performed when the PCIe system receives a recovery request. The PCIe system and an external device (e.g., another PCIe system) physically connected to the PCIe system may enter into a linkup and L0 state (S2010).

When the PCIe system receives a recovery state entrance request from a PCIe core or a PCIe host (S2020—Yes), the PCIe system may calculate a recovery state entrance frequency (S2030). In some implementations, the PCIe system may calculate an entrance request or entrance frequency into the recovery state per unit time. The recovery state entrance request may be made based on an SKP OS or an elastic buffer state of a reception side.

The PCIe system may determine whether an SKP OS transmission interval has been increased or decreased based on a transmission history of the SKP OS (S2040). The transmission history may include at least one of a change in the transmission interval or the recovery state entrance frequency corresponding to the transmission interval. When the PCIe system does not control the SKP OS transmission interval (S2040—No), the PCIe system may decrease the SKP OS transmission interval (S2050).

In some implementations, when the PCIe system controls the SKP OS transmission interval (S2040—Yes), the PCIe system may determine whether the SKP OS transmission interval has been increased just before the entrance request into the recovery state (S2045). When the PCIe system does not increase the SKP OS transmission interval just before the entrance request into the recovery state (S2045—No), the PCIe system may decrease the SKP OS transmission interval (S2050).

In some implementations, when the PCIe system increases the SKP OS transmission interval just before the entrance request into the recovery state (S2045—Yes), the PCIe system may decrease the SKP OS transmission interval by ½ of an increment of the SKP OS transmission interval just before the entrance request into the recovery state (S2060). That the PCIe system decreases the SKP OS transmission interval means that the PCIe system more frequently transmits the SKP OS. Therefore, that the PCIe system decreases the SKP OS transmission interval may mean that the PCIe system transmits a larger quantity of SKP OSs.

Figure 44:
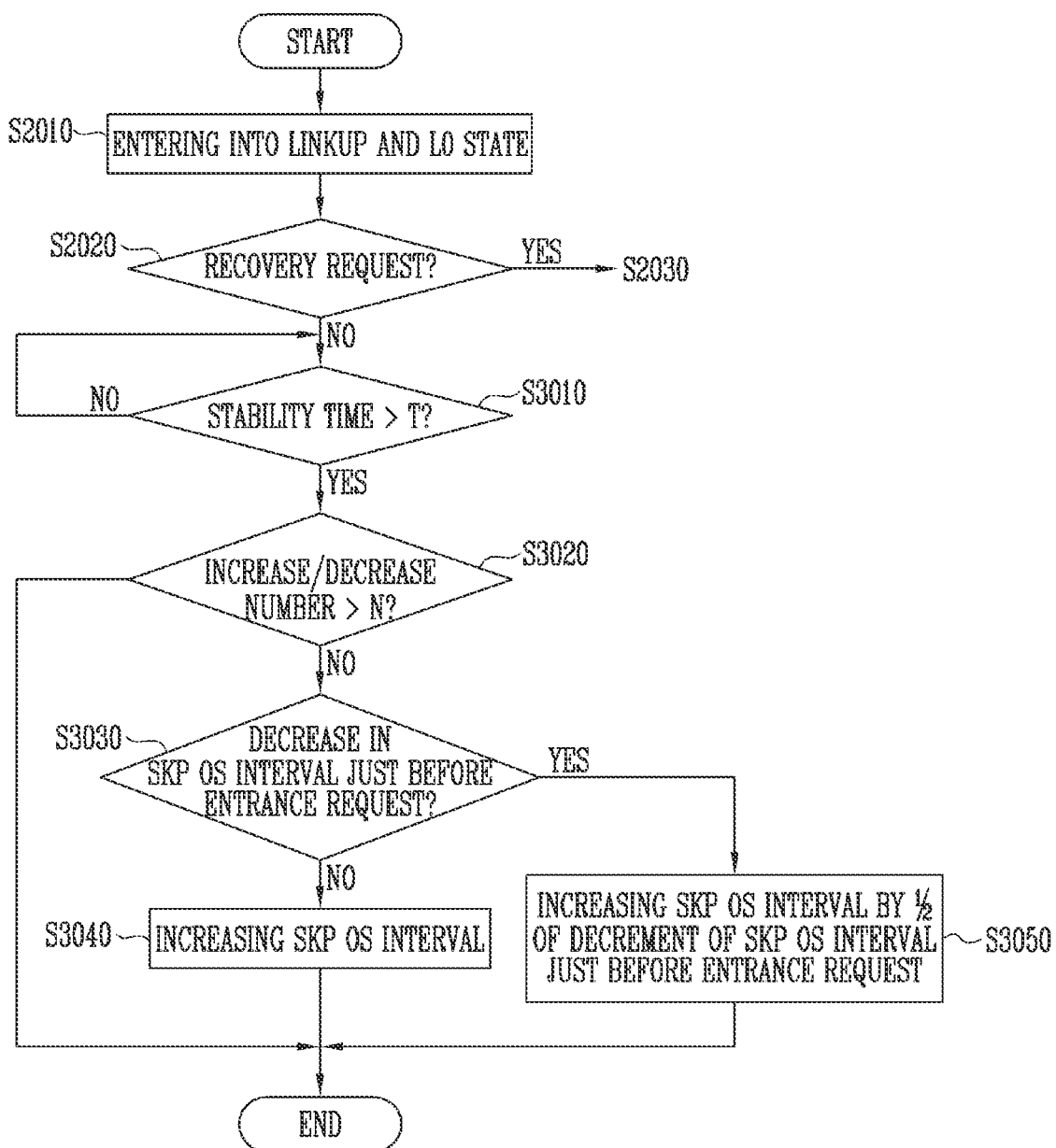
FIG. 44 is a diagram illustrating an operating method of the PCIe system in accordance with an embodiment of the disclosed technology.

FIG. 44 is a diagram illustrating an operating method of the PCIe system in accordance with an embodiment of the disclosed technology.

FIG. 44 illustrates an operating method that is performed when the PCIe system does not receive an entrance request into a recovery state. The PCIe system and an external device (e.g., another PCIe system) physically connected to the PCIe system may enter into a linkup and L0 state (S2010). Also, PCIe system may control a transmission interval of an SKP OS, even when the PCIe system does not receive a recovery state entrance request from a PCIe core or a PCIe host (S2020—No).

The PCIe system may be maintained in a stability state in which the PCIe system does not enter into the recovery state for a time exceeding a predetermined time T. The stability state is an L0 state, and may be a state in which the PCIe system smoothly communicates with an external device in a state in which a link is activated. When a stability time for which the stability state is maintained exceeds the predetermined time T (S3010—Yes), the PCIe system may compare an increase/decrease number of the transmission interval of the SKP OS with a predetermined number N (S3020).

When the increase/decrease number of the transmission interval of the SKP OS exceeds the predetermined number (S3020—Yes), the PCIe system may suspend the controlling of the transmission interval of the SKP OS. On the other hand, when the increase/decrease number of the transmission interval of the SKP OS is smaller than the predetermined number (S3020—No), the PCIe system may determine whether the SKP OS transmission interval has been decreased just before the recovery state entrance request (S3030).

When the PCIe system does not decrease the SKP OS transmission interval (S3030—No), the PCIe system may increase the SKP OS transmission interval so as to increase communication efficiency (S3040). Also, when the PCIe system decreases the SKP OS transmission interval (S3030—Yes), the PCIe system may increase the SKP OS transmission interval by ½ of a decrement of the SKP OS transmission interval just before the recovery state entrance request so as to increase the communication efficiency (S3050). That the PCIe system increases the SKP OS transmission interval means that the PCIe system more rarely transmits the SKP OS. Therefore, that the PCIe system increases the SKP OS transmission interval may mean that the PCIe system transmits a smaller quantity of SKP OSs.

In this specification, a protocol using the PCIe has been described in detail. However, the disclosed technology may be applied to protocols except the PCIe, which use dummy data corresponding to the SKP OS. That is, it will be apparent that the disclosed technology may be modified and embodied in protocols except the PCIe, which control dummy data or idle data so as to prevent underflow or overflow of the elastic buffer.

In accordance with the disclosed technology, there can be provided an improved PCIe interface and an interface system including the same. Various features as disclosed above can be selectively combined to construct desired devices to meet specific needs or requirements.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:
1. A device, comprising:
a transceiver configured to transmit and receive data;
a lane margining controller in communication with the transceiver and configured to control the transceiver to transmit, through a margin command, to an external device, a request for a state of an elastic buffer of the external device, and control the transceiver to receive the state of the elastic buffer from the external device; and
a port setting controller configured to adjust a transmission interval of a skip ordered set based on the state of the elastic buffer, wherein the state of the elastic buffer corresponds to a difference between a frequency of data input to the elastic buffer and a frequency of data output from the elastic buffer.

2. The device of claim 1, wherein the lane margining controller is further configured to control the transceiver to transmit the request to the external device for each constant period.

3. The device of claim 1, wherein the request is transmitted through the margin command having a predefined type.

4. The device of claim 1, wherein the state of the elastic buffer is transmitted as a response to the margin command.

5. The device of claim 1, wherein the state of the elastic buffer includes an overflow state in which a volume of the elastic buffer becomes largest, an underflow state in which the volume of the elastic buffer becomes smallest, and a normal state free of an error for at least a predetermined time.

6. The device of claim 5, wherein, in a case that the elastic buffer is in the overflow state or the underflow state, the port setting controller is configured to decrease the transmission interval of the skip ordered set.

7. The device of claim 5, wherein, in a case that the elastic buffer is in the normal state, the port setting controller is configured to increase the transmission interval of the skip ordered set.

8. The device of claim 1, wherein the port setting controller is further configured to fix the transmission interval of the skip ordered set in case that no request for an entry to a recovery state is received for a predetermined time.

9. The device of claim 5, wherein when the volume of the elastic buffer becomes largest, a size of data filled in the elastic buffer is greater than a predetermined upper threshold related to a size of elastic buffer.

10. The device of claim 5, wherein when the volume of the elastic buffer becomes smallest, a size of data filled in the elastic buffer is less than a predetermined lower threshold related to a size of elastic buffer.

11. The device of claim 5, wherein, in a case that the elastic buffer is in the overflow state, the port setting controller is configured to increase an insertion rate of the skip ordered set.

12. The device of claim 5, wherein, in a case that the elastic buffer is in the underflow state, the port setting controller is configured to increase an insertion rate of the skip ordered set.

13. The device of claim 5, wherein, in a case that the elastic buffer is in the normal state, the port setting controller is configured to decrease an insertion rate of the skip ordered set.

14. The device of claim 5, wherein, in a case that the elastic buffer is in the overflow state, the port setting controller is configured to increase an insertion of the skip ordered set for a fixed time.

15. The device of claim 5, wherein, in a case that the elastic buffer is in the underflow state, the port setting controller is configured to increase an insertion of the skip ordered set for a fixed time.

16. The device of claim 5, wherein, in a case that the elastic buffer is in the normal state, the port setting controller is configured to decrease an insertion of the skip ordered set for a fixed time.

17. The device of claim 5, wherein, in a case that the elastic buffer is in the overflow state, the port setting controller is configured to decrease a length of the skip ordered set for a fixed time.

18. The device of claim 5, wherein, in a case that the elastic buffer is in the underflow state, the port setting controller is configured to increase a length of the skip ordered set for a fixed time.

19. The device of claim 1, wherein the transceiver is further configured to transmit the request for the state of the elastic buffer through a link, and
wherein the skip ordered set is transmitted to the external device through the link.

20. The device of claim 1, wherein the transceiver is included in a downstream port.

21. The device of claim 1, wherein the transceiver is further configured to transmit the margin command through a downstream port and receive the state of the elastic buffer through an upstream port included in the external device.

22. The device of claim 1, wherein the transceiver is included in an upstream port.

23. The device of claim 1, wherein the transceiver is further configured to transmit the margin command through an upstream port and receive the state of the elastic buffer through a downstream port included in the external device.

* * * * *